(12) United States Patent
Takashima

(10) Patent No.: US 8,095,790 B2
(45) Date of Patent: Jan. 10, 2012

(54) INFORMATION PROCESSING APPARATUS AND METHOD, AND COMPUTER PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1094 days.

(21) Appl. No.: 11/350,383

(22) Filed: Feb. 8, 2006

(65) Prior Publication Data

US 2007/0078866 A1 Apr. 5, 2007

(30) Foreign Application Priority Data

Oct. 2, 2005 (JP) .................................. 2005-034426

(51) Int. Cl.
*H04L 9/00* (2006.01)

(52) U.S. Cl. ............ 713/165; 380/44; 380/45; 380/277; 380/281

(58) Field of Classification Search .................. 713/165, 713/164, 155; 380/43, 45, 259, 260, 264, 380/277, 281; 705/901, 902, 903
See application file for complete search history.

(56) References Cited

U.S. PATENT DOCUMENTS

| | | | | |
|---|---|---|---|---|
| 5,778,395 | A * | 7/1998 | Whiting et al. ........................ | 1/1 |
| 5,828,375 | A * | 10/1998 | Nomura et al. ................ | 715/764 |
| 6,941,283 | B2 * | 9/2005 | Kambayashi et al. .......... | 705/57 |
| 7,266,202 | B1 * | 9/2007 | Kawakami et al. ............ | 380/283 |
| 7,376,626 | B2 * | 5/2008 | Nagai et al. ..................... | 705/57 |
| 7,555,779 | B2 * | 6/2009 | Nakano et al. .................. | 726/26 |
| 2002/0107806 | A1 * | 8/2002 | Higashi et al. .................. | 705/51 |
| 2002/0152387 | A1 * | 10/2002 | Asano ........................... | 713/176 |
| 2002/0169971 | A1 * | 11/2002 | Asano et al. .................. | 713/193 |
| 2003/0023847 | A1 * | 1/2003 | Ishibashi et al. ............... | 713/169 |
| 2003/0061165 | A1 * | 3/2003 | Okamoto et al. ............... | 705/52 |
| 2003/0152222 | A1 * | 8/2003 | Nakano et al. ................. | 380/201 |
| 2003/0172286 | A1 * | 9/2003 | Gotoh et al. ................... | 713/193 |
| 2003/0185397 | A1 * | 10/2003 | Ishiguro ........................ | 380/277 |
| 2003/0233559 | A1 * | 12/2003 | Asano et al. .................. | 713/189 |
| 2004/0030902 | A1 * | 2/2004 | Asano et al. .................. | 713/176 |
| 2004/0096189 | A1 * | 5/2004 | Sako et al. ...................... | 386/94 |

(Continued)

FOREIGN PATENT DOCUMENTS

JP 2001-188739 7/2001

(Continued)

OTHER PUBLICATIONS

Japanese Office Action for corresponding JP2005-034426 issued on Nov. 24, 2010.

*Primary Examiner* — Beemnet Dada
*Assistant Examiner* — Sayed Beheshti Shirazi
(74) *Attorney, Agent, or Firm* — K&L Gates LLP

(57) ABSTRACT

A recording/playback apparatus for recording or playing back content is provided. For example, a playback unit plays back a medium on which an encrypted content management unit and an encrypted unit key for encrypting the content management unit are recorded. The encrypted unit key is decrypted according to a predetermined decryption procedure. An obtaining unit obtains subsequently generated or obtained data corresponding to the content data played back by the playback unit and a subsequently generated or obtained data key. A decryption unit decrypts the subsequently generated or obtained data key obtained by the obtaining unit according to the predetermined decryption procedure for decrypting the encrypted unit key to decrypt the subsequently generated or obtained data based on the decrypted subsequently generated or obtained data key.

21 Claims, 27 Drawing Sheets

U.S. PATENT DOCUMENTS

| | | | |
|---|---|---|---|
| 2004/0151320 A1* | 8/2004 | Hitachi et al. | 380/277 |
| 2004/0184394 A1* | 9/2004 | Gotoh et al. | 369/275.3 |
| 2004/0243610 A1* | 12/2004 | Ishiguro et al. | 707/100 |
| 2005/0005141 A1* | 1/2005 | Nagai et al. | 713/193 |
| 2005/0144470 A1* | 6/2005 | Takashima et al. | 713/189 |
| 2005/0193200 A1* | 9/2005 | Akiba et al. | 713/168 |
| 2005/0234832 A1* | 10/2005 | Kanai | 705/57 |
| 2005/0244001 A1* | 11/2005 | Kitani et al. | 380/201 |
| 2006/0020556 A1* | 1/2006 | Hamnen | 705/59 |
| 2006/0173787 A1* | 8/2006 | Weber et al. | 705/59 |
| 2007/0209077 A1* | 9/2007 | Kitani | 726/26 |
| 2008/0016576 A1* | 1/2008 | Ueda et al. | 726/26 |
| 2009/0214042 A1* | 8/2009 | Nakahara et al. | 380/278 |

FOREIGN PATENT DOCUMENTS

| | | |
|---|---|---|
| JP | 2001-209583 | 8/2001 |
| JP | 2001-350664 | 12/2001 |
| JP | 2002-311967 | 10/2002 |
| JP | 2003-140662 | 5/2003 |
| JP | 2004-213181 | 7/2004 |
| JP | 2004-295373 | 10/2004 |
| WO | 2005-074187 | 8/2005 |

* cited by examiner

FIG. 13
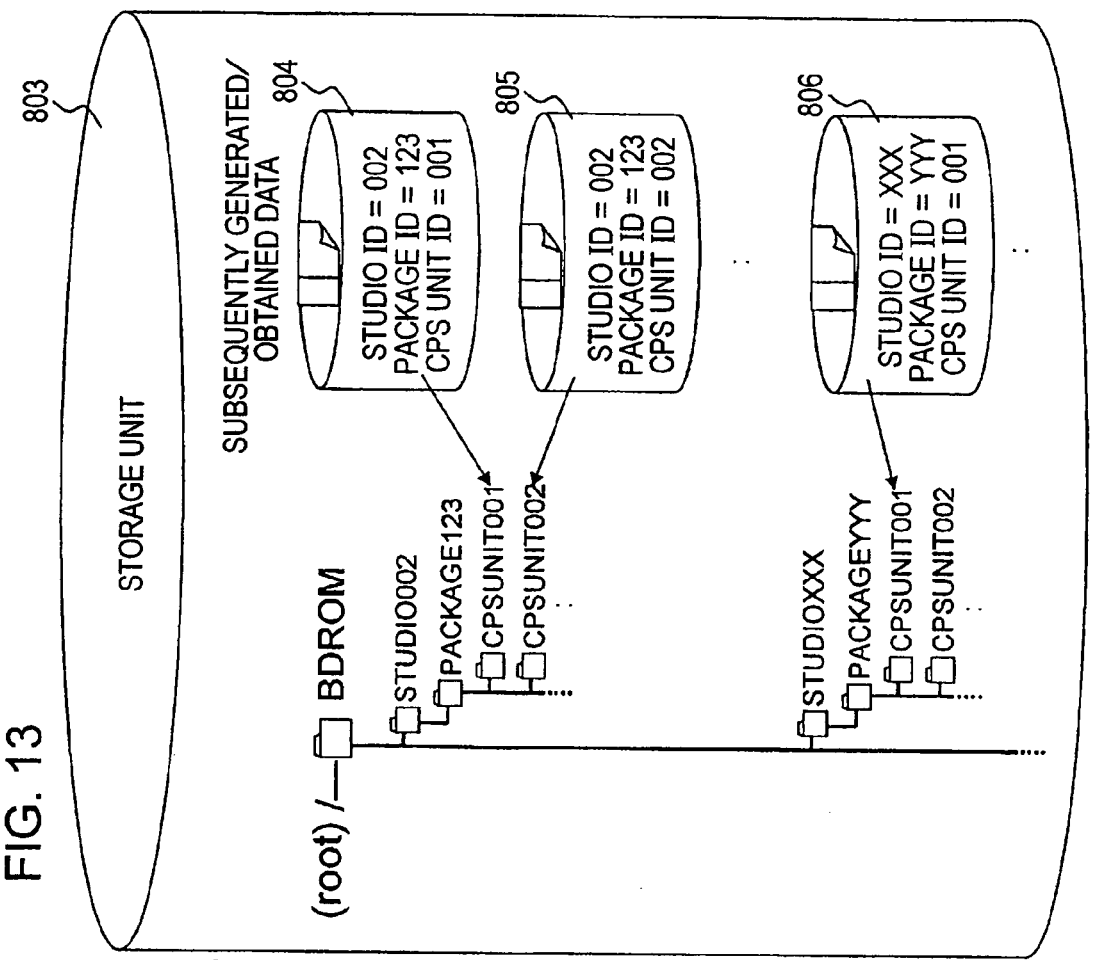
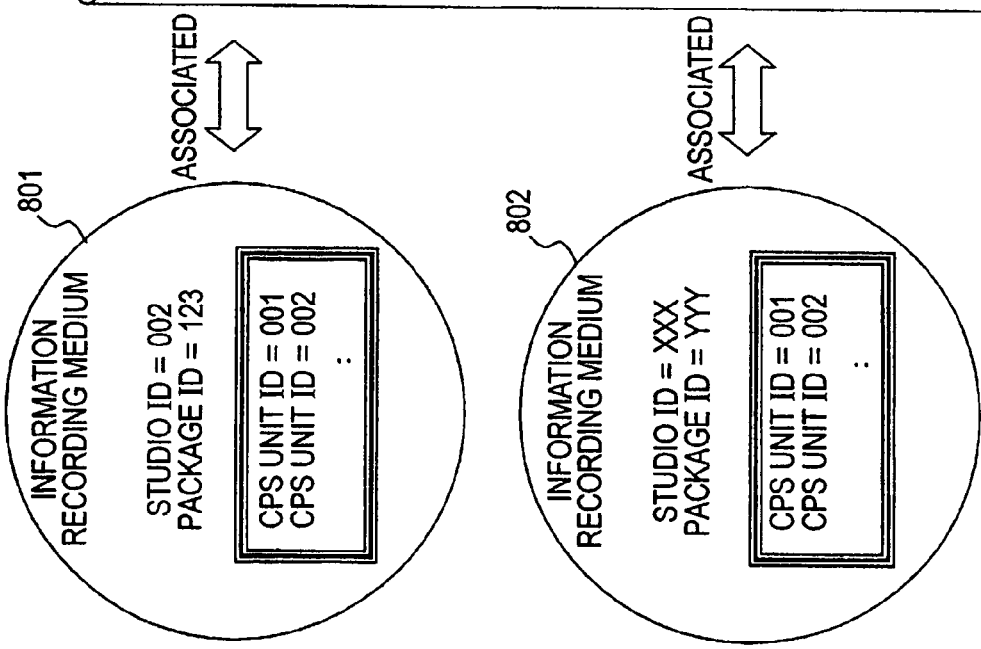

FIG. 22A

```
<directory name = "CPS">
  <file name="Unit_Key_Gen_Value.inf" offset="0" size="4000"/>
  <file name="CPSUnit003.cci" offset="2" size="640"/>
</directory>

<directory name = "BDMV">
  <file name="index.bdmv" offset="3" size="960"/>
  <file name="MovieObject.bdmv" offset="4" size="3600"/>
  <directory name = "PLAYLIST">
    <file name="00002.rpls" offset="6" size="8000"/>
    <file name="00003.rpls" offset="10" size="12000"/>
    ...     ...
  </directory>
</directory>
```

FIG. 22B

```
<directory name = "CPS">
  <file name="Unit_Key_Gen_Value.inf"/>
  <file name="CPSUnit003.cci"/>
</directory>

<directory name = "BDMV">
  <file name="index.bdmv"/>
  <file name="MovieObject.bdmv"/>
  <directory name = "PLAYLIST">
    <file name="00002.rpls"/>
    <file name="00003.rpls"/>
    ...     ...
  </directory>
</directory>
```

INFORMATION PROCESSING APPARATUS AND METHOD, AND COMPUTER PROGRAM

CROSS-REFERENCE TO RELATED APPLICATIONS

The present application claims priority to Japanese Patent Application JP 2005-034426 filed in the Japanese Patent Office on Feb. 10, 2005, the entire contents of which are incorporated herein by reference.

BACKGROUND

The present application generally relates to information processing apparatuses and methods and computer programs. More particularly, the application relates to an information processing apparatus and method and a computer program in which, not only the use of content stored in information recording media, but also the use of data generated or obtained by users afterwards, such as downloaded data, can be controlled on the basis of management units.

Various software data (hereinafter referred to as "content"), such as audio data, e.g., music, image data, e.g., movies, game programs, and various application programs, can be stored on recording media, for example, Blu-ray Discs™ using blue laser light, digital versatile discs (DVDs), mini discs (MDs), compact discs (CDs), as digital data. In particular, Blu-ray discs using blue laser light are high-density recording discs and can record a large volume of video content as high-quality image data.

Digital content is stored in various information recording media, such as those described above, and is provided to users. A user uses the digital content by playing it back on the user's personal computer (PC) or a player, such as a disc player.

Generally, the distribution rights of many content data, such as music data and image data, are owned by creators or sellers of such content data. Basically, therefore, certain usage restrictions are imposed when distributing content, that is, the use of content is allowed only for authorized users, thereby preventing unauthorized copying.

According to digital recording apparatuses and recording media, images and sound can be repeatedly recorded and played back without a loss in quality. Thus, the distribution of illegally copied content via the Internet, the circulation of recording media, such as compact disc recordable (CD-R) discs, recording copied content thereon, so-called "pirated discs", the use of copied content stored in hard disks of, for example, PCs, are widespread.

DVDs or large-capacity recording media, such as those using blue laser light which have recently been developed, can record a large volume of data, for example, up to several movies, on one medium, as digital information. Since video information can be recorded as digital information as described above, it is becoming important to perform copyright protection by preventing unauthorized copying. Nowadays, to prevent unauthorized copying of digital data, various techniques for preventing unauthorized copying are practically applied to digital recording apparatuses or recording media.

For example, in DVD players, a content scrambling system is employed. According to the content scrambling system, data, such as, video data or sound data, is encrypted and recorded on, for example, a digital versatile disc read only memory (DVD-ROM), and a key for decrypting the encrypted data is supplied to licensed DVD players. A license is given to DVD players that are designed in compliance with predetermined operation rules, for example, agreeing not to perform unauthorized copying. Accordingly, licensed DVD players can decrypt data recorded on a DVD-ROM by using the given key to play back images or sound from the DVD-ROM.

On the other hand, unlicensed DVD players are unable to play back data recorded on the DVD-ROM since they do not have the key for decrypting the encrypted data. In this manner, in the content scrambling system, DVD players that do not satisfy conditions demanded for receiving a license are unable to play back digital data from a DVD-ROM, thereby preventing unauthorized copying.

A management system for content stored in information recording media is constructed, as described above. Another type of system that allows users to easily download content, such as effect sound, moving pictures, and still images, that can serve as materials for video products is disclosed in Japanese Unexamined Patent Application Publication No. 2003-140662. Additionally, a technique for substituting data indicating part of a piece of music with another data is disclosed in Japanese Unexamined Patent Application Publication No. 2002-311967. It is difficult, however, to implement the secure data management or usage management for data generated by executing programs stored in information recording media by users or data or content obtained from external servers.

To perform the secure management for data generated by executing programs stored in information recording media by users or data obtained from external servers, it is necessary to handle individual data by, for example, setting a password for each data by a user input or by encrypting each data by using a cryptographic key obtained from an external source. In this data management structure, however, if the number of data generated or obtained by users afterwards is increased, the number of cryptographic keys or passwords is also increased. Additionally, the location of data becomes unclear and the correspondence between stored data and the cryptographic keys or passwords also becomes unclear. Sufficient measures have not yet been taken for the usage management for such subsequently generated/obtained data.

In particular, in an environment where various application programs can be run, such as in a PC, generally, directories managed by a general-purpose file system are set, and files generated by the corresponding programs can be accessed from various applications. Accordingly, it is preferable that, as well as normal files, subsequently generated/obtained data that should be managed by the content management system be also set in management directories of the general-purpose file system. In this case, however, if special settings are not made, the subsequently generated/obtained data is accessed from various application programs, which cause the unauthorized use or tampering of the data.

SUMMARY

It is thus desirable to provide an information processing apparatus and method and a computer program in which, not only the use of content stored in information recording media, but also the use of subsequently generated/obtained data, i.e., data generated or downloaded by users afterwards, can be controlled on the basis of management units, and when subsequently generated/obtained data are set in management directories of a general-purpose file system, the use of the subsequently generated/obtained data is permitted only for licensed programs so that unauthorized copying or tampering of the subsequently generated/obtained data by the other various application programs can be prevented.

According to an embodiment, there is provided an information processing apparatus including: a recording medium interface configured to read data from an information recording medium that stores content management units to which unit keys, which serve as different cryptographic keys, are assigned; and a data processor configured to record, in a storage unit, subsequently generated or obtained data which is subsequently generated or obtained by using acquisition information supplied from the information recording medium. The data processor generates a cryptographic key by using information that can be obtained only by the execution of a licensed program which is allowed to process the content management units, and encrypts a subsequently generated or obtained data management file including the subsequently generated or obtained data by using the generated cryptographic key, and records the subsequently generated or obtained data management file in the storage unit.

The data processor may record the subsequently generated or obtained data management file in the storage unit by setting tamper verifying values for the subsequently generated or obtained data management file.

The data processor may encrypt the subsequently generated or obtained data management file in which an audiovisual (AV) stream data file and a navigation file are stored, the navigation file including control information or a program for playing back AV stream data in the AV stream data file, and may record the subsequently generated or obtained data management file in the storage unit.

The data processor may set the subsequently generated or obtained data management file as a single encrypted file including all the subsequently generated or obtained data.

Alternatively, the data processor may set the subsequently generated or obtained data management file as an encrypted file based on a studio ID, which serves as an identifier for a studio, which is an entity for providing content related to the subsequently generated or obtained data.

Alternatively, the data processor may set the subsequently generated or obtained data management file as an encrypted file based on a package ID or a volume ID, which serves as identification information concerning a manufacturing unit of the information recording medium storing the acquisition information.

Alternatively, the data processor may set the subsequently generated or obtained data management file as an encrypted file based on a content management unit set for the subsequently generated or obtained data.

The data processor may set a directory for each user, and may set the subsequently generated or obtained data management file in the directory for each user.

The data processor may generate the cryptographic key used for encrypting the subsequently generated or obtained data management file by using a device ID, which serves as an ID set for a licensed program.

The data processor may use, as the information for generating the cryptographic key, at least one of a studio ID, which serves as an identifier for a studio, which is an entity for providing content related to the subsequently generated or obtained data, a package ID or a volume ID, which serves as identification information concerning a manufacturing unit of the information recording medium, and user unique information.

The data processor may use the unit key associated with the corresponding content management unit as the cryptographic key used for encrypting the subsequently generated or obtained data management file.

When recording the subsequently generated or obtained data management file in the storage unit, the data processor may generate or update search information concerning at least one of the subsequently generated or obtained data management file and data stored in the subsequently generated or obtained data management file.

According to another embodiment, there is provided an information processing apparatus including: a recording medium interface configured to read data from an information recording medium that stores content management units to which unit keys, which serve as different cryptographic keys, are assigned; and a data processor configured to read, from a storage unit, subsequently generated or obtained data which is subsequently generated or obtained by using acquisition information supplied from the information recording medium and to play back the read subsequently generated or obtained data. The data processor generates a cryptographic key by using information that can be obtained only by the execution of a licensed program which is allowed to process the content management units, and decrypts a subsequently generated or obtained data management file including the subsequently generated or obtained data by using the generated cryptographic key to use the subsequently generated or obtained data.

The data processor may perform a tamper verifying operation on the basis of tamper verifying values set for the subsequently generated or obtained data management file, and uses the subsequently generated or obtained data on the condition that the subsequently generated or obtained data management file is not tampered with.

The data processor may generate the cryptographic key used for decrypting the subsequently generated or obtained data management file by using a device ID, which serves as an ID set for a licensed program.

The data processor may use, as the information for generating the cryptographic key, at least one of a studio ID, which serves as an identifier for a studio, which is an entity for providing content related to the subsequently generated or obtained data, a package ID or a volume ID, which serves as identification information concerning a manufacturing unit of the information recording medium, and user unique information.

The data processor may use the unit key associated with the corresponding content management unit as the cryptographic key used for decrypting the subsequently generated or obtained data management file.

According to another embodiment, there is provided an information processing method including the steps of: reading data from an information recording medium that stores content management units to which unit keys, which serve as different cryptographic keys, are assigned; generating or obtaining subsequent data by using acquisition information supplied from the information recording medium; generating a cryptographic key by using information that can be obtained only by the execution of a licensed program which is allowed to process the content management units; and encrypting a subsequently generated or obtained data management file including the subsequently generated or obtained data by using the generated cryptographic key, and recording the subsequently generated or obtained data management file in a storage unit.

According to another embodiment, there is provided an information processing method including the steps of: reading data from an information recording medium that stores content management units to which unit keys, which serve as different cryptographic keys, are assigned; reading, from a storage unit, a subsequently generated or obtained data management file including subsequently generated or obtained data which is subsequently generated or obtained by using acquisition information supplied from the information recording medium; generating a cryptographic key by using information that can be obtained only by the execution of a licensed program which is allowed to process the content management units; and decrypting the subsequently generated or obtained data management file by using the generated cryptographic key to use the subsequently generated or obtained data.

According to another embodiment, there is provided a computer program for executing information processing including the steps of: reading data from an information recording medium that stores content management units to which unit keys, which serve as different cryptographic keys, are assigned; generating or obtaining subsequent data by using acquisition information supplied from the information recording medium; generating a cryptographic key by using information that can be obtained only by the execution of a licensed program which is allowed to process the content management units; and encrypting a subsequently generated or obtained data management file including the subsequently generated or obtained data by using the generated cryptographic key, and recording the subsequently generated or obtained data management file in a storage unit.

According to another embodiment, there is provided a computer program for executing information processing including the steps of: reading data from an information recording medium that stores content management units to which unit keys, which serve as different cryptographic keys, are assigned; reading, from a storage unit, a subsequently generated or obtained data management file including subsequently generated or obtained data which is subsequently generated or obtained by using acquisition information supplied from the information recording medium; generating a cryptographic key by using information that can be obtained only by the execution of a licensed program which is allowed to process the content management units; and decrypting the subsequently generated or obtained data management file by using the generated cryptographic key to use the subsequently generated or obtained data.

According to another embodiment, there is provided a recording/playback apparatus for recording or playing back content, including: playback means for playing back a medium on which an encrypted content management unit and an encrypted unit key for encrypting the content management unit are recorded, the encrypted unit key being decrypted according to a predetermined decryption procedure, the encrypted content management unit including encrypted content data, an encrypted index table that manages a playback operation of the encrypted content data, an encrypted object called based on the encrypted index table, an encrypted playlist at least indicating a playback order of the encrypted content data based on the encrypted object, and encrypted clip information at least indicating attribute information concerning the encrypted content data, the encrypted clip information being called based on the encrypted playlist; obtaining means for obtaining encrypted subsequently generated or obtained data corresponding to the content data played back by the playback means and an encrypted subsequently generated or obtained data key; and decryption means for decrypting the encrypted subsequently generated or obtained data key obtained by the obtaining means according to the predetermined decryption procedure for decrypting the encrypted unit key and for decrypting the encrypted subsequently generated or obtained data based on the decrypted subsequently generated or obtained data key.

The encrypted unit key and the encrypted subsequently generated or obtained data key may be the same key.

The computer program according to an embodiment is a program that can be provided by means of a computer-readable storage medium, such as a DVD, a CD, and a magneto-optical (MO) disk, or a communication medium, such as a network, to a computer system that can execute various program codes. By providing the computer program in a computer-readable format, processing corresponding to the program can be executed in the computer system.

Further objects, features, and advantages of the present invention will become apparent from the following description of exemplary embodiments with reference to the attached drawings. In this specification, the system is a logical set including a plurality of devices. It is not necessary that the devices be in the same housing.

According to the configuration of an embodiment, when recording data that is subsequently generated or obtained by a user, for example, downloaded information, in an information recordable area of a partial ROM or a removable medium, such as a hard disk, in association with content information based on content management units stored in an information recording medium, subsequently generated or obtained data management file is set and stored after being encrypted. A cryptographic key used for encrypting or decrypting the subsequently generated or obtained data management file is generated by using information that can be obtained only by licensed programs that are allowed to process content management units (CPS units). With this configuration, in an environment where various application programs can be executed, such as in a PC, access or unauthorized use of the subsequently generated or obtained data of the content management units (CPS units) by programs other than licensed programs can be prevented.

According to the configuration of an embodiment, tamper verifying data, such as hash values or a digital certificate, are set in the subsequently generated or obtained data management file and are stored in the storage unit. Accordingly, when using the subsequently generated or obtained data, the integrity of the data is verified, and only when it is verified that the data is not tampered with, the use of the data is allowed. With this configuration, concerning subsequently generated or obtained data, as well as original unit data, the secure data management and usage management can be achieved.

Additional features and advantages are described herein, and will be apparent from, the following Detailed Description and the figures.

BRIEF DESCRIPTION OF THE FIGURES

FIG. 13 illustrates an example of identifying data subsequently generated/obtained by an information processing apparatus with CPS units;

FIGS. 22A and 22B illustrate examples of the data structures of subsequently generated/obtained data search information files;

DETAILED DESCRIPTION

Details of an information processing apparatus and method and a computer program according to an embodiment are described below in the order of the following sections with reference to the accompanying drawings.

Figure 1:
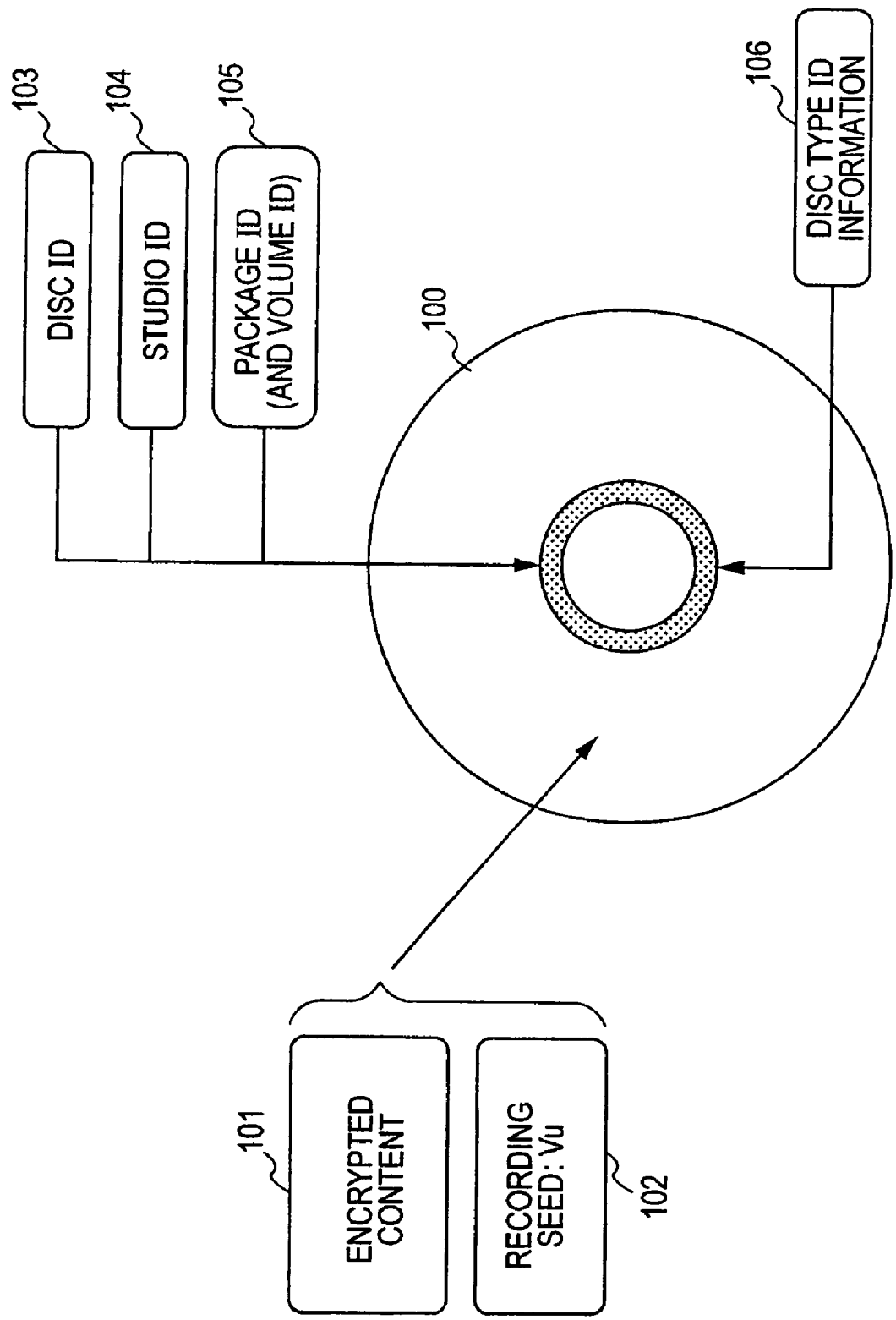
FIG. 1 illustrates the structure of data stored in an information recording medium.

1. Storage Data of Information Recording Medium
2. Content Storage Structure
3. Encryption and Usage Management of Storage Data
4. Management Structure for Subsequently Generated/Obtained Data
5. Association of CPS Unit Data Stored in Information Recording Medium with CPS Unit Data Stored Outside Information Recording Medium
6. Subsequently Generated/Obtained Data Management Structure Based on Settings of Subsequently Generated/Obtained Data Management Files
7. Example of Configuration of Information Processing Apparatus 1. Storage Data of Information Recording Medium The information processing apparatus according to an embodiment implements unit-based usage control for content stored in information recording media and also for subsequently generated/obtained data. An example of storage data of an information recording medium 100 storing content therein is discussed below with reference to FIG. 1.

The information recording medium 100 storing authorized content is manufactured in a disc manufacturing factory with the permission of a so-called "content right holder" having an authorized content copyright or distribution right. In the following embodiment, the information recording medium 100 is discussed in the context of a disc medium. However, the present invention may be used for various information recording media.

The information recording medium 100 may be a write-once ROM disc, a partial ROM that allows data to be written into only part of the partial ROM, or an all disc that allows data to be written into the whole area.

In the information recording medium 100, content 101, such as audiovisual (AV) streams of moving picture content, for example, high definition (HD) movie content, which is HD image data, game programs, image files, sound data, or text data, defined by specific standards is stored. The content 101 includes various modes of information, such as content information that can be used only by data from the information recording medium 100, and content information that can be used by a combination of the data from the information recording medium 100 and data provided from a server connected to the recording medium 100 via a network.

At least part of the content 101 stored in the information recording medium 100 is encrypted, and recording seeds (REC SEED) Vu 102, which serve as information necessary for generating keys for decrypting the encrypted data, are also stored in the information recording medium 100. Before being stored in the information recording medium 100, for the content usage management, the content is encrypted by unit keys as individual cryptographic keys. The recording seeds 102 are key generation information for generating individual unit keys. Instead of being stored in the information recording medium 100, the recording seeds 102 may be obtained from a server connected to the information recording medium 100.

The information recording medium 100 also stores a disc ID 103 as identification information for the information recording medium 100, a studio ID 104 as an identifier of an editing studio that edits the content 101 stored in the information recording medium 100, a package ID 105 as a package identifier, which serves as the manufacturing unit of the information recording medium 100, and disc type identification information 106. In addition to the package ID 105, a volume ID as a volume identifier indicating a different manufacturing unit of the information recording medium 100 may be stored.

Content to be stored in the information recording medium 100 includes AV streams of moving picture content, for example, HD movie content, which is HD image data, game programs, image files, sound data, and text data defined by specific standards. If the information recording medium 100 is a Blu-ray™ disc, which is high-density data recording disc using blue laser light, data based on the Blu-ray™ ROM standard format is stored as main content.

Data having a data format which is not compliant with a specific AV data format, such as game programs, image files, sound data, or text data, which serve as service data, may be stored as sub-content.

For the content usage management, various items of content 101 are stored in the information recording medium 100 by being encrypted with the corresponding unit keys. The recording seeds 102 are used as the key generating information for generating the unit keys.

More specifically, the various items of content 101, such as AV streams, music data, image data, for example, moving pictures and still images, game programs, and web content, are divided into units as content usage management units, and the different recording seeds 102 are assigned to the corresponding divided units to generate unit keys based on the recording seeds. The encrypted content is then decrypted by using the unit keys so that it can be played back.

For example, to use the content 101, such as AV streams, stored in the information recording medium 100, a predetermined cryptographic key generating sequence using the recording seed 102 and other private information (not shown), such as physical indexes, recorded on the information recording medium 100, can be executed so that the unit key associated with the unit can be obtained, and then, the encrypted content contained in the unit is decrypted based on the obtained unit key.

Figure 2:
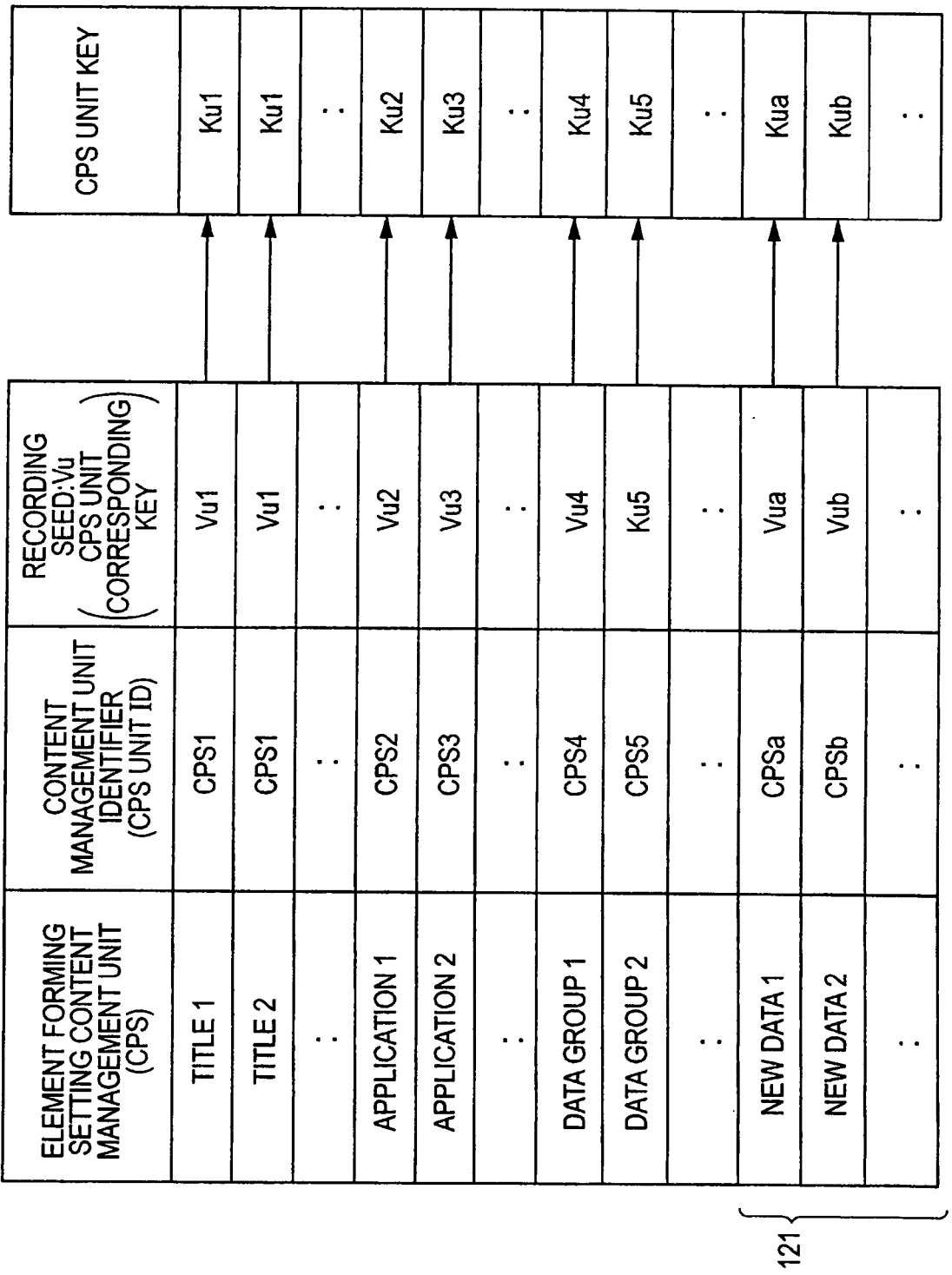
FIG. 2 illustrates an example of a content protection system (CPS) unit management table.

As stated above, the various items of encrypted content 101 stored in the information recording medium 100 are divided into units, which serve as units for content usage management, which are referred to as "content protection system (CPS) units" (content management units). The correspondence between the CPS unit structure and the recording seeds is shown in FIG. 2 by way of example. More specifically, FIG. 2 illustrates the correspondence between a CPS unit management table, which is content management information, stored in the information recording medium 100, and CPS unit keys that can be generated based on the recording seeds associated with the individual CPS units.

The CPS unit management table shown in FIG. 2 shows that elements forming CPS units include titles, applications, and data groups of content, and that CPS unit IDs, which serve as identifiers for the CPS units, and recording seed information for the CPS units are associated with the CPS units.

In FIG. 2, title 1 is set as CPS unit 1 in association with recording seed Vu1. Title 2 is also set as CPS unit 1 in association with recording seed Vu1. Application 1 is set as CPS unit 2 in association with recording seed Vu2.

For example, unit key Ku1 is generated based on the recording seed Vu1, and encrypted content contained in the CPS unit 1 (CPS1) that can be identified by title 1 and title 2 can be decrypted with the unit key Ku1. Similarly, unit key Ku2 is generated based on the recording seed Vu2, and encrypted content contained in the CPS unit 2 (CPS2) that can be identified by application 1 can be decrypted with the unit key Ku2. The same applies to the rest of the unit keys.

The CPS unit management table includes, not only CPS units for content stored in the information recording medium 100, but also CPS units corresponding to a new data field 121 in FIG. 2 for subsequently generated/obtained data, such as data generated by a user or obtained from an external source. Users can define the CPS units for subsequently generated/obtained data.

The CPS units can be set as management units for subsequently generated/obtained data, such as data obtained by executing content, for example, programs, stored in the information recording medium 100. More specifically, the subsequently generated/obtained data includes information concerning a game in progress or concerning the score of a game, or sub-data associated with AV streams stored in the information recording medium 100, for example, subtitle data obtained from an external server. Details of the usage modes of the CPS units are discussed below.

2. Content Storage Structure

The format of content stored in an information recording medium is described below with reference to FIG. 3.

Figure 3:
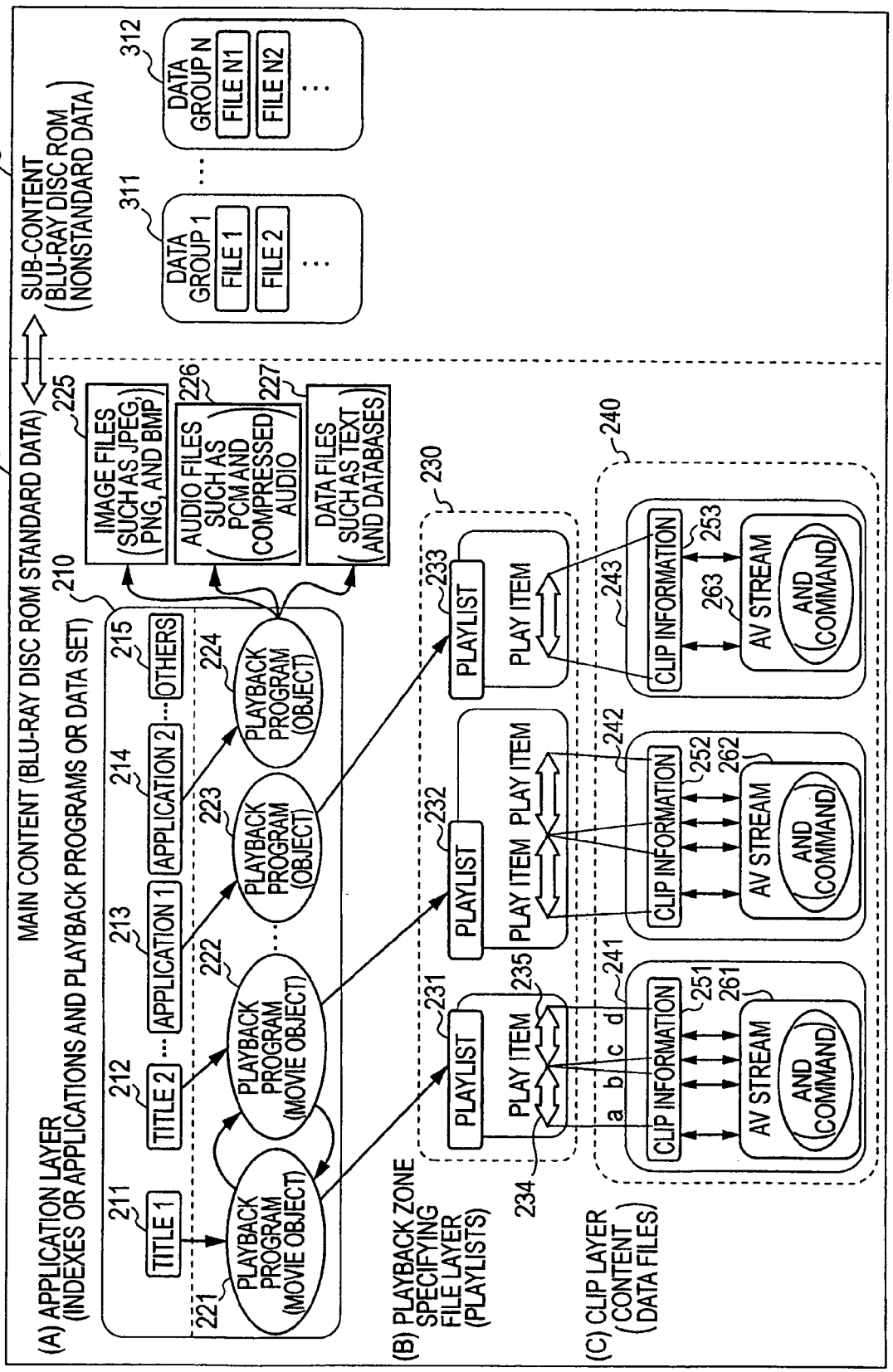
FIG. 3 illustrates an example of setting content management units from content stored in an information recording medium.

In an information recording medium, as shown in FIG. 3, AV streams of motion picture content, such as HD movie content, which is HD image data, are stored as main content 200, and other data and programs, such as game programs, images files, music data, and text data, which serve as service data, are stored as sub-content 300.

The main content 200 is stored according to a specific AV format, for example, the Blu-ray™ disc ROM standard format, as the Blu-ray™ disc ROM data. The sub-content 300 is stored according to a certain format that does not conform to the Blu-ray™ disc ROM standard format as the Blu-ray™ disc ROM nonstandard data.

FIG. 3 shows that the main content 200 based on the Blu-ray™ disc ROM standard format includes moving picture data (AV streams) as real content to be played back, and has a hierarchical structure according to the Blu-ray™ disc ROM standard format, i.e., an application layer 210 indicated by (A) in FIG. 3, a playback zone specifying file layer (playlist layer) 230 indicated by (B), and a clip layer (content data files) 240 indicated by (C).

The clip layer 240 includes clips 241, 242, and 243, which are divided content data files. The clips 241, 242, and 243 include AV stream files 261, 262, and 263, respectively, and clip information files 251, 252, and 253, respectively.

The clip information file 251 is a data file storing attribute information concerning the AV stream file 261. The AV stream file 261 is, for example, moving picture experts group transport stream (MPEG-TS) data, and has a data structure in which various items of information concerning images (video), audio, subtitle data, etc. are multiplexed. Command information for controlling a playback apparatus during a playback operation may also be multiplexed in the AV stream file 261.

The playback zone specifying file layer (playlist layer) 230 includes a plurality of playback zone specifying files (playlists) 231, 232, and 233. Each of the playlists 231, 232, and 233 selects one of the plurality of AV stream data files contained in the clip layer 240, and as a result, the playlist has at least one play item that specifies a specific data portion of the selected AV stream data file as the playback start point and the playback end point. By selecting one of the playlists 231, 232, and 233, the playback sequence can be determined according to the play item contained in the selected playlist so that a playback operation is started.

For example, it is now assumed that the playlist 231 is selected. In this case, the play item 234 associated with the playlist 231 has playback start point a and playback end point b in the clip 241, and the play item 235 has playback start point c and playback end point d in the clip 241. Accordingly, specific data areas from a to b and from c to d of the AV stream data file 261 contained in the clip 241 are played back.

The application layer 210 is set as a layer having a combination of an application index file 211 or 212 including a content title to be displayed on a display unit used for playing back content and a playback program 221 or 222, or a combination of an application execution file 213, 214, or 215, such as game content or web content, and a playback program 223 or 224. The user can determine content to be played back by selecting the title contained in the application index file 211 or 212.

Each title is associated with the corresponding playback program 221, 222, 223, or 224, for example, a movie object, as shown in FIG. 3, and when the user selects one of the titles, playback processing is started based on the playback program associated with the selected title. The application index file 211 or 212 indicated by title 1 or title 2, respectively, includes a title presenting program for displaying titles and menus of content that is automatically played back when an information recording medium is set or operated.

The application index file 211 or 212 or the application execution file 213 or 213 may include an application resource file used for running an application. Alternatively, various data files that can be obtained from an information recording medium or a network connecting server, such as image files 225 based on, for example, joint picture experts group (JPEG), PNG, or bitmap (BMP), audio files 226 based on, for example, pulse code modulation (PCM) or compressed audio, and data files 227 for text and databases, may be used as the application resource files.

The playback programs (for example, movie objects) 221 through 224 are content playback processing programs that can specify playback zone specifying files (playlists), and that can also provide functions required for presenting playback content (HD movie content) in a programmable manner, such as functions of responding to operation information concerning content playback processing input from a user, jumping between titles, and branching the playback sequence. The playback programs 221 through 224 can be jumped from one another, and the playback program to be executed is selected by the user or according to a preset program, and the playback content can be selected and played back from the clip 241, 242, or 243 through the playlist 231, 232, or 233 designated by the selected playback program.

The main content 200 is managed, as shown in FIG. 3, as, for example, the Blu-ray™ disc ROM data, according to a hierarchical structure based on the Blu-ray™ disc ROM standard format. In this hierarchical structure, content management units (CPS units) are set, and the content usage is managed on the basis of the content management units (CPS units). Details of the content management units (CPS units) are discussed below.

In the information recording medium, the sub-content 300 is stored together with the main content 200. The sub-content 300 is content stored in, such as a format that does not conform to a specific AV format, for example, the Blu-ray™ disc ROM standard format.

The sub-content 300 includes game programs, image files, sound data, and text data, which serve as service data, and a set of a plurality of data files are defined as a data group.

The sub-content 300 shown in FIG. 3 includes a data group-1 311 through a data group-N 312. Each of the data groups can be set as a content management unit (CPS unit), in which case, the content usage is managed in units of data groups.

3. Encryption and Usage Management of Storage Data

Figure 4:
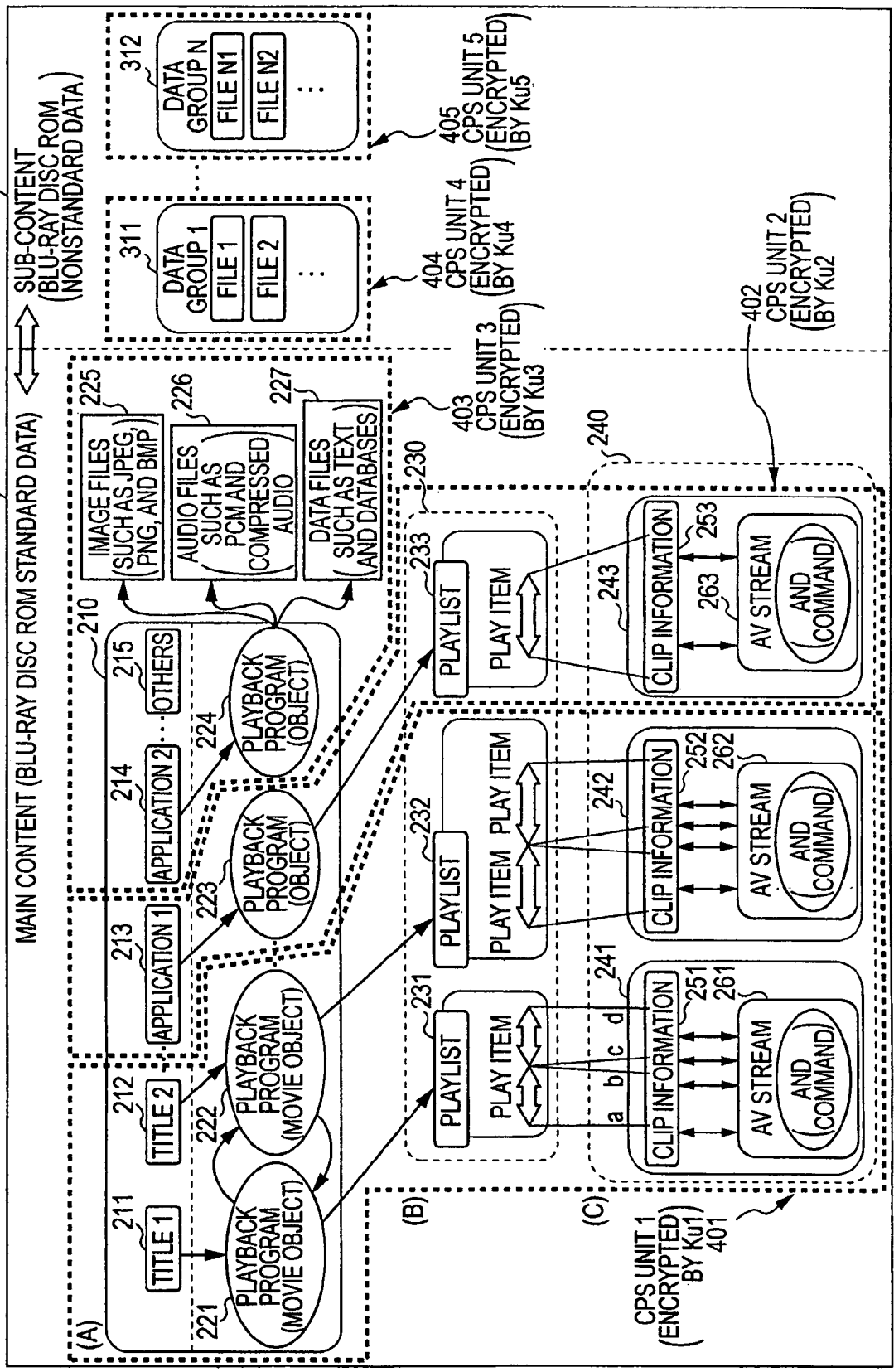
FIG. 4 illustrates an example of encrypting content management units set from content stored in an information recording medium.

A description is now given, with reference to, for example, FIG. 4, of a content management structure in which different types of usage control can be performed on individual content management units (CPS units) divided from content stored in an information recording medium.

As discussed with reference to FIG. 2, unit keys are assigned to individual content management units (CPS units) as different cryptographic keys. In other words, one unit key is assigned to each content management unit (CPS unit). The unit keys can be generated based on recording seeds corresponding to the associated CPS units.

Content belonging to each CPS unit is encrypted with the corresponding unit key, and when playing back the content, the unit key assigned to the CPS unit is obtained to decrypt the content. The unit keys can be independently obtained and managed. For example, the unit key assigned to unit A can be set as a key that is obtained from an information recording medium. The unit key assigned to unit B can be set as a key that is obtained by accessing a network-connected server and by conducting predetermined procedures by the user.

An example of setting a content management unit (CPS unit) to which a unit key is assigned is discussed below with reference to FIG. 4.

The configuration in which content management units (CPS units) of the main content 200 are set is first discussed below.

In the main content 200, the application index files 211 and 212 including at least one title of the application layer 210 indicated by (A) in FIG. 4 is set as a CPS unit. Similarly, the application execution file 213 can be set as a CPS unit, and the application execution files 214 and 215 can be set as a CPS unit.

In FIG. 4, a CPS unit-1 401 includes the application index files 211 and 212, the playback programs 221 and 222, the playlists 231 and 232, and a set of AV stream files (clips 241 and 242) as real content data.

A CPS unit-2 402 includes the application execution file 213, the playback program 223, the playlist 233, and a set of AV stream files (clip 243) as real content data.

A CPS unit-3 403 includes the application execution files 214 and 215, the playback program 224, and various files (image files 225, audio files 226, data files 227) that can be obtained from information recording media or a network-connected server.

Those CPS units are encrypted with the corresponding CPS unit keys Ku1, Ku2, and Ku3 and are then stored in an information recording medium.

In FIG. 4, the content management units (CPS units) 401 and 402 are formed of the application layer 210 indicated by (A), which serves as the upper layer, the playback zone specifying file layer 230 indicated by (B), and the clip layer (content data files) indicated by (C), which serve as the lower layers. The content management unit (CPS unit) 403 is formed of the application layer 210 and various files, such as the image files 225, the audio files 226, and the data files 227, that can be obtained from an information recording medium or a network-connected server (i.e., the content management unit (CPS unit) 403 does not include (B) the playback zone specifying file layer 230 or (C) the clip layer 240).

As stated above, the content management unit (CPS unit)-1 401 includes the title-1 211, the title-2 212, the playback programs 221 and 222, the playlists 231 and 232, and the clips 241 and 242. The AV stream data files 261 and 262, which are real content data, contained in the two clips 241 and 242, respectively, are encrypted with the unit key Ku1 assigned to the content management unit (CPS unit)-1 401.

The content management unit (CPS unit)-2 402 includes the application file 213, for example, game content or web content, the playback program 223, the playlist 233, and the clip 243. The AV stream data file 263, which is real content data, contained in the clip 243 is encrypted with the unit key Ku2 assigned to the content management unit (CPS unit)-2 402. The application file 213 may also be encrypted with the unit key Ku2.

The content management unit (CPS unit)-3 403 includes the application files 214 and 215, the playback program 224, and various data files, such as the image files 226, the audio files 226, and the data files 227, that can be obtained from an information recording medium or a network-connected server by the playback program 224. The content management unit (CPS unit)-3 403 is encrypted with the unit key Ku3 assigned to the content management unit (CPS unit)-3 403.

To play back an application file or content associated with the content management unit (CPS unit)-1 401, it is necessary for the user to obtain the unit key Ku1 by using the recording seed Vu1 assigned to the content management unit (CPS unit)-1 401 and then to execute the content decryption sequence by using the unit key Ku1. After decrypting the content, the user can play back the content by executing the application program.

For example, to use the application file 214 or 215 or the image file 225, the audio file 226, or the data file 227 associated with the content management unit (CPS unit)-3 403, it is necessary for the user to obtain the unit key Ku3 assigned to the content management unit (CPS unit)-3 403 as the cryptographic key and then to decrypt the corresponding file. After decrypting the file, the user can execute the application program or the file.

An example of the directory structure storing content associated with content management units (CPS units) and management information concerning, for example, keys, is described below with reference to FIG. 5.

Figure 5:
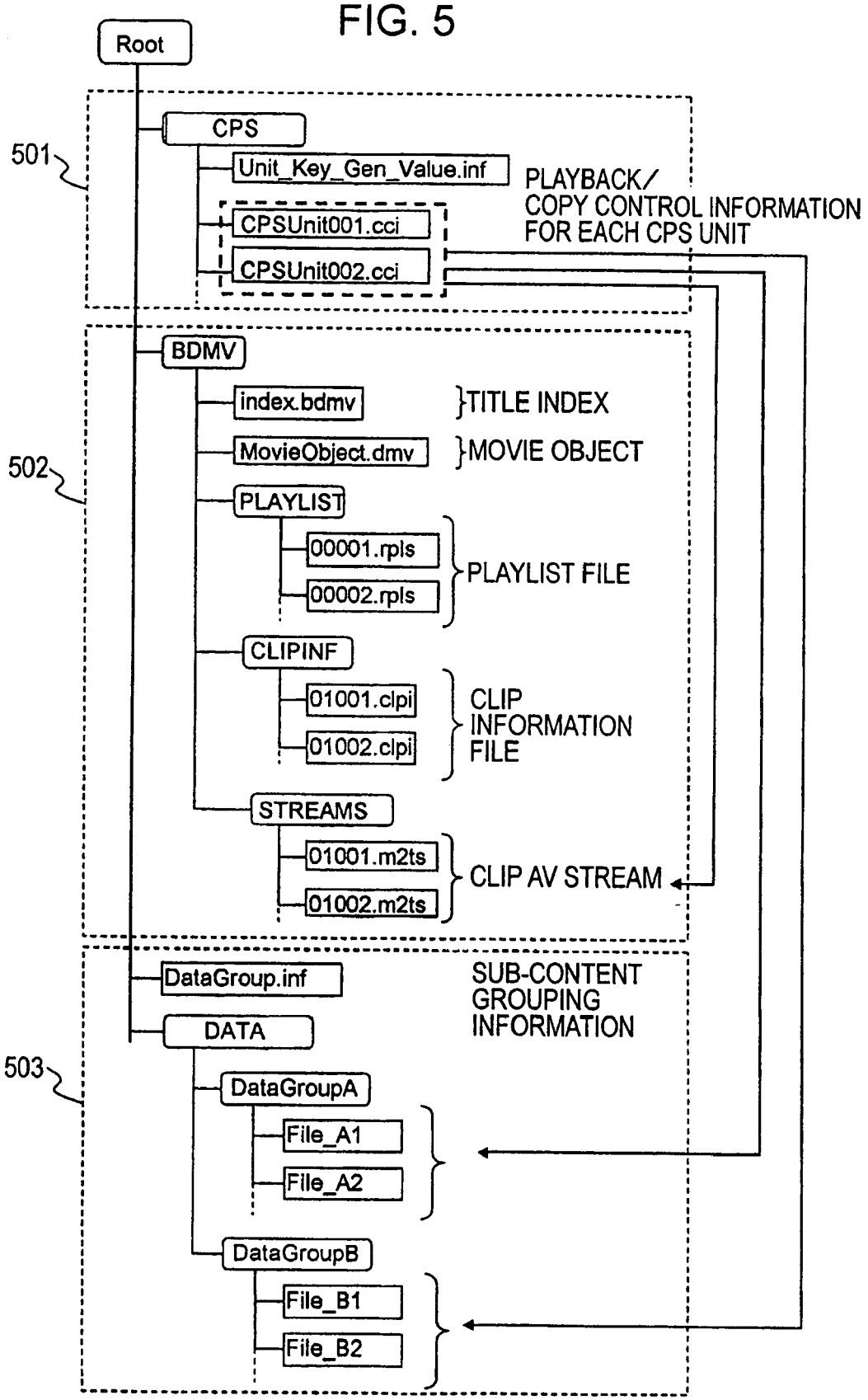
FIG. 5 illustrates an example of a directory structure of data stored in an information recording medium.

The directory structure shown in FIG. 5 includes a main content data portion 502, a sub-content data portion 503, and a content management data portion 501 associated with main content and sub-content. A BDMV directory indicated in the main content data portion 502 is set as a directory that manages content and applications based on the Blu-ray™ disc ROM format.

The main content in compliance with the Blu-ray™ disc ROM format has, as discussed with reference to FIGS. 3 and 4, a hierarchical structure including, for example, titles, objects, playlists, clip information, and clip AV streams. The data files forming those elements are set in the BDMV directory.

The directory of the sub-content data portion 503 is set as a directory that manages content and applications which do not conform to the Blu-ray™ disc ROM format by dividing them into data groups. DataGroup.inf in the sub-content data portion 503 is a file that stores grouping information of sub-content.

The content management data portion 501 stores a management file associated with both the main content and sub-content, for example, the CPS management table shown in FIG. 2 for associating the CPS unit ID of each content management unit (CPS unit) with the recording seed information.

The content management data portion 501 also stores playback control information and copy control information set for each CPS unit.

The playback control information and copy control information for content are set as individual content usage control information for each CPS unit, for example, as follows.

[CPS Unit 1]
Possible number of copies on recording medium: a
Possible number of playback operations: b
Remote-playback is allowed?: YES
[CPS Unit 2]
Possible number of copies on recording medium: 0
Possible number of playback operations: c
Remote-playback is allowed?: NO 4. Management Structure for Subsequently Generated/Obtained Data As stated above, content stored in an information recording medium is divided into CPS units, and the CPS unit key as the cryptographic key associated with each CPS unit is obtained by using the corresponding recording seed. Then, the CPS units can be decrypted with the associated CPS unit keys.

A description is now given of data different from content stored in an information recording medium (i.e., subsequently generated/obtained data, which is generated or obtained by a user afterwards, for example, data generated according to a program stored in an information recording medium or data generated while data stored in an information recording medium is being played back). Specific examples of such subsequently generated/obtained data are data concerning a game program in progress or character data generated by executing the game program, or data obtained from a server via a network, and text or image data formed by the user.

Figure 6:
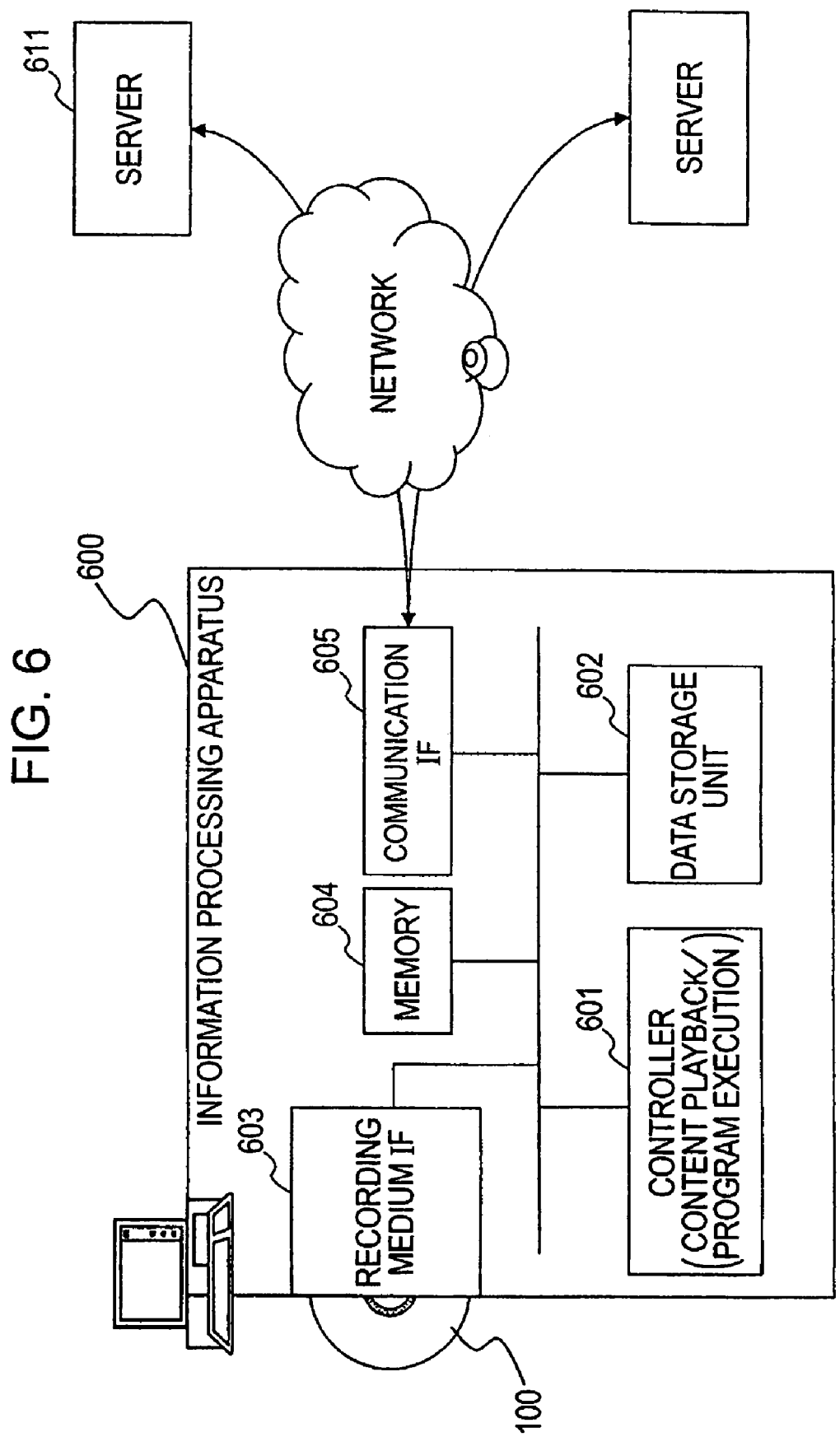
FIG. 6 illustrates generating/obtaining of data by an information processing apparatus which installs an information recording medium therein.

Generating or obtaining data related to content stored in an information recording medium is shown in FIG. 6 by way of example.

FIG. 6 illustrates an information processing apparatus 600, such as a PC, performing a playback operation on an information recording medium. The information processing apparatus 600 includes a controller 601 having a program executing function, such as a central processing unit (CPU), that plays back content and executes programs, a data storage unit 602, such as a hard disk, a recording medium interface 603 that inputs and outputs data into and from an information recording medium, a memory 604, for example, a random access memory (RAM) or a ROM, used as a program execution area or a parameter storage area, and a communication interface 605 that performs communication via a network. In FIG. 6, only a minimal configuration of the information processing apparatus 600 for generating or obtaining subsequently generated/obtained data is shown, and a specific hardware configuration of the information processing apparatus 600 is described later.

The information processing apparatus 600 reads CPS units divided from content stored in the information recording medium 100 via the recording medium interface 603, and controls the playback processing on the content under the control of the controller 601. The playback processing on the content managed on the basis of the CPS units and storage and usage processing on subsequently generated/obtained data are executed by applying a licensed program.

In the information recording medium 100, content recorded based on, for example, the Blu-ray™ disc ROM standard, as discussed with reference to FIGS. 3 and 4, are stored. Each item of content is divided into CPS units, and they are encrypted.

To play back the content, the information processing apparatus 600 generates a CPS unit key based on the recording seed associated with the CPS unit. The content includes games, various programs, such as AV stream playback programs, and AV stream data.

There are two modes in which the information processing apparatus 600 generates or obtains data on the basis of data read from the information recording medium 100.

In the first mode, the information processing apparatus 600 reads information that can be analyzed by the information processing apparatus 600 from the information recording medium 100, and then obtains or generates new data based on the read information. For example, the information processing apparatus 600 obtains uniform resource locator (URL) information concerning the location of subsequently generated/obtained data from the information recording medium 100, and accesses a server 611 designated by the URL by using a browser via the communication interface 605 and a network. Then, the information processing apparatus 600 downloads data, such as new content, associated with the URL. Instead of downloading content, the information processing apparatus 600 may generate subsequently generated/obtained data based on information read from the information recording medium 100.

In the second mode, the information processing apparatus 600 generates or obtains data based on an application program recorded on the information recording medium 100. For example, the information processing apparatus 600 executes a program read from the information recording medium 100 and is connected to the server 611 via the communication interface 605 and a network according to the read program, and then downloads content. Alternatively, the information processing apparatus 600 may generate subsequently generated/obtained data by executing an application program.

The data generated or obtained by various operations described above is not data belonging to CPS units, which are units for managing content recorded on the information recording medium 100. However, according to this embodiment, such subsequently generated/obtained data is managed as data belonging to specific CPS units.

More specifically, subsequently generated/obtained data generated or obtained based on content stored in the information recording medium 100 is managed as data belonging to the same CPS unit as that of the content. Alternatively, new CPS units are defined, and subsequently generated/obtained data are managed on the basis of such new CPS units.

Figure 7:
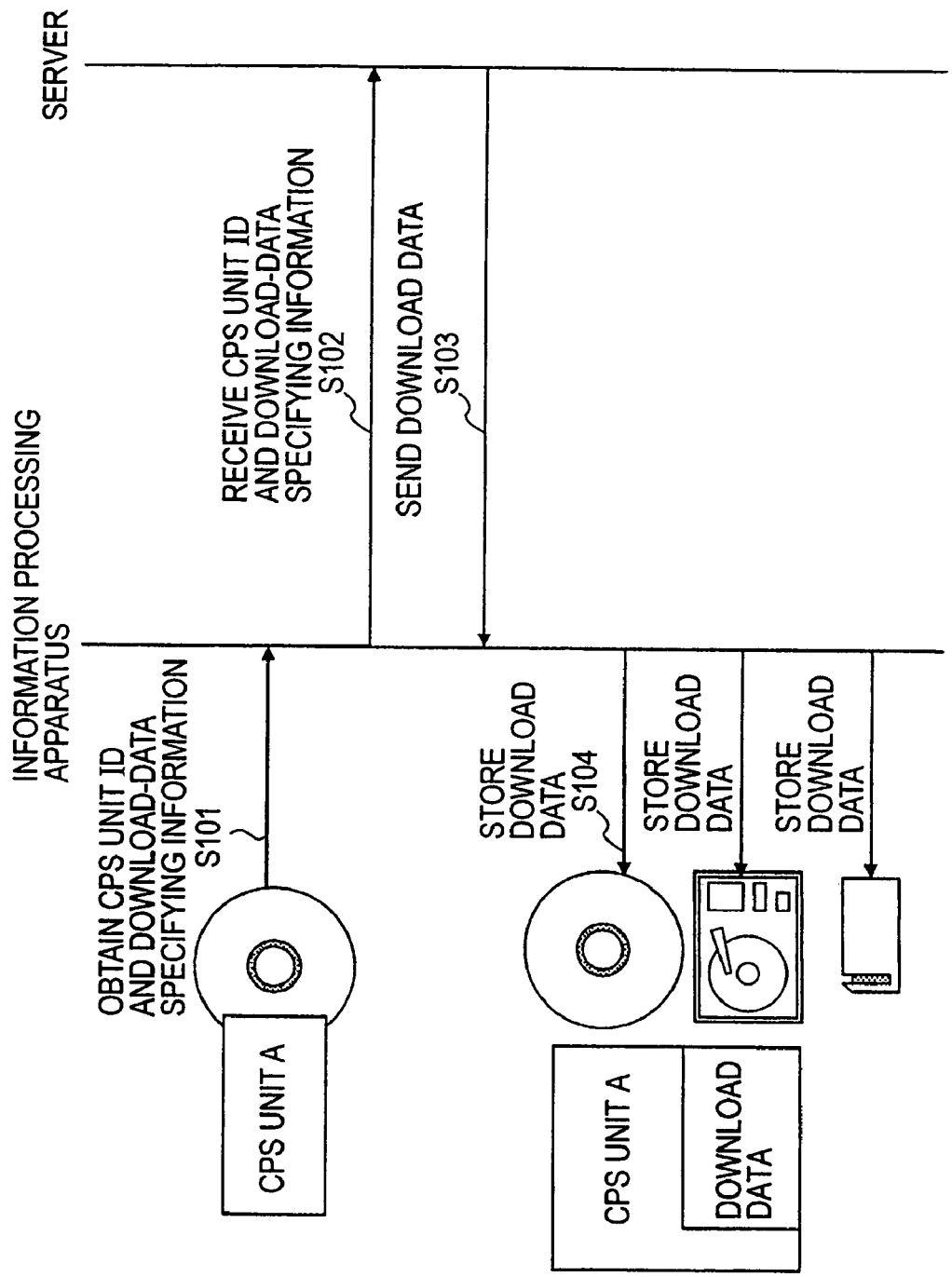
FIG. 7 is a processing sequence for obtaining subsequently generated/obtained data by an information processing apparatus.

FIG. 7 illustrates a processing sequence for obtaining subsequently generated/obtained data from an external source based on content stored in the information recording medium 100.

In step S101, the information processing apparatus 600 reads content managed on the basis of a CPS unit, for example, content belonging to CPS unit A. The information processing apparatus 600 also reads download-data specifying information, for example, a URL, from the information recording medium 100 and obtains the CPS unit ID as the identifier of the CPS unit A corresponding to the read content.

Then, in step S102, the information processing apparatus 600 sends the CPS unit ID and the download-data specifying information to the server.

The server conducts authentication according to a predetermined authentication sequence to verify whether the received CPS unit ID has been obtained from an authorized information recording medium. If the integrity of the CPS unit ID has been verified, in step S103, the server sends the requested download data, for example, dubbed sound data or subtitle data of AV streams, or a playback program for specific content, to the information processing apparatus 600.

In step S104, the information processing apparatus 600 stores the download data obtained from the server in the information recording medium 100 or a storage unit, such as a hard disk within the information processing apparatus 600 or a removable memory. The download data is stored and managed as data belonging to CPS unit A specified by the CPS unit ID. More specifically, the download data is encrypted with CPS unit key Ku(a) generated by using recording seed Vu(a) set for the CPS unit A. The encrypted data is then stored.

According to the sequence discussed with reference to FIG. 7, when the information processing apparatus 600 requests the server to send download data, the CPS unit ID and the download-data specifying information are sent to the server. The reason for sending the CPS unit ID is to enable the following types of management.

(1) The server can manage download data for each CPS unit.

(2) If the permission of downloading or billing is managed for each CPS unit, CPS units downloaded once can be downloaded only by sending the CPS unit ID from the next time.

(3) If download data is encrypted by using the key (unit key) defined for each CPS unit in the information recording medium, it is necessary for the server to have the CPS unit ID to encrypt the download data. The server stores the CPS unit key associated with the CPS unit ID and encrypts the data by using the stored CPS unit key, thereby making it possible to send data securely.

As the download-data specifying information, information other than the URL, such as the studio ID, package ID, volume ID, title ID, movie object ID, playlist ID, or playback zone information (time stamps for the start point and the end point), which are defined by the Blu-ray disc ROM standards may be used. Alternatively, information which is not defined by the Blu-ray disc ROM standard may be used as the download-data specifying information. For example, user attribute information, such as the user ID or billing condition, time and date information, or management data generated by the information processing apparatus 600 when playing back content, for example, the number of playback operations, range that has been played back, game score, and multi-storied playback path, may be used as the download-data specifying information as long as the server can specify download data by using such information.

Specific examples of data generated or obtained by the information processing apparatus 600 are discussed below with reference to FIGS. 8 and 9.

Figure 8:
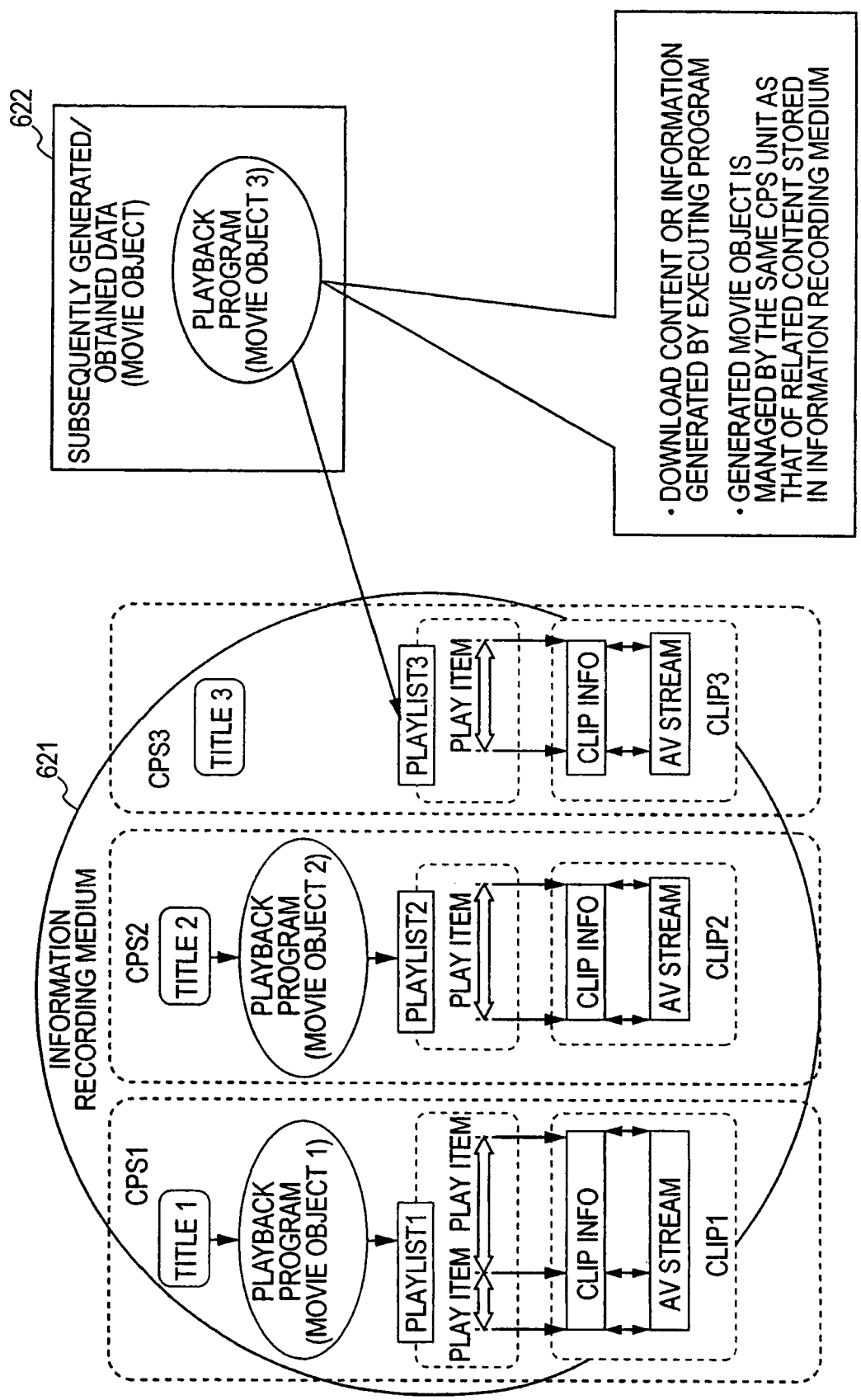
FIGS. 8 and 9 illustrate examples of data subsequently generated or obtained by an information processing apparatus.

FIG. 8 illustrates an example in which part of the data based on the Blu-ray™ disc ROM standard format is generated or obtained afterwards. As discussed with reference to FIGS. 3 and 4, content stored in an information recording medium according to the Blu-ray™ disc ROM standard format has a hierarchical structure, and, for example, AV stream content can be played back by being associated with the data and programs of the individual layers of the hierarchical structure.

In an information recording medium 621 shown in FIG. 8, CPS units 1, 2, and 3 associated with titles 1, 2, and 3, respectively, are set as content based on the Blu-ray™ disc ROM standard format.

In the CPS units 1 and 2 associated with the titles 1 and 2, respectively, movie objects 1 and 2 as the playback programs corresponding to the titles 1 and 2, respectively, are stored. The user installs the information recording medium 621 in the information recording apparatus 600 and specifies the title 1 or title 2 to execute the corresponding movie object 1 or 2, thereby playing back a clip file in a zone designated by the corresponding playlist (i.e., AV stream data). To do so, however, it is necessary to decrypt the encrypted data, such as the encrypted AV streams, by extracting the recording seed associated with the CPS unit 1 or 2 from management data and by generating the CPS unit key by using the recording seed.

In contrast, in the CPS unit 3, movie object 3 as the playback program associated with the title 3 is not stored, and thus, a clip file contained in the CPS unit 3 (i.e., AV stream data) cannot be played back. In this case, the information processing apparatus 600 generates or obtains the movie object 3 as the playback program associated with the title 3 (i.e., as subsequently generated/obtained data 622). The generated or obtained movie object 3 is managed as data forming the CPS unit 3.

Figure 9:
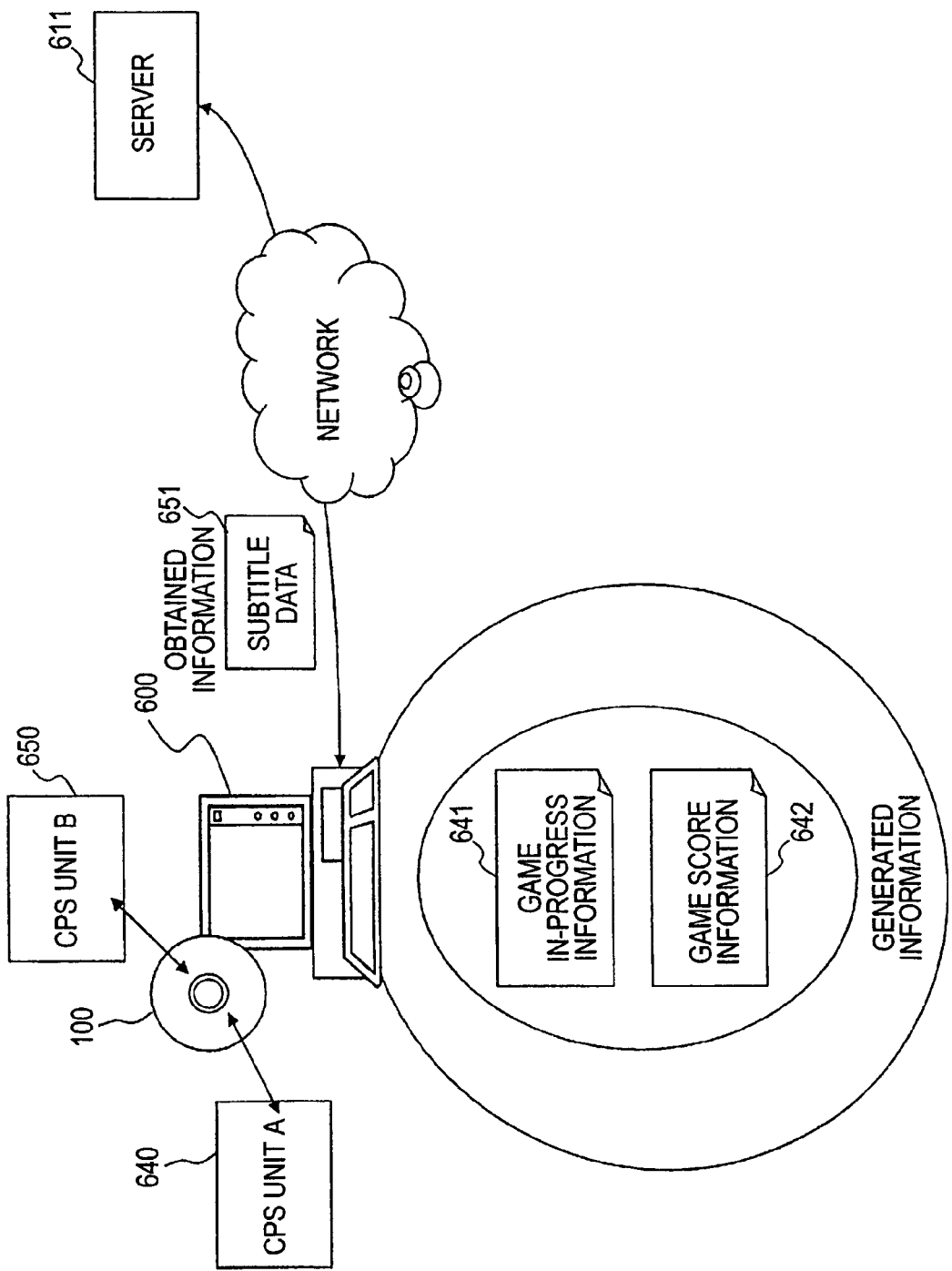

FIG. 9 illustrates other specific examples of data generated or obtained by the information processing apparatus 600.

The information processing apparatus 600 plays back content which is managed on the basis of a plurality of CPS units from the information recording medium 100.

For example, a CPS unit-A 640 is a content management unit containing a game program, and the information processing apparatus 600 executes this game program to generate game in-progress information 641 and game score information 642, respectively, as subsequently generated/obtained data. The information processing apparatus 600 then sets the subsequently generated/obtained data 641 and 642 as data forming the CPS unit-A 640 and stores them in the information recording medium 100 or a storage unit, such as a hard disk, contained in the information processing apparatus 600.

A CPS unit-B 650 is a content management unit containing moving-picture AV stream content, such as a movie, and the information processing apparatus 600 obtains subtitle data 651 associated with the AV stream content from the server 611 as subsequently generated/obtained data, and plays back the subtitle data 651. The information processing apparatus 600 then sets the subtitle data 651 as data forming the CPS unit-B 650 and stores it in the information recording medium 100 or a storage unit, such as a hard disk, contained in the information processing apparatus 600.

In the above-described examples, the subsequently generated/obtained data is included in the same CPS unit as that of the corresponding content. Alternatively, new CPS units may be set for subsequently generated/obtained data, and then, the subsequently generated/obtained data may be stored as data forming the new CPS units in the information recording medium 100, or a storage unit, such as a hard disk contained in the information processing apparatus 600 or a removable memory. As the new CPS units, CPS units corresponding to new data, such as those indicated in the new data field 121 shown in FIG. 2, are set. The recording seeds Vu associated with the new CPS units are prestored in the information recording medium 100, and CPS unit keys are generated by using the recording seeds Vu according to a predetermined encryption processing sequence. By using the generated CPS unit keys, the subsequently generated/obtained data are encrypted and are then stored in the information recording medium 100 or a storage unit, such as a hard disk contained in the information processing apparatus 600 or a removable memory.

The recording seeds Vu associated with the new CPS units may be obtained from an external server. In this case, however, it is desirable that predetermined authentication processing be conducted between the server and the information processing apparatus 600 to prevent the unauthorized operation to obtain the recording seeds Vu. The recording seeds Vu are obtained in association with the elements forming the CPS units in the management table shown in FIG. 2.

Encryption and management of subsequently generated/obtained data is described below with reference to FIG. 10.

Figure 10:
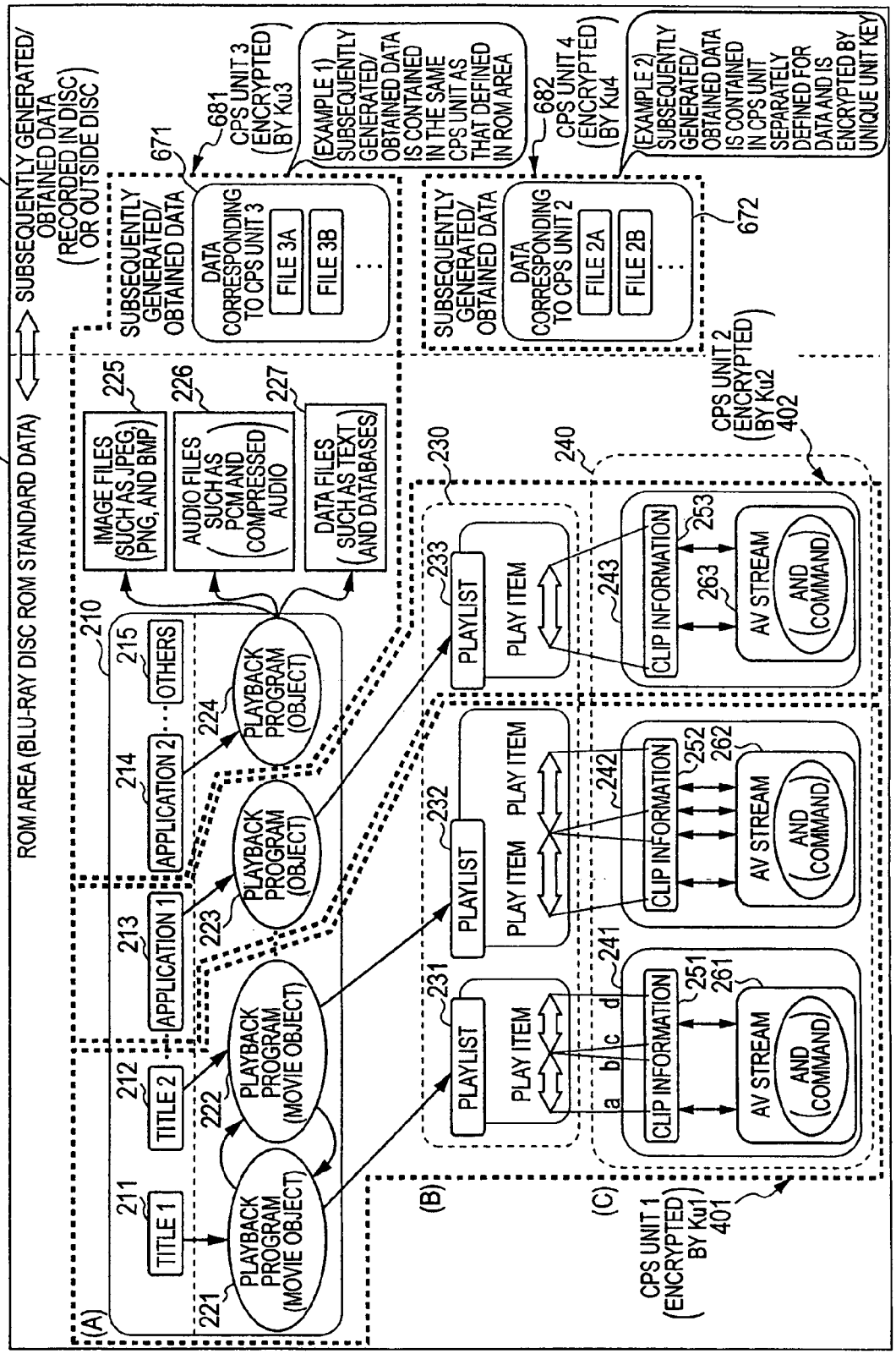
FIG. 10 illustrates the relationship between subsequently generated/obtained data and CPS units.

FIG. 10 illustrates an example of a data encryption method when data generated or obtained in accordance with the playback operation for content stored in an information recording medium is recorded in or outside the information recording medium.

In FIG. 10, the data area shown at the left side is data stored in the information recording medium (i.e., ROM area data 660) and the data area shown at the right side is subsequently generated/obtained data 670 as data generated or obtained afterwards. The subsequently generated/obtained data 670 is stored in a data writable area of the information recording medium, a hard disk, or an external storage unit, such as a removable memory. In FIG. 10, two examples are shown as the methods for setting CPS units for subsequently generated/obtained data.

Example 1

As indicated in a CPS unit-3 681 shown in FIG. 10, subsequently generated/obtained data 671 is integrated into a CPS unit that has been set in the information recording medium.

The CPS unit-3 681 contains data stored in the data area 660 of the information recording medium and also integrates the subsequently generated/obtained data 671 therein. In this case, the subsequently generated/obtained data 671 or data contained in the subsequently generated/obtained data 671 is encrypted with the unit key Ku3 generated by using the recording seed Vu3 set for the CPS unit 3, and is then stored in the information recording medium or a storage unit, such as a hard disk.

In this example, the subsequently generated/obtained data 671 is encrypted with the same key as the unit key for the CPS unit defined in the ROM area of the information recording medium, and when playing back the content, the subsequently generated/obtained data 671 can be decrypted with the same key as the data contained in the CPS unit defined in the ROM area. Accordingly, the seamless playback operation can be implemented without the need to change keys.

Example 2

As indicated in a CPS unit-4 682 in FIG. 10, a new CPS unit, which is different from the CPS unit defined in the information recording medium, is set for subsequently generated/obtained data 672.

The CPS unit-4 682 is separately defined for the subsequently generated/obtained data 672, and the data contained in the subsequently generated/obtained data 672 is encrypted with the corresponding unit key. The CPS unit-4 682 is managed independently of the data stored in the information recording medium. In this case, it is necessary to set and record, as management data, information for assigning the CPS unit to the subsequently generated/obtained data 672 and information for generating the unit key.

An example of the method for setting playback/copy control information for subsequently generated/obtained data as management data is discussed below with reference to FIG. 11.

Figure 11:
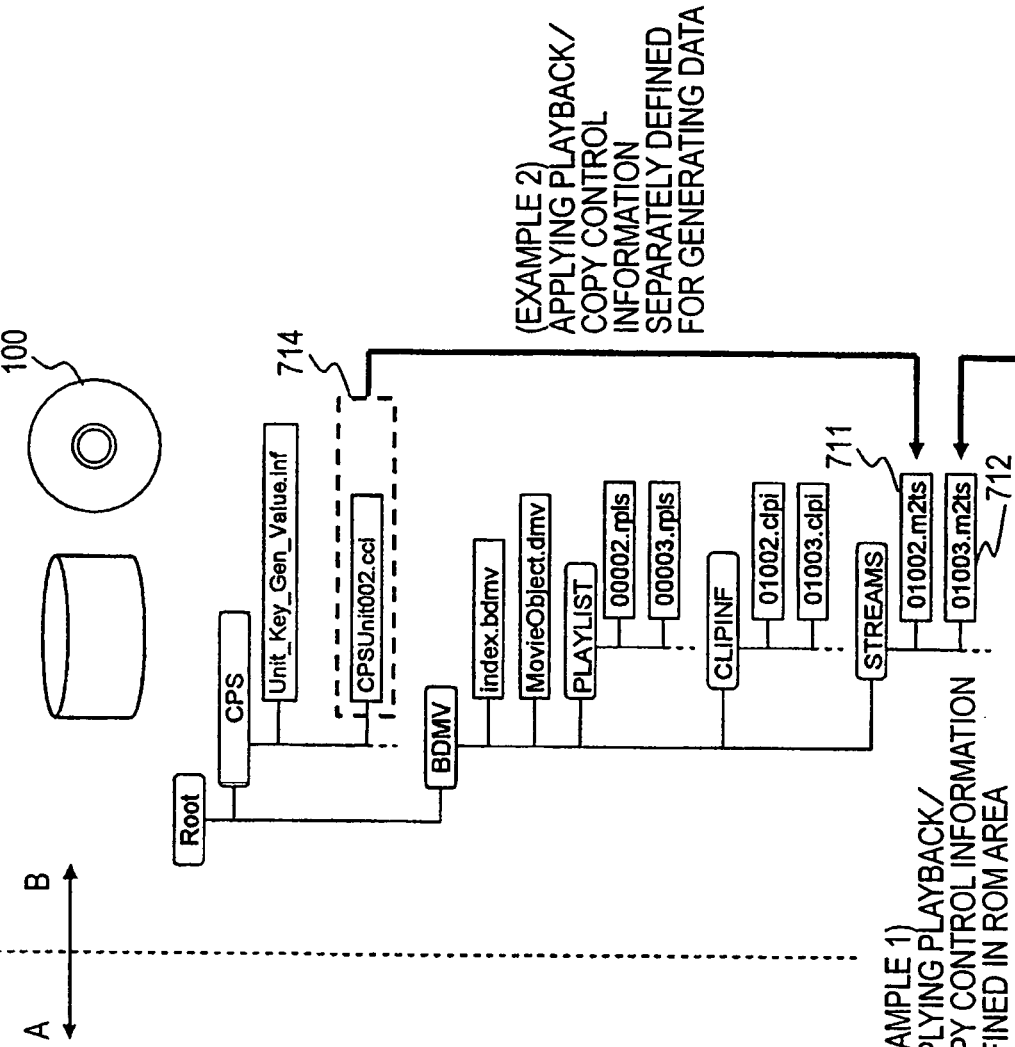
FIG. 11 illustrates examples of setting playback/copy control information for data subsequently generated/obtained by an information processing apparatus.

FIG. 11 illustrates directory A corresponding to CPS management units that have been stored in the information recording medium 100 and directory B corresponding to subsequently generated/obtained data. In both the directory A and directory B shown in FIG. 11, the data are set in the BDMV directory as content based on the Blu-ray™ disc ROM standard format, and various management data are stored in the CPS directory.

The playback/copy control information is recorded by one of the following two methods.

Example 1

Existing playback/copy control information is used as playback/copy control information for subsequently generated/obtained data. More specifically, playback/copy control information [CPSUnit001.cci] 713 associated with data [01001.m2ts] 715 of CPS unit 001 stored in the information recording medium 100 is directly used, as shown in FIG. 11, as playback/copy control information associated with subsequently generated/obtained data [01003.m2ts] 712. In this case, it is not necessary to generate playback/copy control information corresponding to the subsequently generated/obtained data [01003.m2ts] 712. The playback/copy control information [CPSUnit001.cci] 713 associated with CPS unit 001 is set as playback/control information used for both the existing data [01001.m2ts] 715 and the subsequently generated/obtained data [01003.m2ts] 712.

Example 2

New playback/copy control information is generated for subsequently generated/obtained data. More specifically, new playback/copy control information [CPSUnit002.cci] 714 is generated and managed for subsequently generated/obtained data [01002.m2ts] 711, as shown in FIG. 11.

The method in example 1 is suitable on the occasion when, for example, subtitle data of a language which is not recorded in the ROM area of the information recording medium 100 is downloaded and is played back together with video/audio data recorded in the ROM area. In this case, it is natural to consider that both the data recorded in the ROM area and the downloaded data belong to the same CPS unit.

The method in example 2 is suitable on the occasion when, for example, it is desired that data generated by executing an application program read from the information recording medium 100 be shared and copied among a plurality of users. Although data, such as applications and AV streams, recorded in the ROM area cannot be copied, data generated by an application (for example, information that can be sent to other users or to other portable machines, such as game score information and map information) may be played back or copied. In this case, playback/copy control different from that recorded in the ROM area is necessary.

Figure 12:
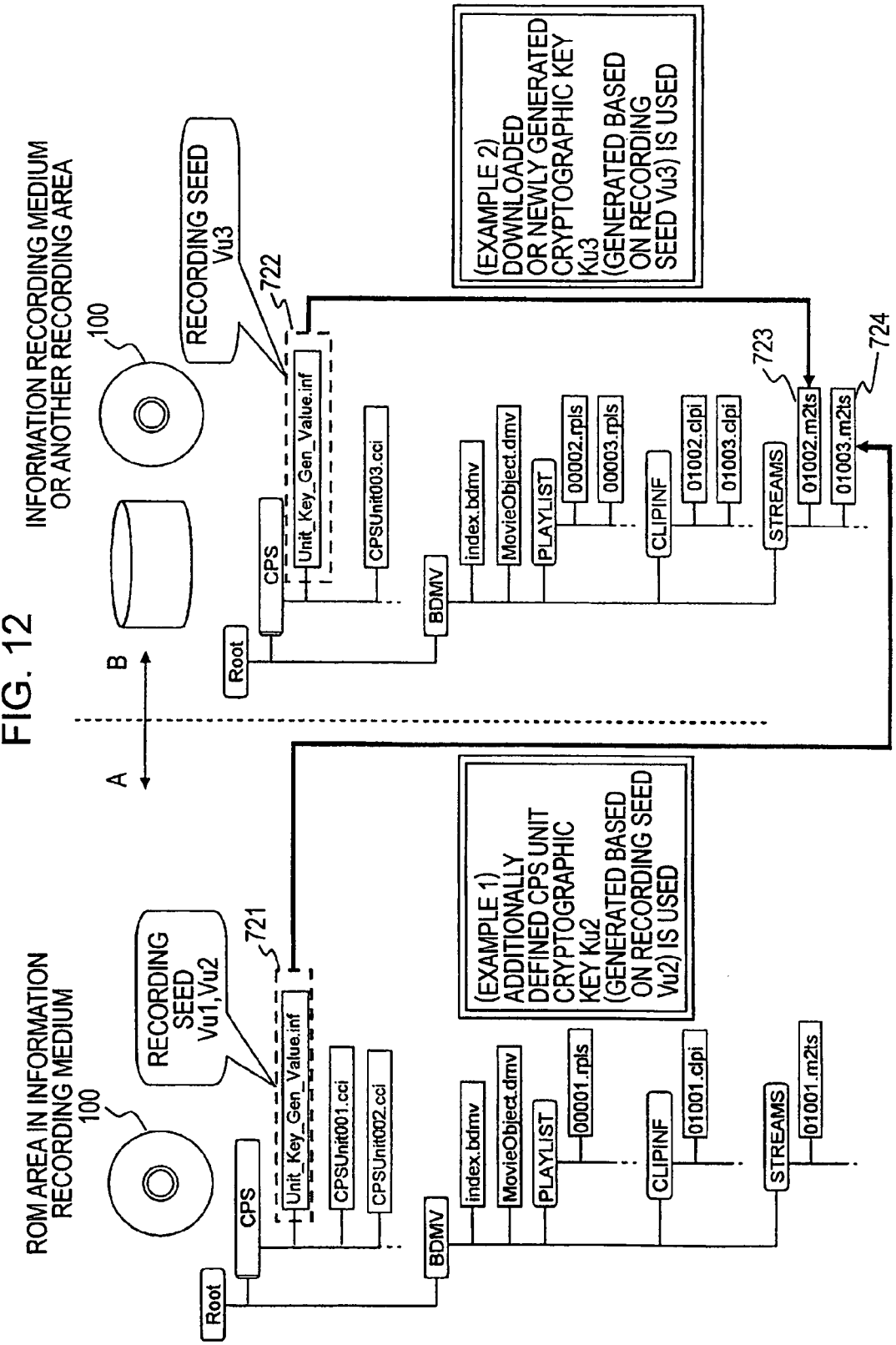
FIG. 12 illustrates examples of setting cryptographic key information for data subsequently generated/obtained by an information processing apparatus.

FIG. 12 illustrates an example of the method for setting recording seeds used for generating cryptographic keys (i.e., unit keys associated with individual CPS units).

As in FIG. 11, FIG. 12 illustrates directory A associated with CPS management units that have been stored in the information recording medium 100 and directory B associated with subsequently generated/obtained data. In both the directory A and directory B shown in FIG. 12, data are set in the BDMV directory as content based on the Blu-ray™ disc ROM standard format, and various management data are stored in the CPS directory.

The recording seed is associated with each CPS unit identifier (CPS unit ID), as indicated in the CPS unit management table discussed with reference to FIG. 2. Cryptographic key information [Unit_Key_Gen_Value.inf] 721 shown in FIG. 12 corresponds to the CPS unit management table stored in the information recording medium 100.

Recording seeds associated with the CPS units are set for subsequently generated/obtained data by one of the following two methods.

Example 1

As the recording seeds for generating cryptographic keys for subsequently generated/obtained data, the recording seeds for new data that have been set in the CPS unit management table are used.

More specifically, the recording seed that has been set in the new data field 121 of the CPS unit management table shown in FIG. 2 is used as the recording seed for generating a cryptographic key for the subsequently generated/obtained data. In FIG. 12, the recording seed that has been set in the new data field 121 of the cryptographic key information [Unit_Key_Gen_Value.inf] 721, which is the management table data, stored in the information recording medium 100 is used as the recording seed for subsequently generated/obtained data [01003.m2ts] 724. In this example, a new CPS unit is defined, and the recording seed that has been set in the new data field 121 can be used.

Example 2

As the recording seeds for generating cryptographic keys for subsequently generated/obtained data, new recording seeds are generated or obtained. In FIG. 12, cryptographic key information [Unit_Key_Gen_Value.inf] 722, which is new management table data, is set for subsequently generated/obtained data [01002.m2ts] 723, and a new CPS unit identifier set as a new entry is associated with the recording seed. If the generation of recording seeds is allowed, the data processor of the information recording apparatus 600 generates new recording seeds by using, for example, random numbers. In this example, the setting of CPS units and the generation of recording seeds are allowed for new data without any restriction.

In the information processing apparatus 600, when a new CPS unit is set, it is necessary to associate management data (i.e., playback/copy control information) with the new CPS unit. In this case, one of the above-described two methods discussed with reference to FIG. 11 can be used, and more specifically, the existing playback/copy control information may be associated or new playback/control information may be set and associated with the new CPS unit.

5. Association of CPS Unit Data Stored in Information Recording Medium with CPS Unit Data Stored Outside Information Recording Medium As stated above, subsequently generated/obtained data, which is not stored as original data managed on the basis of CPS units in the information recording medium is stored in the information recording medium, a hard disk, or a removable memory, such as a flash memory. To handle the subsequently generated/obtained data as data to be managed by the CPS management data of the information recording medium, it is necessary to identify the subsequently generated/obtained data with the data to be managed by the CPS management data of the information recording medium. This is described in detail below.

FIG. 13 illustrates the association of subsequently generated/obtained data stored in a storage unit, for example, in a hard disk of the information processing apparatus 600, other than an information recording medium storing original CPS units, with the original CPS units.

When recording subsequently generated/obtained data on a storage unit other than information recording media storing original CPS units, as shown in FIG. 13, subsequently generated/obtained data corresponding to information recording media 801 and 802, each storing CPS units, is stored in one storage unit 803, such as a hard disk.

In this case, it is necessary to identify which subsequently generated/obtained data stored in the storage unit 803 corresponds to the information recording medium 801 or 802.

In each of the information recording media 801 and 802, the studio ID as the identifier of the editing studio for the content stored in the information recording medium and the package ID as the package identifier, which serves as the manufacturing unit of the information recording medium, are stored.

Each of subsequently generated/obtained data 804, 805, and 806 stored in the storage unit 803 is provided with, as shown in FIG. 13, the studio ID, package ID, and CPS unit ID as identification data. A directory hierarchical structure is formed, as shown in FIG. 13, in the order of the studio IDs, package IDs, and CPS unit IDs, and data is stored and managed based on this directory hierarchical structure.

The data can be stored in the directory hierarchical structure in a desired format. For example, if data has been generated by using an application program, such as Java™, it is not restricted to specific formats as long as it can be interpreted by Java™ when it is played back.

Figure 14:
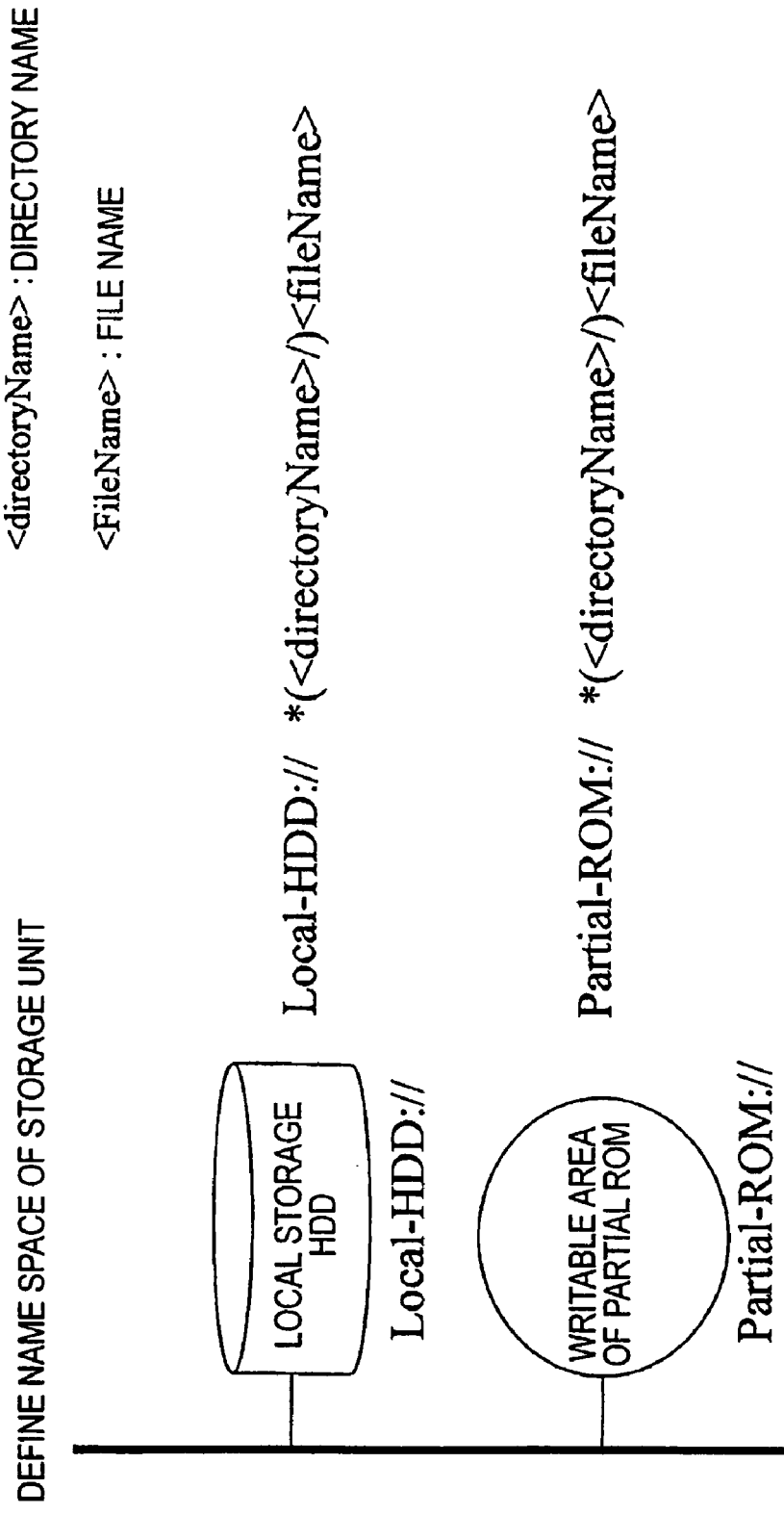
FIG. 14 illustrates an example of identifying data subsequently generated/obtained by an information processing apparatus with CPS unit and obtaining such data.

When such a directory hierarchical structure is defined, data recorded in a storage unit other than information recording media storing original CPS units can be called by an execution program, such as Java™, by referring to a name space, a directory, and a file name, as shown in FIG. 14. More specifically, the name space of the data writable area of the information recording medium storing original CPS unit and the name space of the hard disk are defined as [Partial-ROM://] and [Local-HDD://], respectively. Then, by specifying the storage file of each new data by the name space, directory, file name, the file data can be read, updated, or rewritten.

Figure 15:
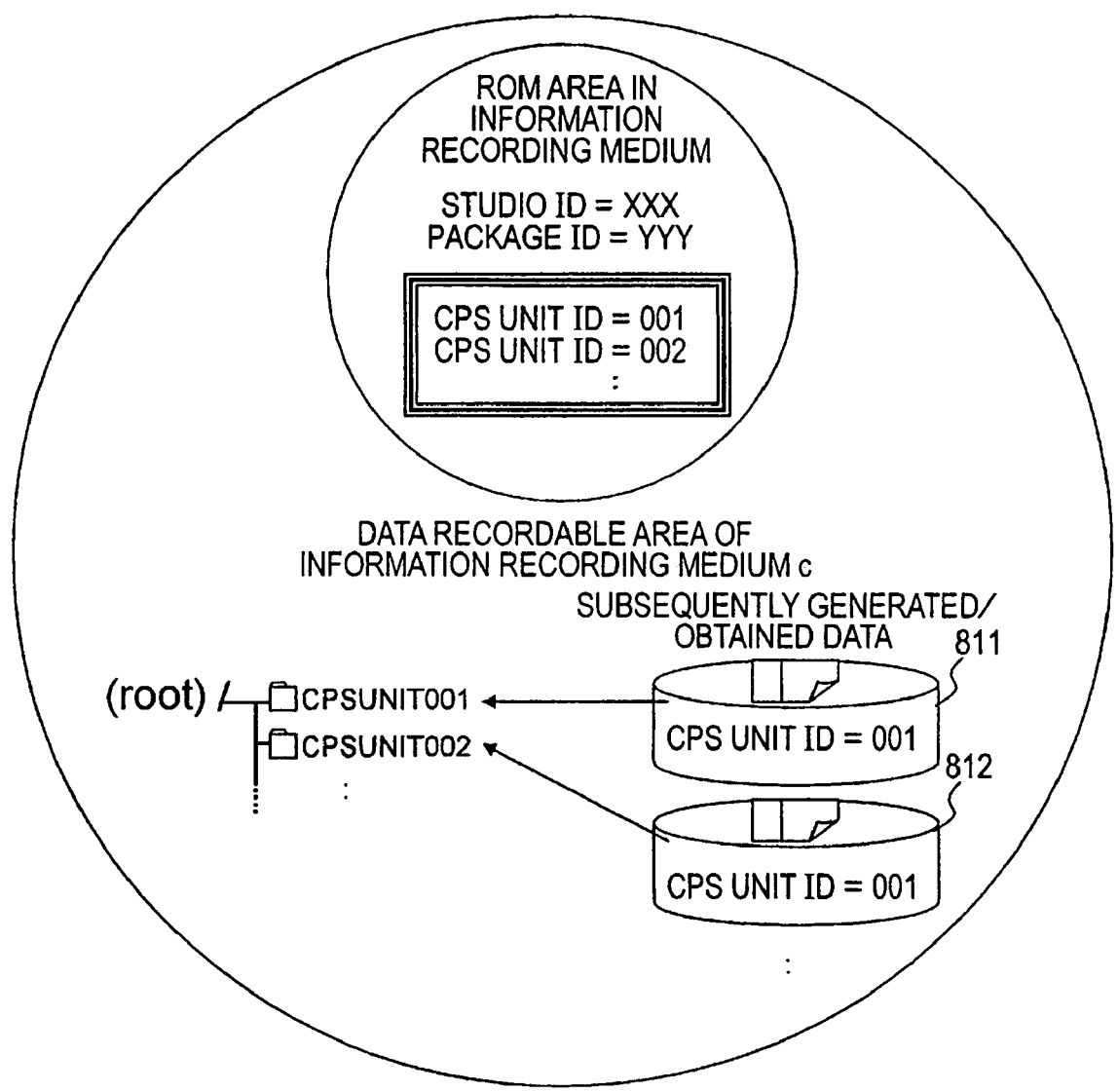
FIG. 15 illustrates an example of identifying data subsequently generated/obtained by an information processing apparatus with CPS units.

A description is given below, with reference to FIG. 15, of the association between subsequently generated/obtained data and an original CPS unit when the subsequently generated/obtained data is written into a data writable area of an information recording medium storing the original CPS unit.

When subsequently generated/obtained data is recorded on a data writable area of an information recording medium having an original CPS unit, management over a plurality of packages discussed with reference to FIG. 13 is not necessary. Accordingly, the directory management using the studio IDs and package IDs is not necessary, and subsequently generated/obtained data 811 and 812 are managed, as shown in FIG. 15, by the CPS unit ID.

6. Subsequently Generated/Obtained Data Management Structure Based on Settings of Subsequently Generated/Obtained Data Management Files When, for example, a PC, reads content from an information recording medium having a structure based on CPS management units to play back the read content, or to generate, obtain, or store subsequently generated/obtained data described above, a predetermined licensed program is used. In information processing apparatuses other than playback-only device, for example, in PCs, various application programs are stored. In storage units, such as hard disks or removable memory devices, files that can be used by various applications stored in PCs are stored, and it is possible that those files be accessed from applications stored in PCs unless specific restriction is imposed.

Accordingly, if files storing subsequently generated/obtained data associated with CPS units described above are stored in a directory set by a general-purpose file system, such as a file allocation table (FAT) or a new technology file system (NTFS), used in PCs, they can be accessed from various applications, which leads to the unauthorized use or tampering of subsequently generated/obtained data. Since AV streams contained in subsequently generated/obtained data that belongs to CPS units are encrypted, as discussed above, access to such AV streams from other applications can be prevented.

More specifically, to play back AV stream data of, for example, the subsequently generated/obtained data [01002.m2ts] 711 and [01003.m2ts] 712 shown in FIG. 11, the following processing is necessary. The AV stream data is encrypted and recorded, and a CPS unit key is obtained according to a predetermined procedure to decrypt the encrypted data by using the obtained CPS unit key. This processing can be executed only by a licensed program, and thus, the unauthorized use of AV streams can be prevented.

However, subsequently generated/obtained data may include, not only AV stream data, but also files, such as title index files, movie object files, playlist files, and clip information files. If those files are managed by a general-purpose file system used by PCs, it is more preferable that the files be accessed only by a licensed program, such as an authorized licensed playback application that is allowed to use the corresponding CPS units, to reject the use of the files by other application programs.

That is, by rejecting access to AV stream data and files, such as title index files, movie object files, playlist files, and clip information files, which are managed as CPS units, from various applications operating on a PC, the tampering of data can be prevented. Files other than AV streams, such as title index files, movie object files, playlist files, and clip information files, are collectively referred to as "navigation files".

Figure 16:
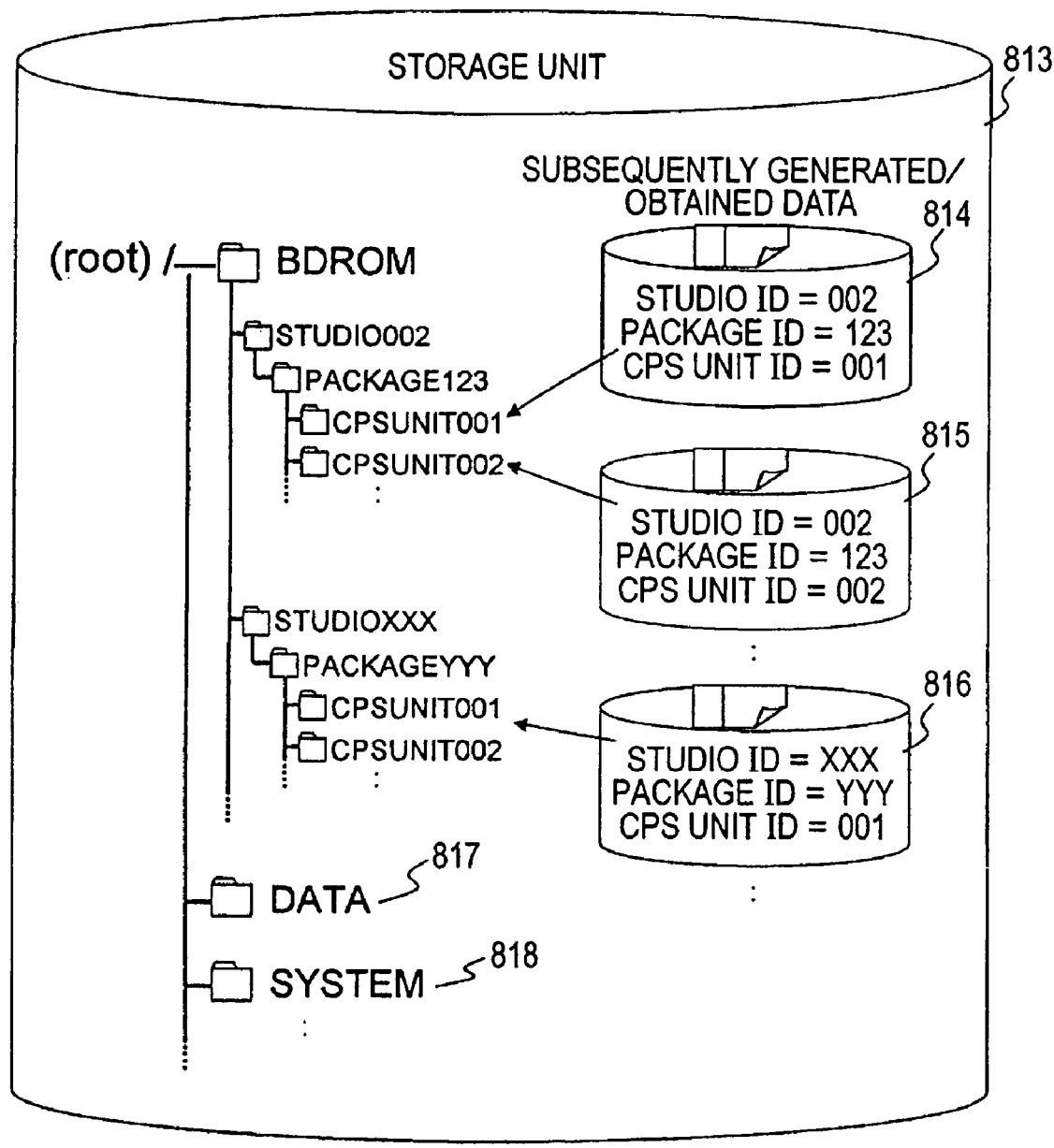
FIG. 16 illustrates the storage structure of data subsequently generated/obtained by an information processing apparatus.

FIG. 16 illustrates an example in which a system file 818, a data file 817 used by various applications, and subsequently generated/obtained data files 814, 815, and 816 corresponding to CPS units are stored in a directory which is set by a general-purpose file system used in, for example, a PC.

In a storage unit 813 shown in FIG. 16, which corresponds to a hard disk of, for example, a PC, the directory including the system file 818 and the data file 817 used by various application programs is set. The storage unit 813 is not restricted to a hard disk, but may be a data writable area of an information recording medium storing subsequently generated/obtained data, or an external storage unit, such as a removable memory. The directory set in the storage unit 813 also includes the subsequently generated/obtained data files 814, 815, and 816 corresponding to CPS units. The subsequently generated/obtained data files 814, 815, and 816 are files associated with the studio IDs, package IDs, and CPS unit IDs, as stated with reference to FIG. 13. Volume IDs, which are predetermined manufacturing units of information recording media as package IDs, may be used.

If the subsequently generated/obtained data 814 through 186 to be managed as CPS units are set in a general-purpose file system, as shown in FIG. 16, it is possible that the subsequently generated/obtained data 814 through 816 be accessed or changed by application programs other than licensed programs that are allowed to use the CPS units. A description is given of a plurality of examples of the configurations that allow the use of subsequently generated/obtained data only by licensed programs even when the subsequently generated/obtained data is set in a directory together with various data files and system files.

A description is first given, with reference to FIG. 17, of an example of setting a subsequently generated/obtained data management file. The entire subsequently generated/obtained data corresponding to CPS units (content management units) stored in a storage unit is integrated into a single subsequently generated/obtained data management file. Then, the subsequently generated/obtained data management file is encrypted, and hash values are generated based on the subsequently generated/obtained data management file to prevent tampering of the data and to conduct verification of the data, and are then recorded.

Figure 17:
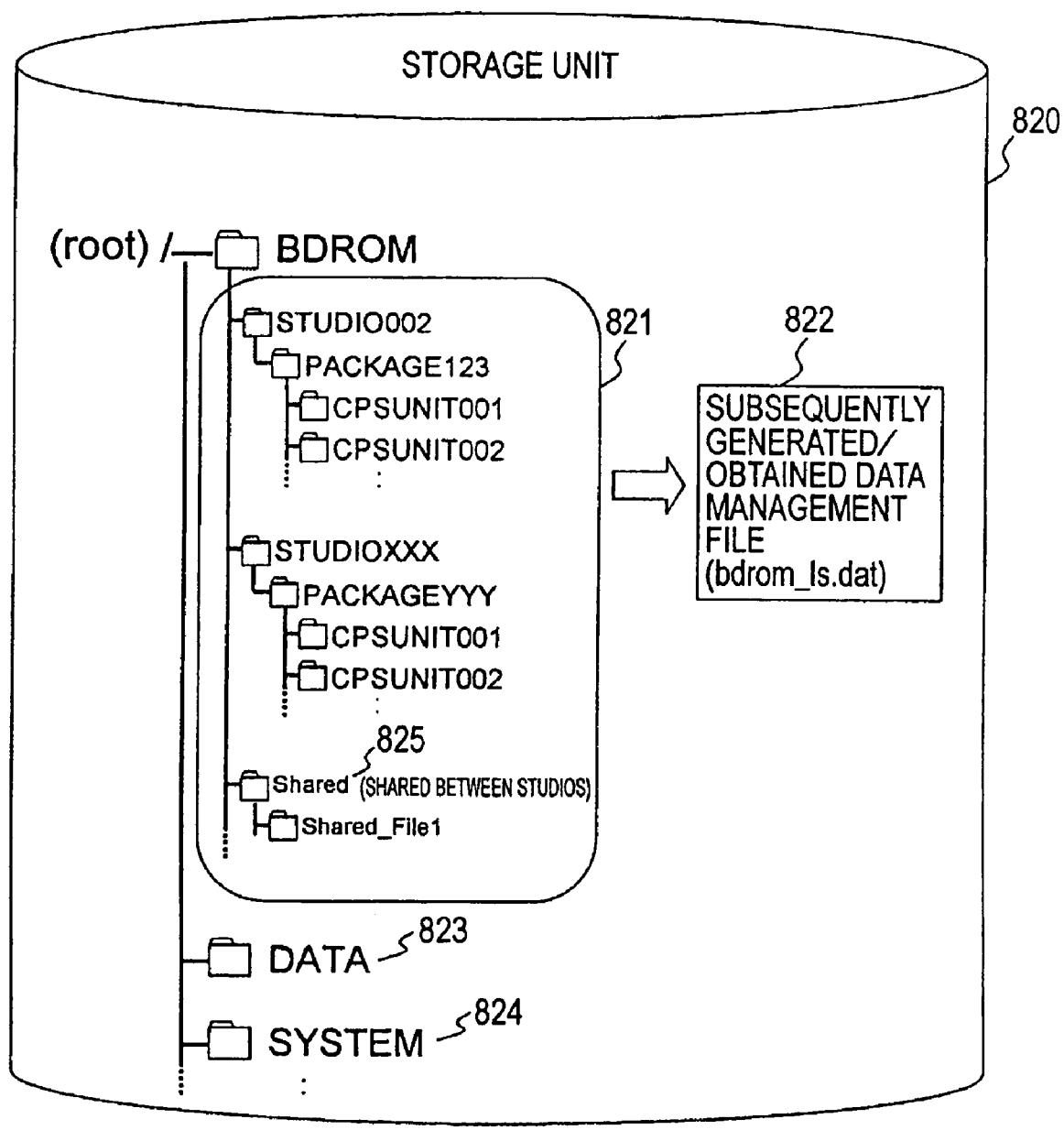
FIG. 17 illustrates an example of setting a subsequently generated/obtained data management file for the entire data subsequently generated/obtained by an information processing apparatus.

A storage unit 820 shown in FIG. 17 is, for example, a hard disk contained in an information processing apparatus, such as a PC, a removable memory, or a data writable information recording medium, that can store subsequently generated/obtained data. In the storage unit 820, a directory managed by a general-purpose file system is set, and a system file 824 used by the information processing apparatus and a data file 823 that can be used by various application programs executed by the information processing apparatus are stored in this directory.

In the directory, a subsequently generated/obtained data file group 821 storing subsequently generated/obtained data to be managed based on CPS units (such data is sometimes simply referred to as "CPS-unit data") is also set. The subsequently generated/obtained data file group 821 includes, not only AV stream data managed as CPS units, but also navigation files, such as title index files, movie object files, playlist files, and clip information files. More specifically, the subsequently generated/obtained data includes game score data or character data generated when using the CPS unit management content stored in an information recording medium, such as a ROM disc, or data generated afterwards, such as user information, or data obtained from an external server. The navigation files storing, for example, playback control information, also include program information and clip information generated afterwards. An example of the configuration that allows only licensed programs to access such various subsequently generated/obtained data is shown in FIG. 17.

In the example shown in FIG. 17, the subsequently generated/obtained data file group 821 including all subsequently generated/obtained data to be managed as CPS units is set as a single file (i.e., the subsequently generated/obtained data management file [bdrom_ls.dat] 822). The subsequently generated/obtained data management file 822 is encrypted, and also, hash values are generated for preventing tampering of the data and conducting verification of the data and are set in the directory together with the subsequently generated/obtained data management file 822.

It is preferable that a cryptographic key used for encryption processing be generated or obtained only by licensed application programs that process CPS unit management data. That is, information that can be obtained only by licensed programs is set as the cryptographic key, or a cryptographic key is generated based on restricted information described above. The information that can be obtained only by licensed programs includes a device ID. The device ID is set as the cryptographic key, or a cryptographic key is generated based on the device ID.

The device ID is the ID that can be set for licensed programs. For example, the device ID is generated based on identification information that is set in hardware as a device into which a licensed program allowed to process CPS units is legally installed. The device ID can be obtained only by licensed programs that have been installed legally.

Accordingly, in a PC into which various application software programs are installed, the acquisition of the device ID or the generation of the cryptographic key by applications other than licensed applications can be prevented. If subsequently generated/obtained data is generated or obtained by executing a licensed program, the licensed program obtains the device ID to generate a cryptographic key according to a cryptographic key generation algorithm, such as an advanced encryption standard (AES) cryptographic key generation algorithm, and encrypts the subsequently generated/obtained data management file 822 including AV stream data files and navigation files, such as title index files, movie object files, playlist files, and clip information files, and stores the encrypted subsequently generated/obtained data management file 822 in the storage unit 820.

To use the subsequently generated/obtained data management file 822, the device ID is obtained based on a licensed program, and a cryptographic key is generated, and then, the encrypted file is decrypted with the generated cryptographic key.

To prevent the tampering of data in the subsequently generated/obtained data management file 822 and to conduct verification of the subsequently generated/obtained data management file 822, hash values are calculated for the entire subsequently generated/obtained data management file 822. Alternatively, the management file 822 is divided into portions having a specific size (for example, 64 KB), and hash values are calculated for each portion of the management file 822. The generated hash values are then encrypted with the above-described cryptographic key and are then stored. The calculation and encryption of hash values are also executed only by licensed programs.

As in the cryptographic key for encrypting the file 822, the hash values are encrypted by using the device ID or the cryptographic key generated based on the device ID.

To use the subsequently generated/obtained data management file 822, the hash values obtained by decrypting the encrypted hash values are verified against the hash value recalculated based on the subsequently generated/obtained data management file 822, and only when the two hash values coincide with each other, is the verification of the file 822 proved. The use of the file 822 and the subsequently generated/obtained files and data are allowed on the condition that the file 822 has not been tampered with. The above-described processing is also executed only by licensed programs.

As shown in FIG. 17, all subsequently generated/obtained data (i.e., not only AV stream data managed as CPS units, but also navigation files, such as title index files, movie object files, playlist files) and clip information files, can be integrated into the subsequently generated/obtained data management file 822. Accordingly, data set for content corresponding to different CPS units or different studios, for example, content guidance data, can be integrated into the subsequently generated/obtained data management file 822. An example of such data is a shared file 825, which is different from AV stream data, title indexes, movie objects, playlist files, and clip information files that are defined as CPS unit data. As discussed above, not only data defined by CPS unit files, but also data other than CPS unit files, can be accessed only by licensed programs.

Figure 18:
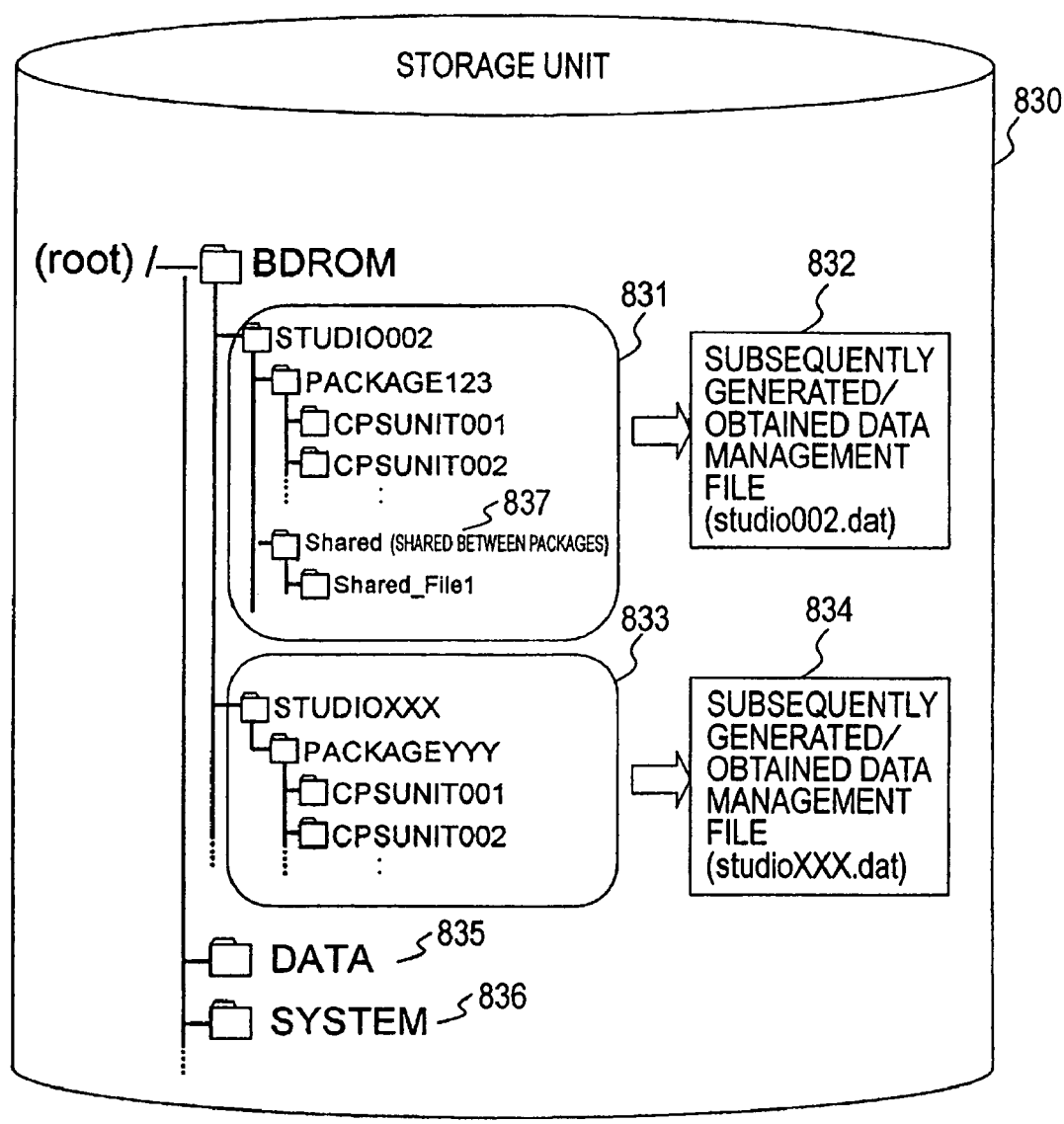
FIG. 18 illustrates an example of setting studio-based subsequently generated/obtained data management files for data subsequently generated/obtained by an information processing apparatus.

A description is given below, with reference to FIG. 18, of another example of setting subsequently generated/obtained data management files. Subsequently generated/obtained data corresponding to CPS units stored in a storage unit are divided on the basis of studios. Then, a subsequently generated/obtained data management file is set for subsequently generated/obtained data for each studio. Each studio-based subsequently generated/obtained data management file is then encrypted, and hash values are generated for each studio-based subsequently generated/obtained data management file. The studio is an entity for providing CPS unit content, such as AV streams or navigation files. The original data provided by each studio is content that has been recorded in an information recording medium, such as a ROM disc, and has been set as CPS units. The data stored in a storage unit 830 shown in FIG. 18 is data obtained from a studio-managing or studio-related server afterwards or data generated in the information processing apparatus. In the example shown in FIG. 18, the studio-based subsequently generated/obtained data management files are set for subsequently generated/obtained data generated or obtained by the information processing apparatus.

The information processing apparatus individually encrypts the studio-based subsequently generated/obtained data management files and also generates hash values for each studio-based subsequently generated/obtained data file to prevent tampering of the data and to conduct verification of the data, and records the generated hash values. The storage unit 830 shown in FIG. 18 is a storage unit that can record subsequently generated/obtained data therein, such as a hard disk contained in the information processing apparatus, for example, a PC, a removable memory, or a data writable information recording medium. As discussed with reference to FIG. 17, a directory managed by a general-purpose file system is set in the storage unit 830, and a system file 836 used by the information processing apparatus and a data file 835 used by various application programs by the information processing apparatus are set in the directory.

In this directory, subsequently generated/obtained data files storing CPS-unit subsequently generated/obtained data are also set. In this example, the subsequently generated/obtained data files are divided into studio-based subsequently generated/obtained data file groups 831 and 833. The studio-based subsequently generated/obtained data file group 831 is a file group for subsequently generated/obtained data associated with the studio ID [002], and the studio-based subsequently generated/obtained data file group 833 is a file group for subsequently generated/obtained data associated with the studio ID [XXX]. The subsequently generated/obtained data file groups 831 and 833 include, not only AV stream data managed as CPS units, but also navigation files, such as title index files, movie object files, playlist files, and clip information files.

In the example shown in FIG. 18, subsequently generated/obtained data to be managed as CPS units are divided on the basis of studios, and the studio-based subsequently generated/obtained data file group 831 is integrated into a subsequently generated/obtained data management file [studio002.dat] 832, and the studio-based subsequently generated/obtained data file group 833 is integrated into a subsequently generated/obtained data management file [studioXXX.dat] 834. In FIG. 18, only two studio-based subsequently generated/obtained data management files are shown. In actuality, however, the same number of subsequently generated/obtained data management files as the number of studios are set. The subsequently generated/obtained data management files 832 and 834 are individually encrypted, and then, hash values are set for each subsequently generated/obtained data management file 832 or 834 for preventing tampering of the data and conducting verification of the data, and are recorded in the directory.

As in the example discussed with reference to FIG. 17, it is preferable that a cryptographic key used for encryption be generated or obtained only by licensed application programs that are allowed to process CPS management data. The device ID is set as the cryptographic key, or a cryptographic key is generated based on the device ID. The device ID can be obtained only by licensed programs that are allowed to process CPS units. With this configuration, in an information processing apparatus, such as a PC, into which various application software programs are installed, the acquisition of the device ID or the generation of the cryptographic key by application programs other than licensed programs can be prevented.

The studio-based subsequently generated/obtained data management files 832 and 834 may be encrypted with the common cryptographic key generated by the single device ID. Alternatively, the cryptographic key may be generated by a combination of the studio ID corresponding to the subsequently generated/obtained data management file and the device ID.

More specifically, different cryptographic keys are generated for the studio-based subsequently generated/obtained data management files 832 and 834, and the management files 832 and 834 are encrypted with the different cryptographic keys. For example, since the studio-based subsequently generated/obtained data management file 832 is an encrypted management file for a file group associated with the studio ID [002], the cryptographic key is generated by inputting two items of ID information, such as the device ID and the studio ID [002], to encrypt the management file 832. Also, since the studio-based subsequently generated/obtained data management file 834 is an encrypted management file for a file group associated with the studio ID [XXX], the cryptographic key is generated by inputting two items of ID information, such as the device ID and the studio ID [XXX], to encrypt the management file 834. In this manner, the studio-based subsequently generated/obtained data management files may be encrypted with different cryptographic keys.

If subsequently generated/obtained data is generated or obtained by executing a licensed program, the licensed program obtains the device ID or a combination of the device ID and the studio ID corresponding to the subsequently generated/obtained data to generate a cryptographic key according to a cryptographic key generation algorithm, such as an AES cryptographic key generation algorithm. Then, the licensed program encrypts the subsequently generated/obtained data management file 832 or 834 including AV stream data files associated with a specific studio and navigation files, such as title index files, movie object files, playlist files, and clip information files, and stores the encrypted subsequently generated/obtained data management file 832 or 834 in the storage unit 830.

To use the studio-based subsequently generated/obtained data management file 832 or 834, the device ID or a combination of the device ID and the studio ID is obtained based on the licensed program, and the cryptographic key is generated based on the device ID or the device ID and the studio ID, and then, the encrypted file 832 or 834 is decrypted by using the generated cryptographic key.

To prevent the tampering of data in the subsequently generated/obtained data management file 832 or 834 and to conduct verification of the subsequently generated/obtained data management file 832 or 834, hash values are calculated for the entire subsequently generated/obtained data management file 832 or 834. Alternatively, the subsequently generated/obtained data management file 832 or 834 is divided into portions having a specific size (for example, 64 KB), and hash values are generated for each divided portion. The generated hash values are then encrypted with the above-described cryptographic key and are stored together with the subsequently generated/obtained data. The calculation and encryption of hash values are also executed only by licensed programs.

As in the cryptographic key for encrypting the management files 832 and 834, the hash values are encrypted by the cryptographic key generated based on the device ID or a combination of the device ID and the studio ID.

To use the subsequently generated/obtained data management file 832 or 834, the hash values obtained by decrypting the encrypted hash values are verified against the hash value recalculated based on the subsequently generated/obtained data management file 832 or 834, and only when the two hash values coincide with each other, is the verification of the file 832 or 834 proved. The use of the file 832 or 834 or the subsequently generated/obtained files or data is allowed on the condition that the file 832 or 834 has not been tampered with. The above-described processing is also executed only by licensed programs.

As shown in FIG. 18, studio-based subsequently generated/obtained data (i.e., not only AV stream data managed as CPS units, but also navigation files, such as title index files, movie object files, playlist files, and clip information files) can be integrated into the subsequently generated/obtained data management file 832 or 834. Accordingly, for example, studio content guidance data can be managed on the basis of the studios by being integrated into the subsequently generated/obtained data management file 832 or 834. An example of such data is a shared file 837, which is different from AV stream data, title indexes, movie objects, playlist files, and clip information files that are defined as CPS unit data. As discussed above, not only data defined by CPS unit files, but also data other than CPS unit files, can be managed on the basis of the studios and can be accessed only by licensed programs.

In this configuration, subsequently generated/obtained data generated or obtained for CPS management units belonging to different packages, such as different items of content or different information recording media, for example, different ROM discs, can also be integrated into a single subsequently generated/obtained data management file as long as such subsequently generated/obtained data is associated with the same studio.

If the studio ID is used as information for generating a cryptographic key, it is necessary to identify which studio ID has been used for generating the cryptographic key for the subsequently generated/obtained data set in the directory. The studio ID used for generating the cryptographic key for the subsequently generated/obtained data may be directly used as the directory name or the file name. In this case, however, the studio name may be disclosed when the content is played back, and the information for generating the cryptographic key may be estimated based on the disclosed data. To avoid this situation, it is preferable that predetermined numbers or random numbers be assigned to the directory name or the file name, and the association between the information for generating the cryptographic keys, such as the studio IDs, and the files be stored as a separate table.

A description is given below, with reference to FIG. 19, another example of setting subsequently generated/obtained data management files. CPS-unit subsequently generated/obtained data are divided on the basis of packages, and then, a subsequently generated/obtained data management file is set for each package-based subsequently generated/obtained data. The subsequently generated/obtained data management file is then encrypted, and hash values are generated for each subsequently generated/obtained data management file. The package is the manufacturing unit for an information storage medium, such as a ROM disc, storing CPS unit content, and the package ID is assigned to each predetermined manufacturing unit. Content items provided by the same studio (content providing entity) are distinguished by different packages IDs. More specifically, for example, package ID 123 is set for a ROM disc storing content a edited by studio A, and package ID 456 is set for a ROM disc storing content b edited by the same studio A.

Figure 19:
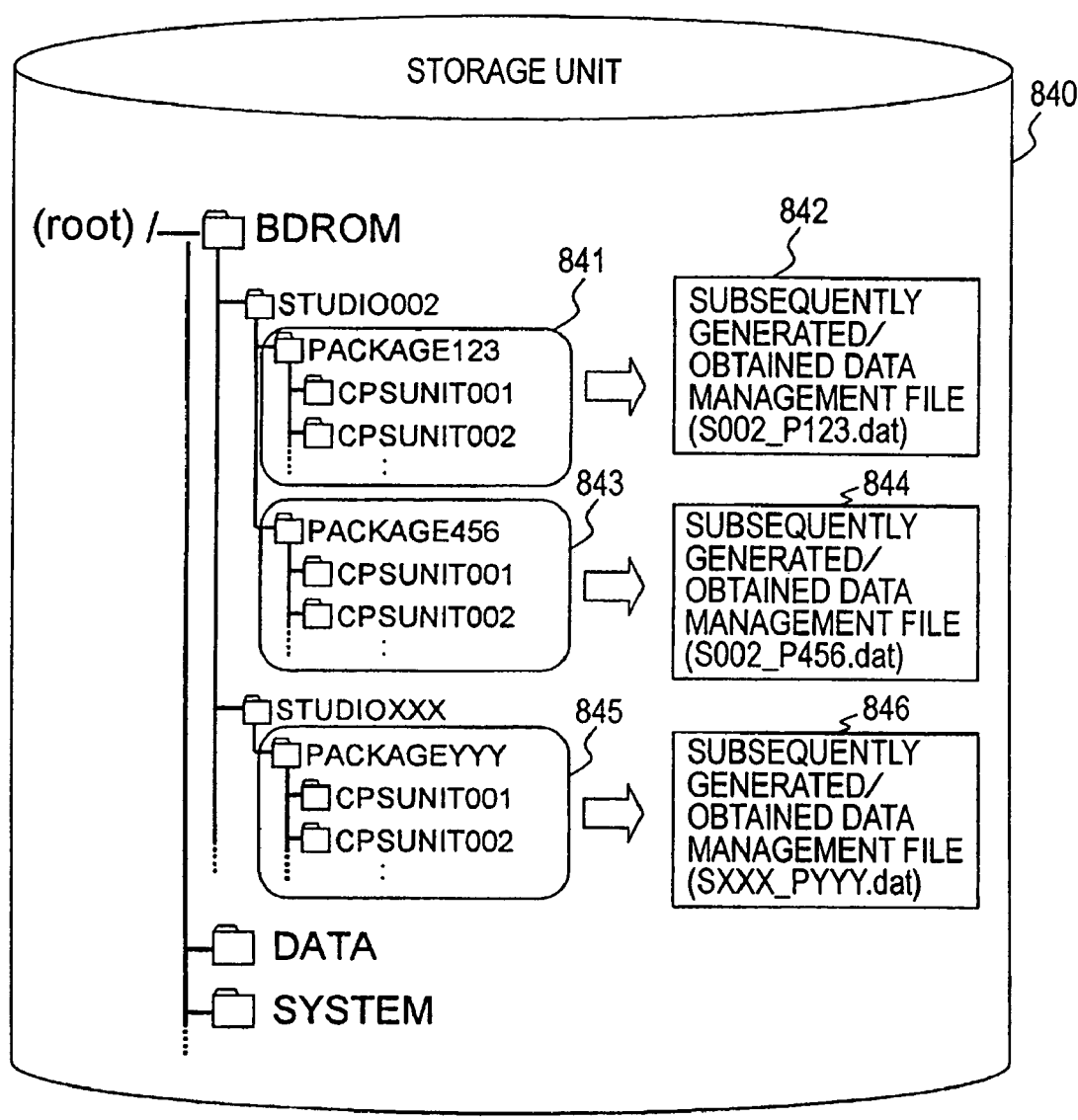
FIG. 19 illustrates an example of setting package-based subsequently generated/obtained data management files for data subsequently generated/obtained by an information processing apparatus.

As in the examples shown in FIGS. 17 and 18, a storage unit 840 shown in FIG. 19 is a storage unit, such as a hard disk, a removable memory, or a data writable information recording medium, that can store subsequently generated/obtained data. In a directory managed by a general-purpose file system, a system file or a data file used by various application programs by the information processing apparatus are set.

In this directory, subsequently generated/obtained data files containing CPS-unit subsequently generated/obtained data are also set. In this example, the subsequently generated/obtained data files are divided into package-based subsequently generated/obtained data file groups 841, 843, and 845 on the basis of the packages, the packages being a unit smaller than the studios. The package-based subsequently generated/obtained data file group 841 is a file group for subsequently generated/obtained data having package ID 123. The package-based subsequently generated/obtained data file group 843 is a file group for subsequently generated/obtained data having package ID 456. The package-based subsequently generated/obtained data file group 845 is a file group for subsequently generated/obtained data having package ID YYY. The package-based subsequently generated/obtained data file groups 841, 843, and 845 include, not only AV stream data managed as CPS units, but also navigation files, such as title index files, movie object files, playlist files, and clip information files.

In the example shown in FIG. 19, subsequently generated/obtained data to be managed as CPS units are divided on the basis of packages. More specifically, a subsequently generated/obtained data management file [S002_P123.dat] 842 is set for the package-based subsequently generated/obtained data file group 841. A subsequently generated/obtained data management file [S002_P456.dat] 844 is set for the package-based subsequently generated/obtained data file group 843. A subsequently generated/obtained data management file [SXXX_PYYY.dat] 846 is set for the package-based subsequently generated/obtained data file group 845. In FIG. 19, only three subsequently generated/obtained data management files are shown. In actuality, however, the same number of subsequently generated/obtained data management files as the number of packages are set. The package-based subsequently generated/obtained data management files 842, 844, and 846 are individually encrypted, and hash values are generated for preventing the tampering of data and conducting verification of the data and are set in the directory.

As discussed above with reference to FIGS. 17 and 18, it is preferable that a cryptographic key used for encryption be generated or obtained only by licensed application programs that are allowed to process CPS unit management data. The device ID is set as the cryptographic key, or a cryptographic key is generated based on the device ID. As stated above, the device ID can be obtained only by licensed programs that are allowed to process CPS units. With this configuration, in an information processing apparatus, such as in a PC, into which various application software programs are installed, the acquisition of the device ID or the generation of the cryptographic key by application programs other than licensed programs can be prevented.

The package-based subsequently generated/obtained data management files 842, 844, and 846 shown in FIG. 19 may be encrypted with the common cryptographic key generated by using the device ID. Alternatively, the management file 842, 844, or 846 may be encrypted with the cryptographic key generated by a combination of the device ID and at least one of the package ID corresponding to the subsequently generated/obtained data management file and the studio ID.

That is, different cryptographic keys are generated for the package-based subsequently generated/obtained data management files 842, 844, and 846, and the management files 842, 844, and 846 are encrypted with the different cryptographic keys. More specifically, the package-based subsequently generated/obtained data management file 842 is set as an encrypted file for subsequently generated/obtained data files having the package ID 123 and the studio ID 002. Accordingly, the cryptographic key is generated by inputting three items of ID information, such as the device ID, the package ID 123, and the studio ID 002, to encrypt the package-based subsequently generated/obtained data management file 842.

The package-based subsequently generated/obtained data management file 844 is set as an encrypted file for subsequently generated/obtained data files having the package ID 456 and the studio ID 002. Accordingly, the cryptographic key is generated by inputting three items of ID information, such as the device ID, the package ID 456, and the studio ID 002, to encrypt the package-based subsequently generated/obtained data management file 844. The package-based subsequently generated/obtained data management file 846 is set as an encrypted file for subsequently generated/obtained data files having the package ID YYY and the studio ID XXX. Accordingly, the cryptographic key is generated by inputting three items of ID information, such as the device ID, the package ID YYY, and the studio ID XXX, to encrypt the package-based subsequently generated/obtained data management file 846. In this manner, package-based subsequently generated/obtained data management files can be encrypted with different cryptographic keys.

If subsequently generated/obtained data is generated or obtained by executing a licensed program, the licensed program obtains the device ID or a combination of the device ID and at least one of the package ID corresponding to the subsequently generated/obtained data and the studio ID to generate a cryptographic key according to a cryptographic key generation algorithm, such as an AES cryptographic key generation algorithm. Then, the licensed program encrypts the subsequently generated/obtained data management file 842, 844, or 846 including AV stream data files associated with a specific studio, and navigation files, such as title index files, movie object files, playlist files, and clip information files, and stores the encrypted subsequently generated/obtained data management file 842, 844, or 846 in the storage unit 840.

To use the studio-based subsequently generated/obtained data management file 842, 844, or 846, information for generating the cryptographic key (i.e., ID information selected from the device ID, the studio ID, and the package ID) is obtained based on a licensed program, and the cryptographic key is generated based on the ID information, and then, the encrypted file 841, 843, or 845 is decrypted by using the generated cryptographic key.

To prevent the tampering of data in the subsequently generated/obtained data management file 842, 844, or 846 and to conduct verification of the subsequently generated/obtained data management file 842, 844, or 846, hash values are calculated for the entire subsequently generated/obtained data management file 842, 844, or 846. Alternatively, the subsequently generated/obtained data management file 842, 844, or 846 may be divided into portions having a specific size (for example, 64 KB), and hash values are generated for each divided portion. The generated hash values are then encrypted with the above-described cryptographic key and are then stored together with the subsequently generated/obtained data. The calculation and encryption of hash values are also executed only by licensed programs.

As in the cryptographic keys for encrypting the files, the hash values are encrypted with the cryptographic key generated based on the device ID or a combination of the device ID and at least one of the package ID corresponding to the subsequently generated/obtained data and the studio ID.

To use the subsequently generated/obtained data management file 842, 844, or 846, the hash values obtained by decrypting the encrypted hash values are verified against the hash value recalculated based on the subsequently generated/obtained data management file 842, 844, or 846, and only when the two hash values coincide with each other, is the verification of the management file 842, 844, or 846 proved. The use of the management file 842, 844, or 846 or the subsequently generated/obtained files or data is allowed on the condition that the file 842, 844, or 846 has not been tampered with. The above-described processing is also executed only by licensed programs.

If the package ID or the studio ID is used for generating the cryptographic key, it is necessary to identify which package ID or studio ID has been used for generating the cryptographic key for the subsequently generated/obtained data set in the directory. However, as discussed with reference to FIG. 18, if the package ID or the studio ID is directly used as the directory name or the file name, the package ID or the studio ID may be disclosed when the content is played back, and the information for generating the cryptographic key may be estimated based on the disclosed data. To avoid this situation, it is preferable that predetermined numbers or random numbers be assigned to the directory name or the file name, and the association between the information for generating the cryptographic keys, such as the package IDs and the studio IDs, and the files be stored as a separate table.

As the ID set for a predetermined manufacturing unit of information recording media, the volume ID may be used, as well as the package ID. More specifically, subsequently generated/obtained data identified by the volume ID may be integrated into a subsequently generated/obtained data management file, and the cryptographic key may be generated based on the device ID or a combination of the device ID and at least one of the volume ID and the studio ID, and the subsequently generated/obtained data is encrypted with the generated cryptographic key. Then, hash values may also be generated and encrypted. Alternatively, both the volume ID and the package ID may be used for generating the cryptographic key.

Figure 20:
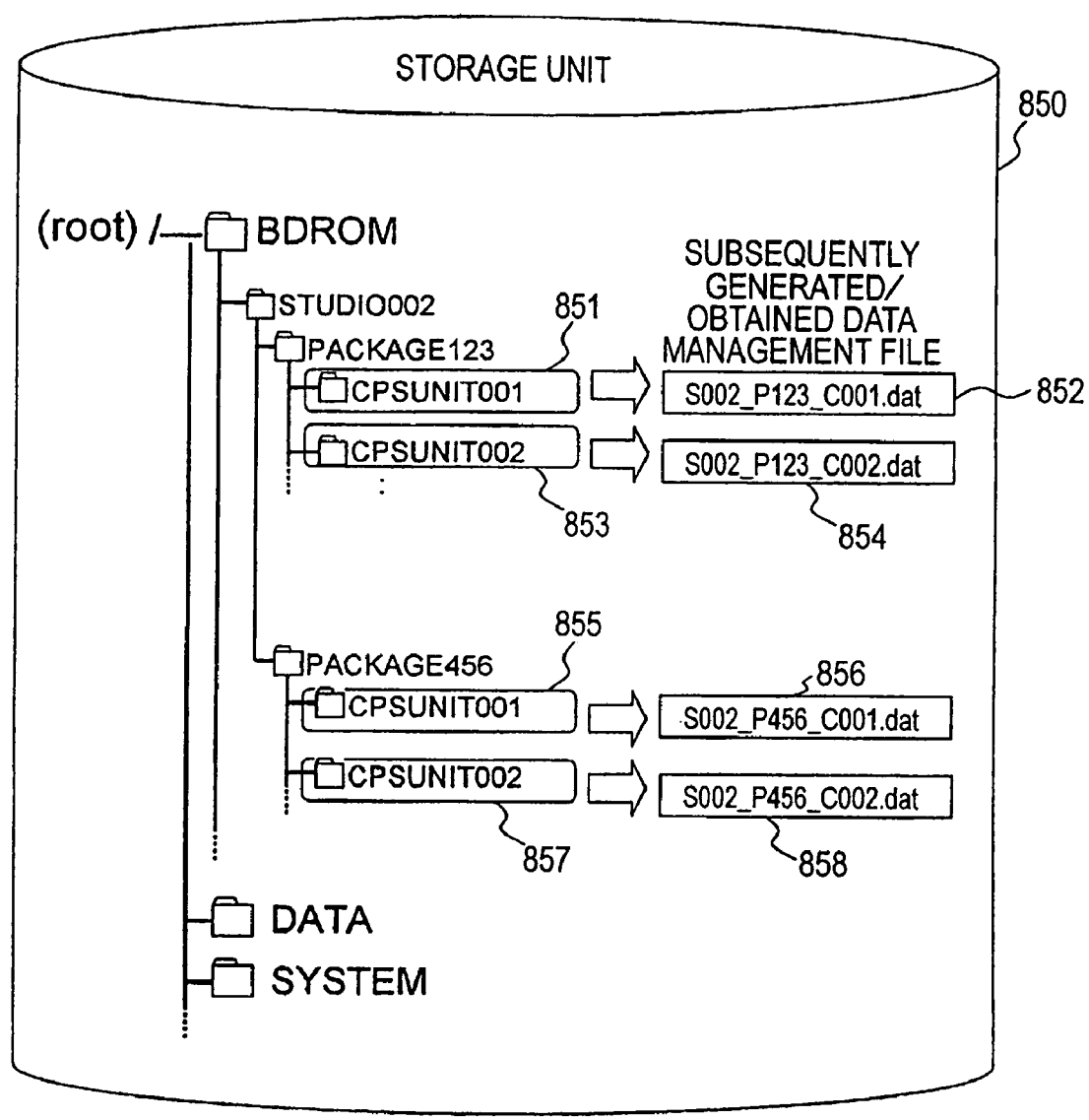
FIG. 20 illustrates an example of setting CPS-unit-based subsequently generated/obtained data management files for data subsequently generated/obtained by an information processing apparatus.

Described below, with reference to FIG. 20, is another example of setting subsequently generated/obtained data management files. A subsequently generated/obtained data management file is set for each CPS unit (content management unit) containing subsequently generated/obtained data stored in a storage unit. Each subsequently generated/obtained data management file is encrypted and hash values are generated for each management file.

As stated above, the subsequently generated/obtained data is generated by using content belonging to a specific CPS unit stored in an information recording medium, such as a ROM disc, by an information processing apparatus, or obtained from an external server. The subsequently generated/obtained data is set in the same CPS unit as that read from the information recording medium or in a new CPS unit, and is then recorded in, for example, a hard disk or an information recording medium.

All subsequently generated/obtained data belong to any of the CPS units. In the example shown in FIG. 20, subsequently generated/obtained data are divided into CPS units, and a subsequently generated/obtained data management file is set for each CPS unit. Then, each management file is encrypted and hash values are generated for each management file.

As in the examples shown in FIGS. 17 through 19, a storage unit 850 shown in FIG. 20 is a storage unit, such as a hard disk, a removable memory, or a data writable information recording medium, that can record subsequently generated/obtained data. In a directory managed by a general-purpose file system, a system file and a data file used by various application programs executed by the information processing apparatus are set.

In this directory, subsequently generated/obtained data files storing subsequently generated/obtained data corresponding to the above-described CPS units are also set. In this example, CPS-unit subsequently generated/obtained data files 851, 853, 855, and 857, which are located in the layer lower than the package, are set as subsequently generated/obtained data management files 852, 854, 856, and 858, respectively. Each of the management files 852, 854, 856, and 858 is encrypted and hash values are generated for each of the management files 852, 854, 856, and 858.

The CPS-unit subsequently generated/obtained data files 851, 853, 855, and 857 include, not only AV stream data managed as CPS units, but also navigation files, such as title index files, movie object files, playlist files, and clip information files.

As in the examples discussed with reference to FIGS. 17 through 19, it is desirable that a cryptographic key used for encryption be generated or obtained only by licensed application programs that are allowed to process CPS management units. The cryptographic key is generated based on the device ID or a combination of the device ID and ID information including at least one of the studio ID, package ID, and volume ID corresponding to the CPS-unit subsequently generated/obtained data file.

Alternatively, instead of using the ID information, the unit key associated with each CPS unit may be used as the cryptographic key. As stated above, the unit key is associated with each CPS unit as the cryptographic key. The CPS unit key may be used as the cryptographic key for each of the subsequently generated/obtained data management files 852, 854, 856, and 858

When subsequently generated/obtained data is generated or obtained by executing a licensed program, the licensed program obtains or generates the above-described cryptographic key (i.e., one of (a) the cryptographic key based on the device ID or a combination of the device ID and at least one of the package ID, volume ID, and studio ID corresponding to subsequently generated/obtained data (such cryptographic key is sometimes referred to as the "device-ID-based key"), and (b) the CPS unit key). Then, the licensed program encrypts a specific subsequently generated/obtained data management file with the cryptographic key according to a cryptographic key generation algorithm, such as an AES cryptographic key generation algorithm, and stores the encrypted file in the storage unit 850. If the CPS unit key is encrypted, the device-ID-based key may be used for decrypting the CPS unit key, and then, the subsequently generated/obtained data management file is encrypted with the decrypted CPS unit key.

To use the subsequently generated/obtained data management file 852, 854, 856, or 858, the cryptographic key is generated or obtained by a licensed program (i.e., (a) the device-ID-based key or (b) the CPS unit key, is obtained, to decrypt the encrypted file). Similarly, if the CPS unit key is encrypted, it is decrypted with the device-ID-based key, and the encrypted file is decrypted based on the decrypted CPS unit key.

To prevent the tampering of data in the subsequently generated/obtained data management file 852, 854, 856, or 858 and to conduct verification of the management file 852, 854, 856, or 858, hash values are calculated for the entire management files 852, 854, 856, or 858. Alternatively, the management file 852, 854, 856, or 858 may be divided into portions having a specific size (for example, 64 KB), and hash values are calculated for each divided portion. The generated hash values are then encrypted with the above-described cryptographic keys and are then stored together with the subsequently generated/obtained data. The calculation and encryption of hash values are also executed only by licensed programs.

As in the cryptographic keys for the files, the hash values are encrypted with one of (a) the device-ID-based key or (b) the CPS unit key. Alternatively, a digital certificate may be used since checking for the authenticity of hash values is sufficient.

To use the subsequently generated/obtained data management file 852, 854, 856, or 858, the hash values obtained by decrypting the encrypted hash values are verified against the hash values recalculated based on the subsequently generated/obtained data management file 852, 854, 856, or 858, and only when the two hash values coincide with each other, is the verification of the management file 852, 854, 856, or 858 proved. The use of the management file 852, 854, 856, or 8586 or the subsequently generated/obtained files or data is allowed on the condition that the file 852, 854, 856, or 858 has not been tampered with. The above-described processing is also executed only by licensed programs.

If the various IDs and CPS unit keys are used as information for generating the cryptographic keys, it is necessary to identify which cryptographic-key generating information is used for generating the cryptographic keys associated with the subsequently generated/obtained data management files. In this case, it is desirable that the association between the cryptographic-key generating information and the files be stored as a separate table.

In FIGS. 17 through 20, the subsequently generated/obtained data management files are set on the basis of (1) the entire subsequently generated/obtained data, (2) studios, (3) packages or volumes, and (4) CPS units, respectively. The subsequently generated/obtained data management files may be set on the basis of a unit other than the above-described four units. For example, a CPS unit may be divided into files, such as AV stream data files, title index files, movie object files, playlist files, and clip information files. Then, each file is encrypted, and hash values are generated for each file.

Instead of using hash values, digital certificate data may be used for preventing data tampering and conducting data verification. Alternatively, data for preventing tampering and conducting verification may be set without encrypting subsequently generated/obtained management files.

As discussed with reference to FIGS. 17 through 19, a subsequently generated/obtained data management file integrating various data files contains various types of data. This makes it necessary for the information processing apparatus to select required data from the subsequently generated/obtained data management file. To enhance the efficiency in selecting required data from the management file, subsequently generated/obtained data search information is set, which is discussed below with reference to FIG. 21.

Figure 21:
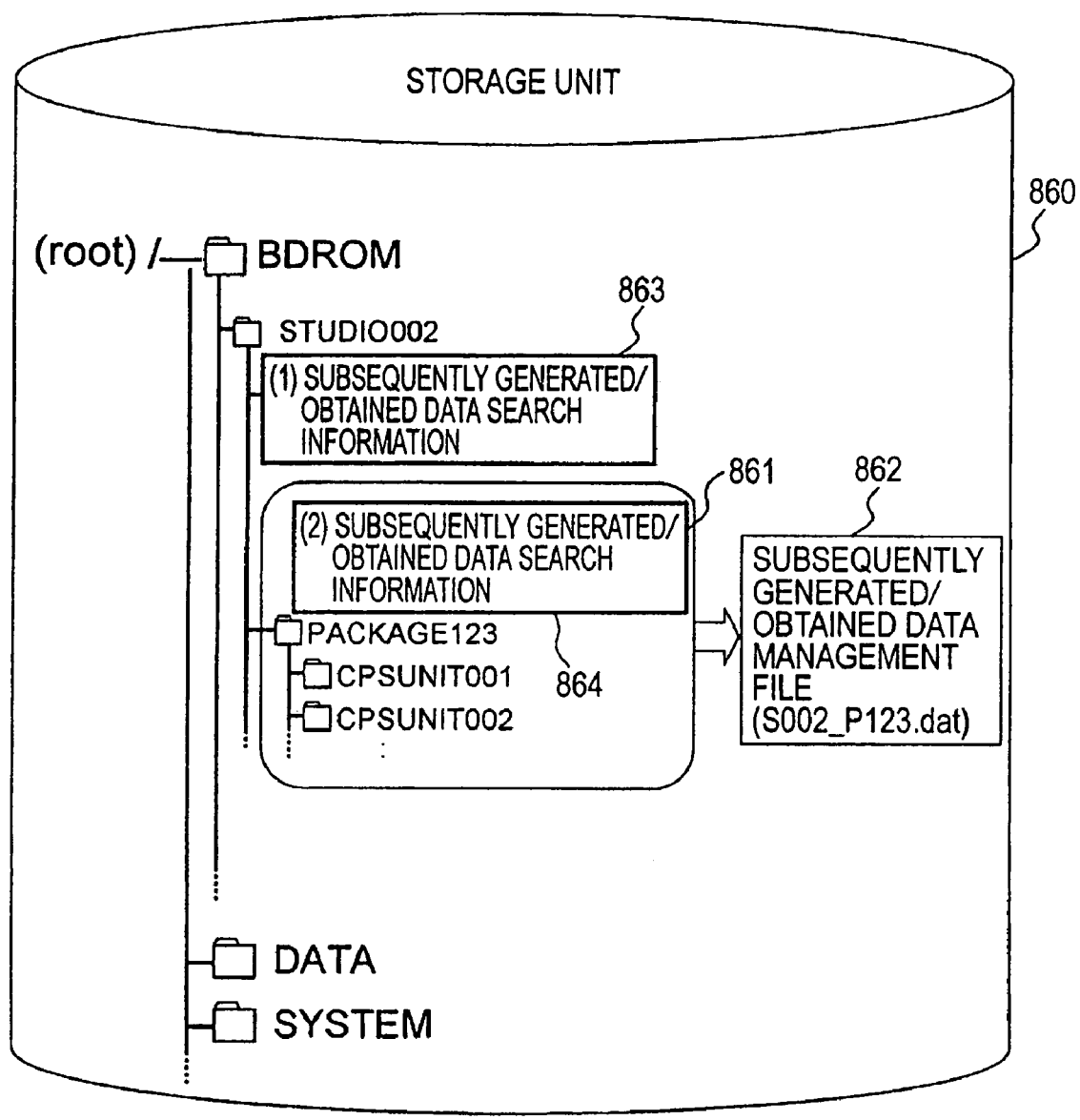
FIG. 21 illustrates an example of setting a subsequently generated/obtained data search information file for data subsequently generated/obtained by an information processing apparatus.

As in the examples shown in FIGS. 17 through 20, a storage unit 860 shown in FIG. 21 includes a directory in which a system file and a data file used by various application programs are set. Subsequently generated/obtained data management files including encrypted subsequently generated/obtained data are set in the storage unit 860. Subsequently generated/obtained data search information blocks 863 and 864 shown in FIG. 21 store information for selecting specific data from the subsequently generated/obtained data management file set in the directory. A subsequently generated/obtained data management file 862 shown in FIG. 21 is a file corresponding to the package-based subsequently generated/obtained data file group 842 shown in FIG. 19 by way of example. Files other than package-based files can also be set and use the subsequently generated/obtained data search information blocks 863 and 864.

Subsequently generated/obtained data search information blocks can be set in the following two modes. In one mode, as the search information block 863, a subsequently generated/obtained data search information block is set in the directory, separately from the subsequently generated/obtained data management file. In the other mode, as the search information block 864, a subsequently generated/obtained data search information block is set in the directory by being contained in the subsequently generated/obtained data management file, for example, as leading data of the subsequently generated/obtained data management file.

Specific examples of the subsequently generated/obtained data search information are discussed below with reference to FIGS. 22A and 22B. FIG. 22A illustrates an example in which a plurality of file data are contained in a subsequently generated/obtained data management file, and FIG. 22B illustrates an example in which single file data is contained in a subsequently generated/obtained data management file.

In the subsequently generated/obtained data search information shown in FIG. 22A, after <directory name="CPS">: directory name=CPS, <file name="Unit_Key_Gen_Value.inf"offset="0"size="4000"/> <file name="CPSUnit003.cci"offset="2"size="640"/> are set as the file name, offset information, and size information of each file.

Then, after <directory name="BDMV">: directory name=BDMV, <file name="index.bdmv"offset="3"size="960"/> <file name="MovieObject.bdmv"offset="4"size="3600"/> are set as the file name, offset information, and size information of each file.

Then, after <directory name="PLAYLIST">: directory name=playlist, <file name="00002.rpls"offset="6"size="8000"/> <file name="00003.rpls"offset="10"size="12000"/> are set as the file name, offset information, and size information of each file.

That is, in the search information shown in FIG. 22A, the directory names, the file names set in each directory, and the offset (i.e., the start position) and the file data size of each file are recorded. When obtaining specific file data from a storage unit (i.e., specific file data stored in a subsequently generated/obtained data management file) the information processing apparatus can refer to the subsequently generated/obtained data search information configured, as shown in FIG. 22A, to easily obtain the corresponding directory, offset, and size information based on the target file name. In this example, the unit of the offset is the sector (2048 bytes) and the unit of the size is the byte.

FIG. 22B illustrates an example of the subsequently generated/obtained data search information in which single file data is contained in a subsequently generated/obtained data management file. In this case, offset information and size information corresponding to each file name are not necessary. To obtain information indicating in which directory a specific file name is set is sufficient, and other information can be obtained from general-purpose file system information. Then, target file data can be obtained.

Other examples of setting subsequently generated/obtained data management files are described below with reference to FIGS. 23 and 24. In the examples shown in FIGS. 23 and 24, subsequently generated/obtained data management files are set on the basis of users. The directory structure shown in FIG. 23 or 24 can be used together with the directory structure shown in one of FIGS. 17 through 21.

Figure 23:
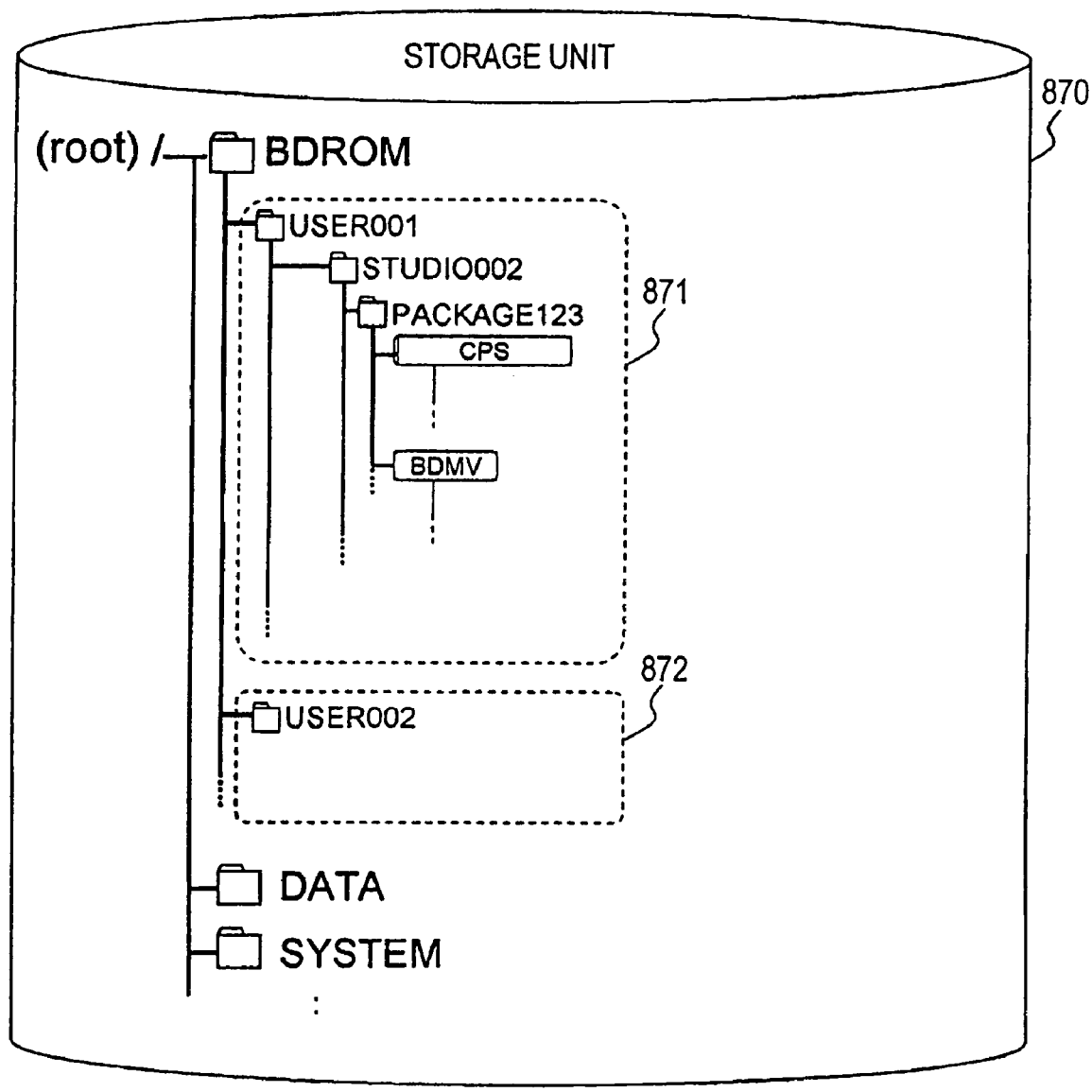
FIG. 23 illustrates an example of setting user directories for data subsequently generated/obtained by an information processing apparatus.

A storage unit 870 shown in FIG. 23 is a storage unit, such as a hard disk, similar to those shown in FIGS. 17 through 21, that can store subsequently generated/obtained data. In the directory structure shown in FIG. 23, user-based directories are set under the BDROM directory, and files related to subsequently generated/obtained data corresponding to each user are set in the corresponding user-based directory.

In FIG. 23, a data portion 871 is a directory storing subsequently generated/obtained data corresponding to user [USER001], and a data portion 872 is a directory storing subsequently generated/obtained data corresponding to user [USER002].

Figure 24:
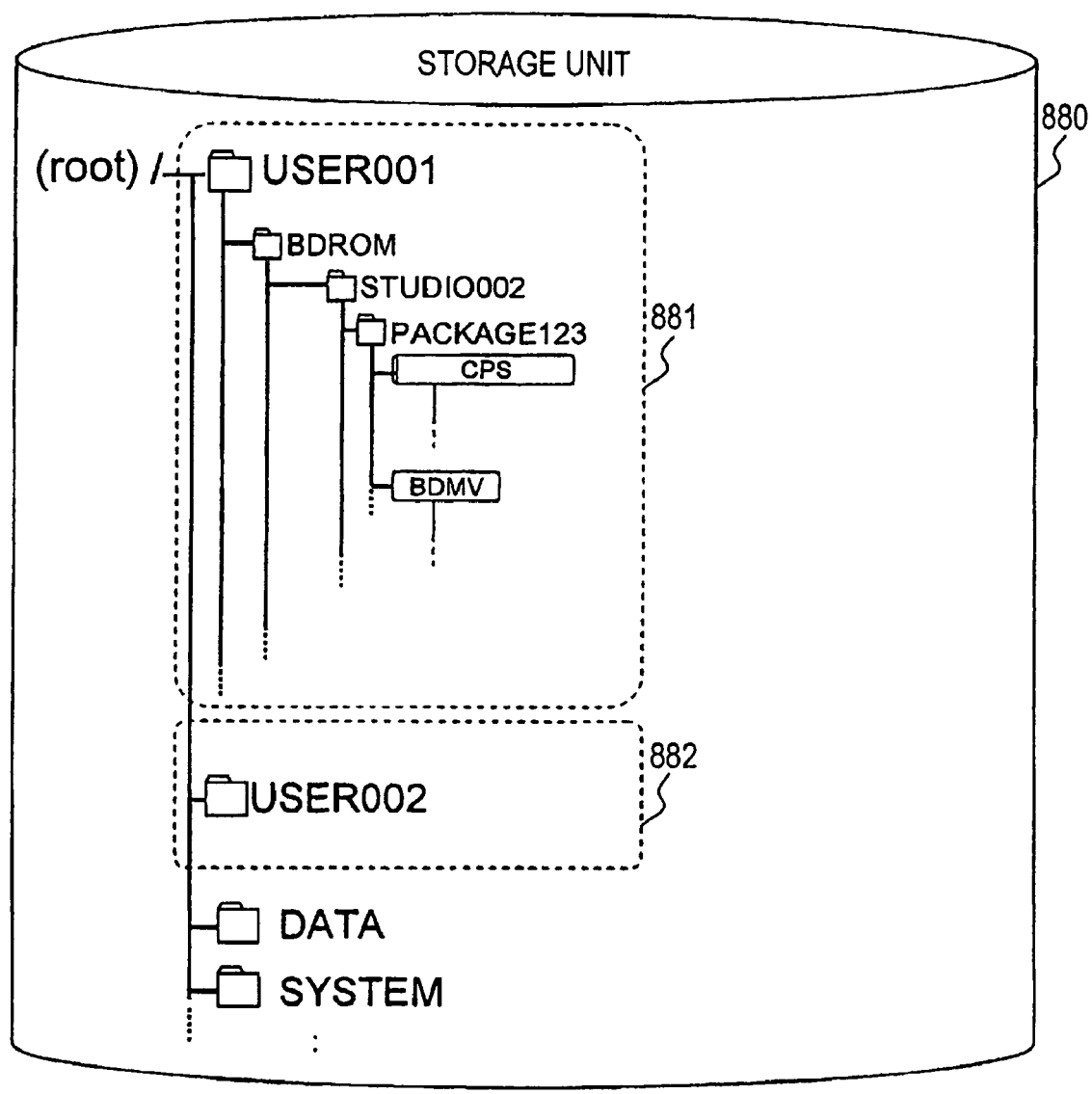
FIG. 24 illustrates an example of setting a CPS-unit-based subsequently generated/obtained data management file for data subsequently generated/obtained by an information processing apparatus.

In FIG. 24, user-based directories are set under a root directory in a storage unit 880 similar to the storage unit 870 shown in FIG. 23. In FIG. 24, a data portion 881 is a directory storing subsequently generated/obtained data corresponding to user [USER001], and a data portion 882 is a directory storing subsequently generated/obtained data corresponding to user [USER002].

By employing such a user-based directory structure, a key associated with a user can be generated and is used for encrypting the corresponding user data. For example, a cryptographic key can be generated based on user unique information, such as a user ID, to allow the user to access only the corresponding data.

The subsequently generated/obtained data management files shown in FIGS. 17 through 21 may be set by using the user-based directory structure shown in FIG. 23 or 24. In this case, user unique information, such as the user ID, may be used as information for generating the cryptographic keys for subsequently generated/obtained data or as information for generating tamper verifying values, such as hash values, or the cryptographic keys for the tamper verifying values.

Figure 25:
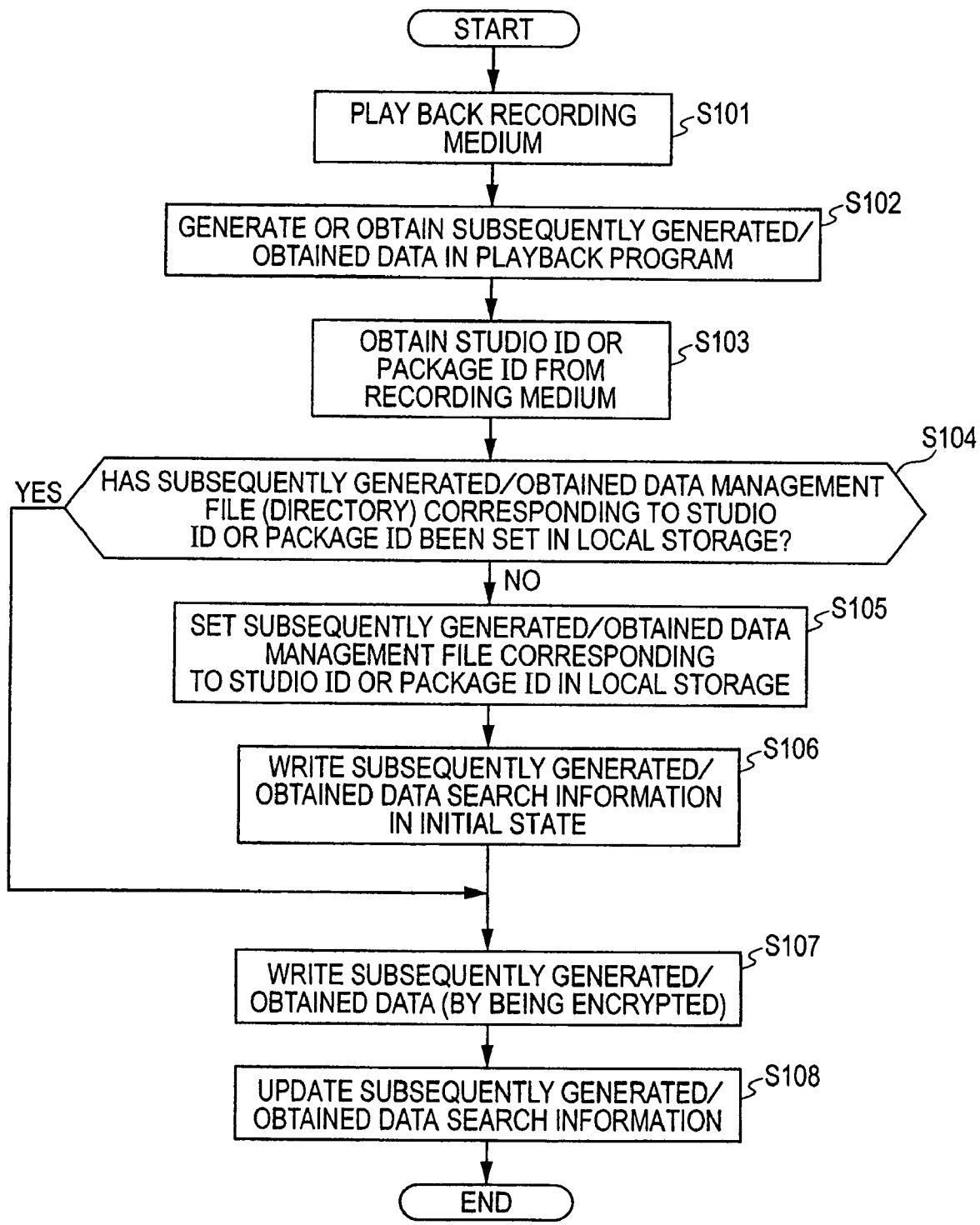
FIG. 25 is a flowchart illustrating a sequence for storing subsequently generated/obtained data.

A description is given below, with reference to the flowchart in FIG. 25, of a sequence for storing subsequently generated/obtained data in an information recording medium, such as a hard disk, by an information processing apparatus according to an embodiment. The information processing apparatus first installs a recording medium, such as a ROM disc, storing CPS management units in the apparatus, and then generates or obtains data while playing back a program or data contained in a CPS management unit.

In step S101, the information processing apparatus installs a recording medium, such as a ROM disc, storing CPS management units, to play back a program or data contained in a CPS management unit. Then, in step S102, the information processing apparatus generates data, for example, score data or character data of a game program, or obtains data, for example, subtitle data or comment data of specific content, from an external server.

In step S103, the information processing apparatus obtains the studio ID or package ID of a CPS unit to be played back (i.e., the CPS unit recorded on the recording medium, such as a ROM disc). Such ID information can be obtained from CPS unit management information stored in the recording medium or from information contained in the currently played back CPS unit.

The information processing apparatus then determines in step S104 whether a subsequent generated/obtained data management file corresponding to the studio ID or the package ID obtained in step S103 has already been set in a local storage in which subsequent generated/obtained data is recorded (i.e., in a hard disk, a removable recording medium, or a data writable area of a partial ROM having a management directory managed by a general-purpose file system, such as those discussed with reference to FIGS. 17 through 21).

If it is found in step S104 that the corresponding management file is not yet set, the process proceeds to step S105. In step S105, the subsequent generated/obtained data management file corresponding to the studio ID or the package ID extracted in step S103 is set in the directory of the local storage. Then, in step S106, information associated with the management file generated in step S105 is written into subsequent generated/obtained data search information, such as that shown in FIG. 21, 22A, or 22B. In this case, information concerning the directory name, file name, offset information, and the data amount (0) is written into the search information in the initial state.

After step S106, or if it is determined in step S104 that the corresponding management file has already been set, the process proceeds to step S107 in which subsequent generated/obtained data is stored in the management file. In this case, the subsequent generated/obtained data management file is stored after being encrypted, and tamper verifying values, such as hash values or a digital certificate, are generated and encrypted. Then, in step S108, based on the data information stored in the management file, the subsequent generated/obtained data search information is updated. The processing is then completed. When encrypting the subsequent generated/obtained data management file, block encryption is performed by using, for example, the 2048-byte-based AES-CBC mode, which enables the decryption of the management file on the basis of blocks.

Figure 26:
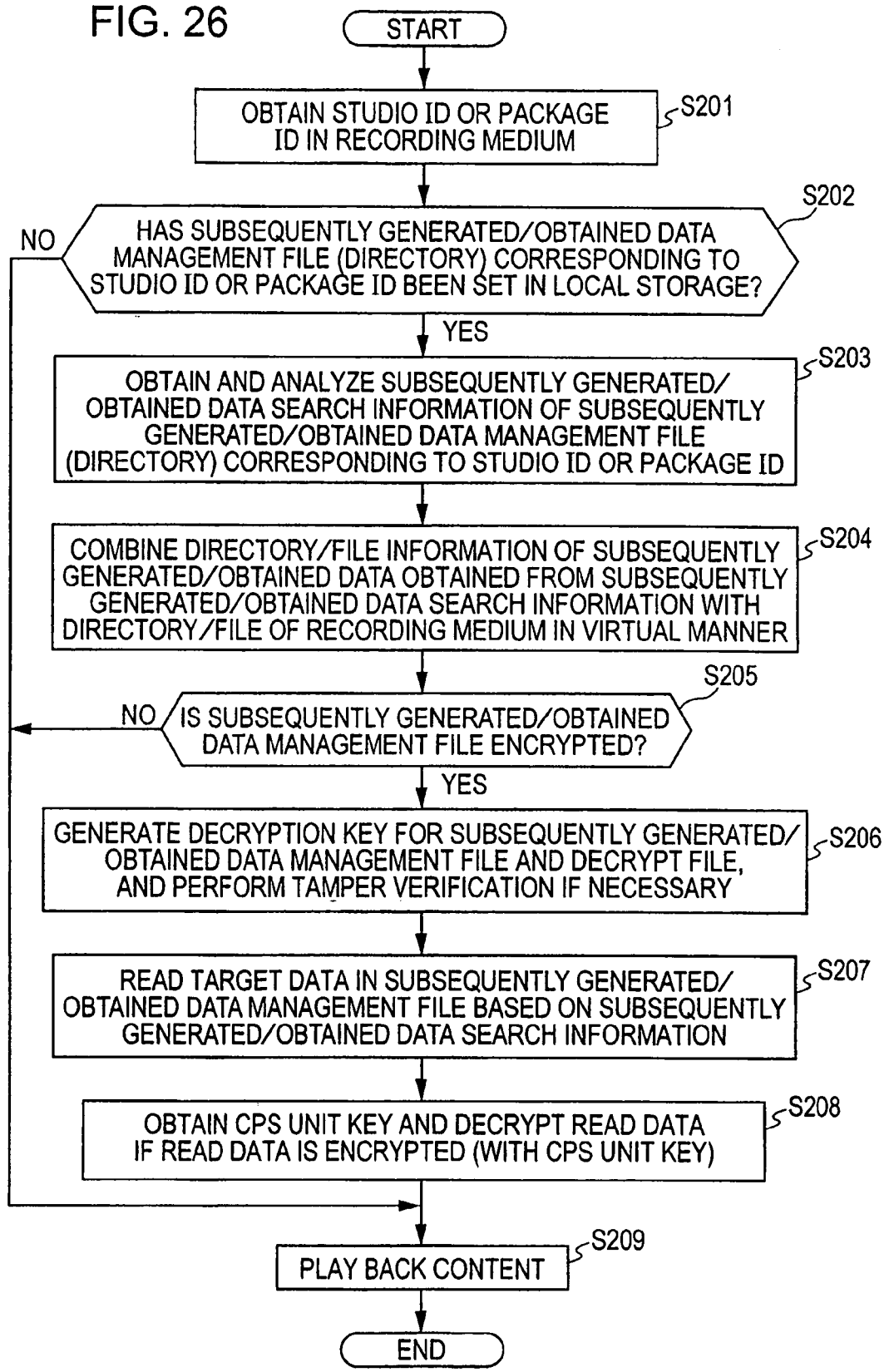
FIG. 26 is a flowchart illustrating a sequence for playing back content using subsequently generated/obtained data.

The sequence for playing back content using subsequent generated/obtained data in the information processing apparatus is now discussed below with reference to the flowchart in FIG. 26.

In step S201, the information processing apparatus first installs a recording medium, such as a ROM disc, storing CPS management units in the apparatus to obtain the studio ID or the package ID associated with a CPS management unit to be played back. Such ID information can be obtained from CPS unit management information stored in the recording medium or from information contained in the currently played back CPS unit.

The information processing apparatus then determines in step S202 whether a subsequently generated/obtained data management file corresponding to the studio ID or the package ID obtained in step S201 has already been set in a local storage in which subsequently generated/obtained data is recorded (i.e., in a hard disk, a removable recording medium, or a data writable of a partial ROM).

If it is found in step S202 that there is no subsequently generated/obtained data management file corresponding to the studio ID or the package ID, the process proceeds to step S209. In step S209, only content stored in the recording medium is played back, in which case, the CPS unit key is obtained and the content is decrypted based on the CPS unit key if necessary.

If it is found in step S202 that the subsequently generated/obtained data management file corresponding to the studio ID or the package ID has been set in the local storage, the process proceeds to step S203. In step S203, the subsequently generated/obtained data search information, such as that discussed with reference to FIG. 21, 22A, or 22B, is obtained from the local storage, and the corresponding subsequently generated/obtained data management file is selected from the search information. Then, in step S204, the directories and files including the management file on the local storage are combined with the directories and files on the recording medium in a virtual manner. In this processing, the data files on the recording medium and the related files on the local storage can be processed as files in the single virtual directory. According to this processing, fast access to files stored in different recording media can be achieved.

It is then determined in step S205 whether the subsequently generated/obtained data management file is encrypted. If the management file is not encrypted, the process proceeds to step S209 in which the content using the unencrypted subsequently generated/obtained data is played back.

If it is found in step S205 that the subsequently generated/obtained data management file is encrypted, the process proceeds to step S206. In step S206, a key for decrypting the encrypted management file is generated, and the management file is decrypted with the generated key. The decryption key can be generated in various modes, as discussed above with reference to FIGS. 17 through 24, and more specifically, the key can be generated based on various IDs, such as the device ID, studio ID, package ID, volume ID, and user ID, according to a key generation algorithm, for example, an AES cryptographic key generation algorithm.

If tamper verifying data, such as hash values or a digital certificate, are added to the subsequently generated/obtained data management file, the integrity of the management file is checked based on the tamper verifying data. If it is found that the management file has been tampered with, the playback processing using the subsequently generated/obtained data management file is terminated. A determination as to whether the playback processing using the management file can be continued is defined in the execution program of a licensed program that is allowed to use CPS unit data.

Then, after decrypting the management file, in step S207, the target data stored in the management file is obtained based on the subsequently generated/obtained data search information. Then, in step S208, if the obtained data is encrypted, it is decrypted. More specifically, if the obtained data is AV data in a CPS unit encrypted with a CPS unit key, the CPS unit key is obtained to decrypt the AV data. Then, in step S209, the content using the subsequently generated/obtained data is played back.

7. Example of Configuration of Information Processing Apparatus

Figure 27:
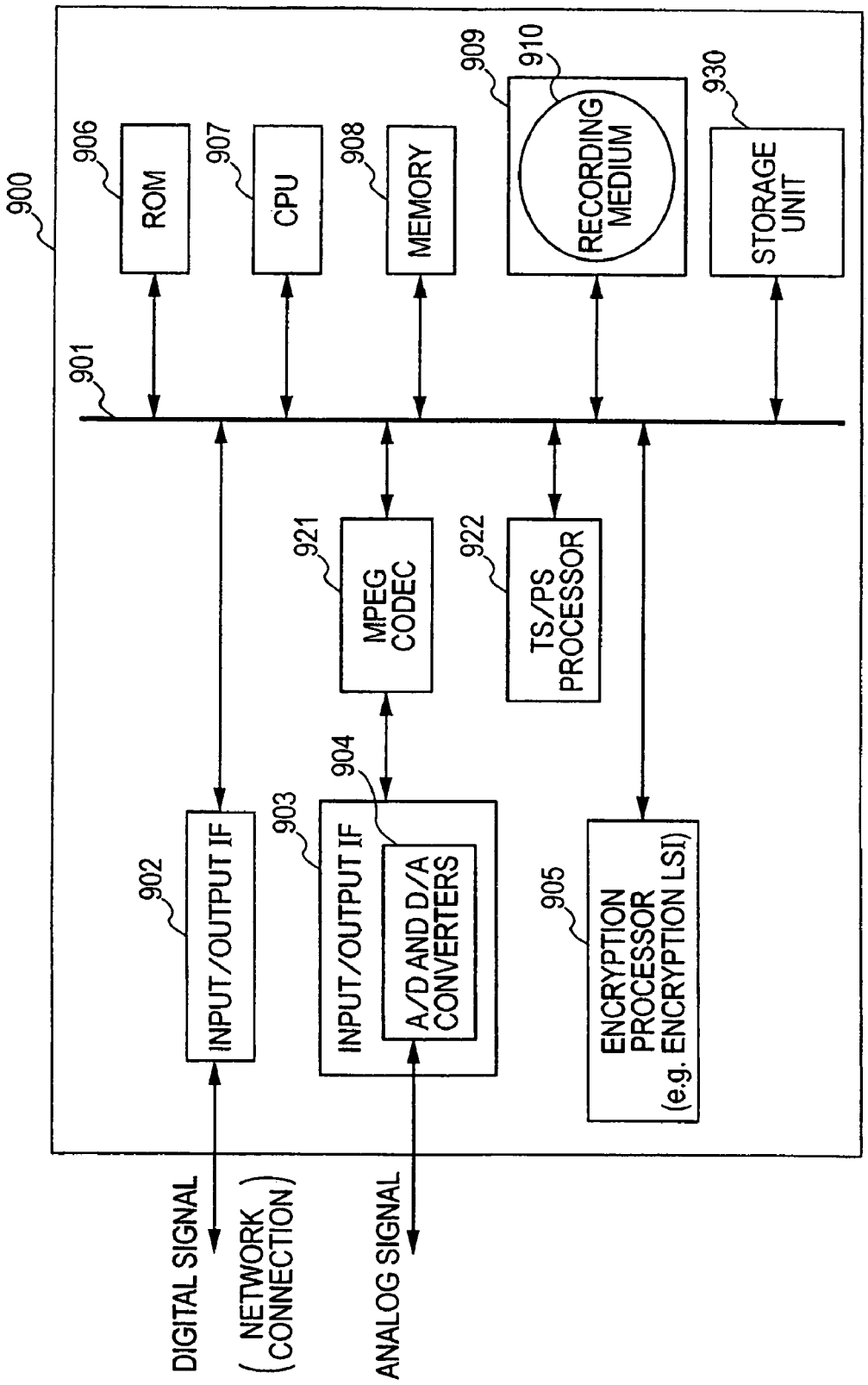
FIG. 27 illustrates an example of an information processing apparatus that performs recording/playback processing by installing an information recording medium therein.

An example of the configuration of an information processing apparatus 900 that records or plays back data on or from information recording media storing CPS-unit content is described below with reference to FIG. 27.

The information processing apparatus 900 includes a drive 909 for driving an information recording medium 910 to input or output data recording/playback signals, a CPU 907, which serves as a controller for performing data processing according to various programs, a ROM 906, which serves as a storage area for programs and parameters, a memory 908, an input/output interface (IF) 902 for inputting or outputting digital signals, an input/output interface (IF) 903, which includes analog-to-digital (AD) and digital-to-analog (DA) converters 904, for inputting or outputting analog signals, an MPEG codec 921 for encoding or decoding MPEG data, a transport-stream/program-stream (TS/PS) processor 922 for executing TS/PS processing, an encryption processor 905 for executing various encryption processing operations, and a storage unit 930, such as a hard disk. The above-described blocks are connected to a bus 901.

In the information processing apparatus 900 configured as described above, when playing back AV stream data of MPEG-TS data from the information recording medium 910, the data read from the information recording medium 910 is first decrypted in the encryption processor 905 if necessary. Then, the data is demultiplexed into video, audio, and subtitle data in the TS/PS processor 922.

Digital data decoded in the MPEG codec 921 is converted into an analog signal in the DA converter 904 of the input/output interface 903 and is output. If a digital data is output, the MPEG-TS data decrypted in the decryption processor 905 is output via the input/output interface 902 as the digital data. In this case, the digital data is output to a digital interface, such as an IEEE1394 interface, an Ethernet cable, or a wireless local area network (LAN). If data is output via a network, the input/output interface 902 has a network connecting function.

If the information processing apparatus 900 converts data into a format that can be received by a destination device, the video, audio, and subtitle data demultiplexed in the TS/PS processor 922 are subjected to rate conversion and codec conversion in the MPEG codec 921, and are again multiplexed into MPEG-TS or MPEG-PS data in the TS/PS processor 922. Then, the multiplexed data is output from the digital input/output interface 902. In this case, the video, audio, and subtitle data may be coded and converted into a multiplexed file in the format other than MPEG under the control of the CPU 907, and is then output from the digital input/output interface 902.

The CPS unit management table (see FIG. 2), which serves as the CPS unit management information, and management data, such as playback/copy control information for each CPS unit, are read from the information recording medium 910 and are then stored in the memory 908. Key information required for playing back a CPS unit can be obtained from the data stored in the memory 908.

The operation for recording subsequently generated/obtained data by the information processing apparatus 900 is as follows. Two cases can be considered where data to be recorded is input as a digital signal and an analog signal. If a digital signal is input, it is input via the digital signal input/output interface 902 and is then encrypted in the encryption processor 905 if necessary, and is then stored in the information recording medium 910. If the input digital signal is stored after converting its data format, the data format of the digital signal is converted by the MPEG codec 921, the CPU 907, and the TS/PS processor 922, and then, the resulting digital signal is encrypted in the encryption processor 905 and is stored in the recording medium 910.

If the input signal is an analog signal, it is input via the input/output interface 903 and is converted into a digital signal by the AD converter 904. The digital signal is then converted by the MPEG codec 921 into a codec that is used when being recorded.

Then, the codec is converted into AV multiplexed data, which is a recording data format, by the TS/PS processor 922, and is encrypted by the encryption processor 905 if necessary. The resulting data is then stored in the information recording medium 910. Content management information is also generated together with the content to be recorded, and is stored in the information recording medium 910.

If necessary information is obtained from an external source via a network by the information processing apparatus 900, it is stored in the memory 908. Such information includes key information necessary for playing back content, data to be played back together with the content, such as subtitle, audio, and still image data, content management information, and operation rules (usage rules) applied to a playback device in accordance with the content management information.

The program for executing playback or recording processing is stored in the ROM 906, and, if necessary, the memory 908 is used for storing data while executing the program.

Processing for generating, obtaining, and recording subsequently generated/obtained data is discussed below. The drive 909 reads an execution program or analyzable data from the information recording medium 910 and stores it in the memory 908. The program is then executed or the data is analyzed under the control of the CPU 907.

Subsequently generated/obtained data is temporarily stored in the memory 908, and is then stored in the information recording medium 910 or the storage unit 930, such as a hard disk, according to a user selection or a predetermined control sequence.

The program for executing playback/recording processing is stored in the ROM 906, and the memory 908 is used as a parameter/data storage area or a work area if necessary while the program is being executed. The information processing apparatus 900 shown in FIG. 27 is a device that can perform both recording and playback operations. However, a device having only a recording function or a playback function can also be used.

A series of processing jobs described in the specification may be executed by hardware, software, or a combination thereof. If software is used, a program containing a processing sequence can be installed into a memory of a computer built in dedicated hardware or into a general-purpose computer that can execute various processing jobs.

The program can be prerecorded in a recording medium, such as a hard disk or a ROM. The program can also be recorded (stored) temporarily or permanently in a removable recording medium, such as a flexible disk, a CD-ROM, a magneto-optical (MO) disk, a DVD, a magnetic disk, or a semiconductor memory. Such a removable recording medium can be provided as so-called "package software".

Instead of being installed into a computer from the above-described removable recording medium, the program may be transferred wirelessly to the computer from a download site, or by wired means, such as a network, for example, a LAN or the Internet. The computer receives the program and installs it in a recording medium, such as a built-in hard disk.

The various processing jobs may be executed in chronological order as described in the specification. Alternatively, they may be executed in parallel or individually according to the performance of a device that performs processing or according to the necessity. In this specification, the system is a logical set of a plurality of devices, and it is not necessary that the devices be in the same housing.

It should be understood by those skilled in the art that various modifications, combinations, sub-combinations and alterations may occur depending on design requirements and The invention is claimed as follows:

1. An information processing apparatus comprising:
a recording medium interface;
a data processor; and
a memory device which stores instructions, which when executed by the data processor, cause the data processor to operate with the recording medium interface to:
(a) obtain first encrypted data from an information recording medium, said first encrypted data being stored in one of a plurality of content management units associated with key acquisition information;
(b) generate a cryptographic key based on:
(i) said key acquisition information; and
(ii) information which can only be obtained in response to an execution of a designated licensed program;
(c) decrypt said obtained first encrypted data to form a first subsequent data, said obtained first encrypted data being decrypted based on said generated cryptographic key;
(d) thereafter, obtain or generate, using said formed first subsequent data, a second subsequent data, said second subsequent data being:
(i) non-encrypted data;
(ii) obtained or generated without decrypting said second subsequent data; and
(iii) different from any other data stored or generated in association with said information processing apparatus or said information recording medium;
(e) encrypt said second subsequent data to form a second encrypted data, said second subsequent data being encrypted based on said generated cryptographic key, and wherein said first encrypted data, said second encrypted data, said first subsequent data and said second subsequent data are each different from each and every key used in association with said first encrypted data, said second encrypted data, said first subsequent data and said second subsequent data for encryption or decryption; and
(f) record the second encrypted data in a data management file; and
(g) set the data management file in a directory for each of a plurality of user.

2. The information processing apparatus of claim 1, wherein
when executed by the data processor, the instructions cause the data processor to record the second encrypted data in the data management file in a storage unit by setting tamper verifying values for the data management file.

3. The information processing apparatus of claim 2, wherein when executed by the data processor, the instructions cause the data processor to:
(a) store an audiovisual stream data file and a navigation file in association with the data management file, said navigation file including control information or a program for playing back audiovisual stream data in said audiovisual stream data file; and
(b) record the data management file in the storage unit.

4. The information processing apparatus of claim 2, wherein when executed by the data processor, the instructions cause the data processor to encrypt the data management file and store the data management file as a single encrypted file including any data subsequently generated or obtained in association with the data management file.

5. The information processing apparatus of claim 2, wherein when executed by the data processor, the instructions cause the data processor to set the data management file as an encrypted file based on a studio ID, which serves as an identifier for a studio, wherein said studio is an entity for providing content related to said second subsequent data.

6. The information processing apparatus of claim 2, wherein when executed by the data processor, the instructions cause the data processor to set the data management file as an encrypted file based on a package ID or a volume ID, which serves as identification information concerning a manufacturing unit of the information recording medium.

7. The information processing apparatus of claim 2, wherein when executed by the data processor, the instructions cause the data processor to set the data management file as an encrypted file based on a content management unit set for the second subsequent data.

8. The information processing apparatus of claim 5, wherein when executed by the data processor, the instructions cause the data processor to:
(a) store a directory for each of a plurality of users; and
(b) set the data management file in the directory for each user.

9. The information processing apparatus of claim 1, wherein when executed by the data processor, the instructions cause the data processor to generate the cryptographic key by using a device ID, which functions as an ID set for the designated licensed program.

10. The information processing apparatus of claim 9, wherein when executed by the data processor, the instructions cause the data processor to use, as information for generating the cryptographic key, at least one of:
(a) a studio ID which serves as an identifier for a studio, wherein said studio is an entity for providing content related to the second subsequent data;
(b) a package ID or a volume ID which serves as identification information concerning a manufacturing unit of the information recording medium; and
(c) user unique information.

11. The information processing apparatus of claim 1, which includes a plurality of different keys associated with at least one of the content management units and wherein when executed by the data processor, the instructions cause the data processor to designate one of the keys associated with the at least one content management unit as the cryptographic key used for encrypting the second subsequent data.

12. The information processing apparatus of claim 2, wherein when executed by the data processor, the instructions cause the data processor to, when recording the data management file in the storage unit, generate or update search information concerning at least one of the data management file and data stored in the data management file.

13. An information processing apparatus comprising:
a recording medium interface;
a data processor; and
a memory device which stores instructions, which when executed by the data processor, cause the data processor to operate with the recording medium interface to:
(a) obtain first encrypted data from an information recording medium, said first encrypted data being stored in one of a plurality of content management units associated with key acquisition information;
(b) generate a cryptographic key based on:
(i) said key acquisition information; and
(ii) information which can only be obtained in response to an execution of a designated licensed program;
(c) decrypt said obtained first encrypted data to form a first subsequent data, said obtained first encrypted data being decrypted based on said generated cryptographic key;

(d) thereafter, obtain, from a storage unit not included in the information processing apparatus or the information recording medium, a second encrypted data, wherein said second encrypted data:
  (i) was generated or obtained using the formed first subsequent data;
  (ii) was recorded in a data management file, the data management file
    being set in a directory for each of a plurality of users; and
  (iii) is different from any other data stored or generated in association with said information processing apparatus and said information recording medium;
(e) decrypt said second encrypted data to form a second subsequent data, said second encrypted data being decrypted based on the generated cryptographic key, and wherein said first encrypted data, said second encrypted data, said first subsequent data and said second subsequent data are each different from each and every key used in association with said first encrypted data, said second encrypted data, said first subsequent data and said second subsequent data for encryption or decryption; and
(f) play back the second subsequent data.

14. The information processing apparatus of claim 13, wherein when executed by the data processor, the instructions cause the data processor to:
  (a) perform a tamper verifying operation on the basis of tamper verifying
    values set for the data management file; and
  (b) use the second encrypted data on the condition that the data management file is not tampered with.

15. The information processing apparatus of claim 13, wherein when executed by the data processor, the instructions cause the data processor to generate the cryptographic key by using a device ID, which functions as an ID set for the designated licensed program.

16. The information processing apparatus of claim 15, wherein when executed by the data processor, the instructions cause the data processor to use, as the information for generating the cryptographic key, at least one of:
  (a) a studio ID which serves as an identifier for a studio, wherein said studio is an entity for providing content related to the subsequently generated or obtained data;
  (b) a package ID or a volume ID which serves as identification information concerning a manufacturing unit of the information recording medium; and
  (c) user unique information.

17. The information processing apparatus of claim 13, which includes a plurality of keys associated with at least one of the content management units wherein when executed by the data processor, the instruction cause the data processor designate one of the keys associated with the at least one content management unit as the cryptographic key used for decrypting the second encrypted data.

18. A method of operating an information processing apparatus including instructions, said method comprising:
  (a) causing a data processor to execute the instructions to obtain first encrypted data from an information recording medium, said first encrypted data being stored in one of a plurality of content management units associated with key acquisition information;
  (b) causing the data processor to execute the instructions to generate a cryptographic key based on:
    (i) said key acquisition information; and
    (ii) information which can only be obtained in response to an execution of a designated licensed program;
  (c) causing the data processor to execute the instructions to decrypt said obtained first encrypted data to form a first subsequent data, said obtained first encrypted data being decrypted based on said generated cryptographic key;
  (d) thereafter, causing the data processor to execute the instructions to generate or obtain, using said formed first subsequent data, a second subsequent data, said second subsequent data being:
    (i) non-encrypted data,
    (ii) obtained or generated without decrypting said second subsequent data; and
    (iii) different from any other data stored or generated in association with said information processing apparatus or said information recording medium;
  (e) causing the data processor to execute the instructions to encrypt said second subsequent data to form a second encrypted, said second subsequent data being encrypted based on said generated cryptographic key, and wherein said first encrypted data, said second encrypted data, said first subsequent data and said second subsequent data are each different from each and every key used in association with said first encrypted data, said second encrypted data, said first subsequent data and said second subsequent data for encryption or decryption; and
  (f) causing the data processor to execute the instructions to record the second encrypted data in a data management file; and
  (g) set the data management file in a directory for each of a plurality of users.

19. A method of operating an information processing apparatus including instructions, said method comprising:
  (a) causing a data processor to execute the instructions to obtain first encrypted data from an information recording medium, said first encrypted data being stored in one of a plurality of content management units associated with key acquisition information;
  (b) causing the data processor to execute the instructions to generate a cryptographic key based on:
    (i) said key acquisition information; and
    (ii) information which can only be obtained in response to the execution of a designated licensed program;
  (c) causing the data processor to execute the instructions to decrypt said obtained first encrypted data to form a first subsequent data, said obtained first encrypted data being decrypted based on said generated cryptographic key;
  (d) thereafter, causing the data processor to execute the instructions to obtain, from a storage unit not included in the information processing apparatus or the information recording medium, a second encrypted data, wherein said second encrypted data:
    (i) was generated or obtained using the formed first subsequent data;
    (ii) was recoded in a data management file, the data management file being set in a directory for each of a plurality of users; and
    (iii) is different from any other data stored or generated in association with said information processing apparatus and said information recording medium;
  (e) causing the data processor to execute the instructions to decrypt said second encrypted data to form a second subsequent data, the second encrypted data being decrypted based on the generated cryptographic key, and wherein said first encrypted data, said second encrypted data, said first subsequent data and said second subsequent data are each different from each and every key used in association with said first encrypted data, said second encrypted data, said first subsequent data and said second subsequent data for encryption or decryption; and (f) cause the information processing apparatus to play back the second subsequent data.

20. A non-transitory computer readable media storing instructions structured to cause an information processing apparatus to:

(a) obtain first encrypted data from an information recording medium, said first encrypted data being stored in one of a plurality of content management units associated with key acquisition information;

(b) generate a cryptographic key based on:

(i) said key acquisition information, and (ii) information which can only be obtained in response to an execution of a designated licensed program;

(c) decrypt said obtained first encrypted data to form a first subsequent data, said obtained first encrypted data being decrypted based on said generated cryptographic key;

(d) thereafter, generate or obtain, using said formed first subsequent data, a second subsequent data, said second subsequent data being:

(i) non-encrypted data, (ii) obtained or generated without decrypting said second subsequent data; and (iii) different from any other data stored or generated in association with said information processing apparatus or said information recording medium;

(e) encrypt said second subsequent data to form a second encrypted data, said second subsequent data being encrypted based on said generated cryptographic key, and wherein said first encrypted data, said second encrypted data, said first subsequent data and said second subsequent data are each different from each and every key used in association with said first encrypted data, said second encrypted data, said first subsequent data and said second subsequent data for encryption or decryption; and (f) record the second encrypted data in a data management file; and (g) set the data management file in a directory for each of a plurality of users.

21. A non-transitory computer readable media storing instructions structured to cause an information processing apparatus to:

(a) obtain a first encrypted data from an information recording medium, said first encrypted data being stored in one of a plurality of content management units associated with key acquisition information;

(b) generate a cryptographic key based on:

(i) said key acquisition information; and (ii) information which can only be obtained in response to an execution of a designated licensed program;

(c) decrypt said obtained first encrypted data to form a first subsequent data, said obtained first encrypted data being decrypted based on said generated cryptographic key;

(d) thereafter, obtain, from a storage unit not included in the information processing apparatus or the information recording medium, a second encrypted data, wherein said second encrypted data:

(i) was generated or obtained using the formed first subsequent data;

(ii) was recoded in a data management file, the data management file being set in a directory for each of a plurality of users; and (iii) is different from any other data stored or generated in association with said information processing apparatus and said information recording medium;

(e) decrypt said second encrypted data to form second subsequent data, said second subsequent data being decrypted based on said generated cryptographic key, and wherein said first encrypted data, said second encrypted data, said first subsequent data and said second subsequent data are each different from each and every key used in association with said first encrypted data, said second encrypted data, said first subsequent data and said second subsequent data for encryption or decryption; and (f) play back said second subsequent data.

* * * * *

UNITED STATES PATENT AND TRADEMARK OFFICE
CERTIFICATE OF CORRECTION

PATENT NO.         : 8,095,790 B2
APPLICATION NO.    : 11/350383
DATED              : January 10, 2012
INVENTOR(S)        : Yoshikazu Takashima Page 1 of 1

It is certified that error appears in the above-identified patent and that said Letters Patent is hereby corrected as shown below:

On the Title Page of the patent, item 30 in the "Foreign Application Priority Data" section, please replace
"Oct. 2, 2005 (JP).......................... 2005-034426" with
--Feb. 10, 2005 (JP).............................. 2005-034426--.

Signed and Sealed this
Tenth Day of December, 2013

Margaret A. Focarino
*Commissioner for Patents of the United States Patent and Trademark Office*